(12) United States Patent
Olander et al.

(10) Patent No.: US 12,424,836 B2
(45) Date of Patent: *Sep. 23, 2025

(54) SYSTEMS AND METHODS FOR UTILIZING ELECTRICITY MONITORING DEVICES TO RECONSTRUCT AN ELECTRICAL EVENT

(71) Applicant: STATE FARM MUTUAL AUTOMOBILE INSURANCE COMPANY, Bloomington, IL (US)

(72) Inventors: Erin Ann Olander, Bloomington, IL (US); Christopher N. Kawakita, Bloomington, IL (US); Jeff Riblet, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 72 days.

This patent is subject to a terminal disclaimer.

(21) Appl. No.: 18/370,390

(22) Filed: Sep. 19, 2023

(65) Prior Publication Data
US 2024/0013311 A1    Jan. 11, 2024

Related U.S. Application Data

(63) Continuation of application No. 15/624,942, filed on Jun. 16, 2017, now Pat. No. 11,861,716.
(Continued)

(51) Int. Cl.
*H02H 3/04*    (2006.01)
*G05B 15/02*    (2006.01)
(Continued)

(52) U.S. Cl.
CPC .............. *H02H 3/04* (2013.01); *G05B 15/02* (2013.01); *G06Q 40/08* (2013.01); *H04W 4/02* (2013.01);
(Continued)

(58) Field of Classification Search
None
See application file for complete search history.

(56) References Cited

U.S. PATENT DOCUMENTS

| 1,042,341 A | 10/1912 | Harrington |
| 1,047,974 A | 12/1912 | Moore |

(Continued)

FOREIGN PATENT DOCUMENTS

| AU | 2015100551 A4 | 5/2015 |
| EP | 0769799 A2 | 4/1997 |

(Continued)

OTHER PUBLICATIONS

R. Ramakrishnan and L. Gaur, "Smart electricity distribution in residential areas: Internet of Things (IoT) based advanced metering infrastructure and cloud analytics," 2016 International Conference on Internet of Things and Applications (IOTA), Pune, India, 2016, pp. 46-51. (Year: 2016).*

(Continued)

*Primary Examiner* — Mohammad Z Shaikh
(74) *Attorney, Agent, or Firm* — Armstrong Teasdale LLP

(57) ABSTRACT

Methods and systems for identifying and correcting abnormal electrical activity about a home or other structure are provided. An electricity monitoring device may monitor electrical activity including transmission of electricity via an electrical distribution board to devices about the home. Electrical activity may be correlated with respective electrical devices to build an electrical profile associated with the structure. In response to a claimed damage to the structure or to electric devices therein, some electrical activity may be compared to the electrical profile to determine whether the damage occurred voluntarily or involuntarily.

19 Claims, 12 Drawing Sheets

Related U.S. Application Data

(60) Provisional application No. 62/458,292, filed on Feb. 13, 2017, provisional application No. 62/413,511, filed on Oct. 27, 2016.

(51) Int. Cl.
   *G06Q 40/08* (2012.01)
   *H04W 4/02* (2018.01)
   *H02J 3/00* (2006.01)

(52) U.S. Cl.
   CPC .............. *G05B 2219/163* (2013.01); *G05B 2219/2642* (2013.01); *H02J 3/001* (2020.01); *Y02B 90/20* (2013.01); *Y04S 20/14* (2013.01); *Y04S 20/30* (2013.01)

(56) References Cited

U.S. PATENT DOCUMENTS

| | | | |
|---|---|---|---|
| 1,055,793 A | 3/1913 | Pogue | |
| 1,057,664 A | 4/1913 | Patterson | |
| 1,446,000 A | 2/1923 | Cleland | |
| 5,483,153 A | 1/1996 | Leeb et al. | |
| 5,872,358 A | 2/1999 | Todokoro et al. | |
| 5,900,629 A | 5/1999 | Todokoro et al. | |
| 6,069,356 A | 5/2000 | Todokoro et al. | |
| 6,084,238 A | 7/2000 | Todokoro et al. | |
| 6,853,894 B1 | 2/2005 | Kolls | |
| 6,982,710 B2 | 1/2006 | Salomie | |
| 6,988,026 B2 | 1/2006 | Breed et al. | |
| 7,082,359 B2 | 7/2006 | Breed | |
| 7,089,099 B2 | 8/2006 | Shostak et al. | |
| 7,103,460 B1 | 9/2006 | Breed | |
| 7,289,965 B1 | 10/2007 | Bradley et al. | |
| RE40,073 E | 2/2008 | Breed | |
| 7,421,321 B2 | 9/2008 | Breed et al. | |
| 7,747,534 B2 * | 6/2010 | Villicana | G01D 4/004 705/412 |
| 7,835,919 B1 | 11/2010 | Bradley et al. | |
| 7,966,203 B1 | 6/2011 | Pietrzak | |
| 7,974,854 B1 | 7/2011 | Bradley et al. | |
| 8,010,377 B1 | 8/2011 | Bradley et al. | |
| 8,027,850 B1 | 9/2011 | Pietrzak | |
| 8,055,529 B1 | 11/2011 | Jackson et al. | |
| 8,155,900 B1 * | 4/2012 | Adams | F24F 11/46 702/62 |
| 8,289,160 B1 | 10/2012 | Billman | |
| 8,433,344 B1 | 4/2013 | Virga | |
| 8,490,006 B1 | 7/2013 | Reeser et al. | |
| 8,515,783 B1 | 8/2013 | Weeks | |
| 8,527,306 B1 | 9/2013 | Reeser et al. | |
| 8,533,144 B1 | 9/2013 | Reeser et al. | |
| 8,595,034 B2 | 11/2013 | Bauer et al. | |
| 8,595,130 B2 | 11/2013 | Johnson et al. | |
| 8,640,038 B1 | 1/2014 | Reeser et al. | |
| 8,650,048 B1 | 2/2014 | Hopkins, III et al. | |
| 8,655,595 B1 | 2/2014 | Green et al. | |
| 8,665,084 B2 | 3/2014 | Shapiro et al. | |
| 8,674,544 B2 | 3/2014 | Rada et al. | |
| 8,674,831 B1 | 3/2014 | Merrill et al. | |
| 8,682,682 B1 | 3/2014 | Bradley et al. | |
| 8,712,805 B1 | 4/2014 | Ferries et al. | |
| 8,760,285 B2 | 6/2014 | Billman et al. | |
| 8,799,029 B2 | 8/2014 | Bodas | |
| 8,825,583 B2 * | 9/2014 | Sanchez Loureda | H02J 3/003 706/50 |
| 8,890,680 B2 | 11/2014 | Reeser et al. | |
| 8,892,263 B1 | 11/2014 | Morris et al. | |
| 8,892,451 B2 | 11/2014 | Everett et al. | |
| 8,917,186 B1 | 12/2014 | Grant | |
| 8,949,052 B2 * | 2/2015 | Chakradhar | G01D 4/002 702/61 |
| 8,976,937 B2 | 3/2015 | Shapiro et al. | |
| 9,049,168 B2 | 6/2015 | Jacob et al. | |
| 9,057,746 B1 | 6/2015 | Houlette et al. | |
| 9,111,349 B2 | 8/2015 | Szeliski et al. | |
| 9,117,349 B2 | 8/2015 | Shapiro et al. | |
| 9,142,119 B1 | 9/2015 | Grant | |
| 9,152,737 B1 | 10/2015 | Micali et al. | |
| 9,183,578 B1 | 11/2015 | Reeser et al. | |
| 9,202,363 B1 | 12/2015 | Grant | |
| 9,213,994 B2 | 12/2015 | Green et al. | |
| 9,262,909 B1 | 2/2016 | Grant | |
| 9,280,793 B2 | 3/2016 | English et al. | |
| 9,286,772 B2 | 3/2016 | Shapiro et al. | |
| 9,311,676 B2 | 4/2016 | Helitzer et al. | |
| 9,344,330 B2 | 5/2016 | Jacob et al. | |
| 9,424,737 B2 | 8/2016 | Bailey et al. | |
| 9,443,195 B2 | 9/2016 | Micali et al. | |
| 9,472,092 B1 | 10/2016 | Grant | |
| 9,552,611 B2 | 1/2017 | Cook | |
| 9,589,441 B2 | 3/2017 | Shapiro et al. | |
| 9,609,003 B1 | 3/2017 | Chmielewski et al. | |
| 9,665,892 B1 | 5/2017 | Reeser et al. | |
| 9,666,060 B2 | 5/2017 | Reeser et al. | |
| 9,699,529 B1 | 7/2017 | Petri et al. | |
| 9,702,959 B2 | 7/2017 | Marshall et al. | |
| 9,739,813 B2 | 8/2017 | Houlette et al. | |
| 9,786,158 B2 | 10/2017 | Beaver et al. | |
| 9,798,979 B2 | 10/2017 | Fadell et al. | |
| 9,798,993 B2 | 10/2017 | Payne et al. | |
| 9,800,570 B1 | 10/2017 | Bleisch | |
| 9,800,958 B1 | 10/2017 | Petri et al. | |
| 9,812,001 B1 | 11/2017 | Grant | |
| 9,818,158 B1 | 11/2017 | Devereaux et al. | |
| 9,824,398 B2 | 11/2017 | English et al. | |
| 9,888,371 B1 | 2/2018 | Jacob | |
| 9,892,463 B1 | 2/2018 | Hakimi-Boushehri et al. | |
| 9,898,168 B2 | 2/2018 | Shapiro et al. | |
| 9,898,912 B1 | 2/2018 | Jordan, II et al. | |
| 9,911,042 B1 | 3/2018 | Cardona et al. | |
| 9,923,971 B2 | 3/2018 | Madey et al. | |
| 9,942,630 B1 | 4/2018 | Petri et al. | |
| 9,947,051 B1 | 4/2018 | Allen et al. | |
| 9,947,202 B1 | 4/2018 | Moon et al. | |
| 9,978,033 B1 | 5/2018 | Payne et al. | |
| 9,996,882 B1 | 6/2018 | Manzella et al. | |
| 9,997,056 B2 | 6/2018 | Bleisch | |
| 10,002,295 B1 | 6/2018 | Cardona et al. | |
| 10,042,341 B1 | 8/2018 | Jacob | |
| 10,047,974 B1 | 8/2018 | Riblet et al. | |
| 10,055,793 B1 | 8/2018 | Call et al. | |
| 10,055,803 B2 | 8/2018 | Orduna et al. | |
| 10,057,664 B1 | 8/2018 | Moon et al. | |
| 10,062,118 B1 | 8/2018 | Bernstein et al. | |
| 10,073,929 B2 | 9/2018 | Vaynriber et al. | |
| 10,102,584 B1 | 10/2018 | Devereaux et al. | |
| 10,102,585 B1 | 10/2018 | Bryant et al. | |
| 10,102,589 B1 | 10/2018 | Tofte et al. | |
| 10,107,708 B1 | 10/2018 | Schick et al. | |
| 10,142,394 B2 | 11/2018 | Chmielewski et al. | |
| 10,176,705 B1 | 1/2019 | Grant | |
| 10,181,160 B1 | 1/2019 | Hakimi-Boushehri et al. | |
| 10,186,134 B1 | 1/2019 | Moon et al. | |
| 10,187,707 B2 | 1/2019 | Norwood et al. | |
| 10,198,771 B1 | 2/2019 | Madigan et al. | |
| 10,210,498 B1 | 2/2019 | Meyyappan et al. | |
| 10,217,068 B1 | 2/2019 | Davis et al. | |
| 10,223,750 B1 | 3/2019 | Loo et al. | |
| 10,223,751 B1 * | 3/2019 | Hutchinson | G06Q 40/08 |
| 10,229,394 B1 | 3/2019 | Davis et al. | |
| 10,244,294 B1 | 3/2019 | Moon et al. | |
| 10,249,158 B1 | 4/2019 | Jordan, II et al. | |
| 10,269,074 B1 | 4/2019 | Patel et al. | |
| 10,282,787 B1 | 5/2019 | Hakimi-Boushehri et al. | |
| 10,282,788 B1 | 5/2019 | Jordan, II et al. | |
| 10,282,961 B1 | 5/2019 | Jordan, II et al. | |
| 10,295,431 B1 | 5/2019 | Schick et al. | |
| 10,296,978 B1 | 5/2019 | Corder et al. | |
| 10,297,138 B2 | 5/2019 | Reeser et al. | |
| 10,304,313 B1 | 5/2019 | Moon et al. | |
| 10,311,521 B1 | 6/2019 | Capone et al. | |
| 10,323,860 B1 | 6/2019 | Riblet et al. | |
| 10,325,473 B1 | 6/2019 | Moon et al. | |

(56) References Cited

U.S. PATENT DOCUMENTS

| | | |
|---|---|---|
| 10,332,059 B2 | 6/2019 | Matsuoka et al. |
| 10,338,112 B2 * | 7/2019 | Micali .................. G01R 21/133 |
| 10,346,811 B1 * | 7/2019 | Jordan, II ........... H04L 12/2818 |
| 10,353,359 B1 | 7/2019 | Jordan, II et al. |
| 10,356,303 B1 | 7/2019 | Jordan, II et al. |
| 10,380,692 B1 | 8/2019 | Parker et al. |
| 10,387,966 B1 | 8/2019 | Shah et al. |
| 10,388,135 B1 | 8/2019 | Jordan, II et al. |
| 10,412,169 B1 | 9/2019 | Madey et al. |
| 10,446,000 B2 | 10/2019 | Friar et al. |
| 10,453,146 B1 | 10/2019 | Stricker et al. |
| 10,453,149 B1 | 10/2019 | Gaudin et al. |
| 10,467,476 B1 | 11/2019 | Cardona et al. |
| 10,480,825 B1 | 11/2019 | Riblet et al. |
| 10,482,746 B1 | 11/2019 | Moon et al. |
| 10,504,189 B1 | 12/2019 | Gaudin et al. |
| 10,506,411 B1 | 12/2019 | Jacob |
| 10,510,120 B1 | 12/2019 | Roll |
| 10,514,669 B1 | 12/2019 | Call et al. |
| 10,515,372 B1 | 12/2019 | Jordan, II et al. |
| 10,522,009 B1 | 12/2019 | Jordan, II et al. |
| 10,546,478 B1 | 1/2020 | Moon et al. |
| 10,547,918 B1 | 1/2020 | Moon et al. |
| 10,565,541 B2 | 2/2020 | Payne et al. |
| 10,572,947 B1 | 2/2020 | Berends et al. |
| 10,573,146 B1 | 2/2020 | Jordan, II et al. |
| 10,573,149 B1 | 2/2020 | Jordan, II et al. |
| 10,579,028 B1 | 3/2020 | Jacob |
| 10,579,971 B1 | 3/2020 | Davis et al. |
| 10,586,177 B1 | 3/2020 | Choueiter et al. |
| 10,607,295 B1 | 3/2020 | Hakimi-Boushehri et al. |
| 10,623,509 B2 | 4/2020 | Delinselle et al. |
| 10,634,576 B1 | 4/2020 | Schick et al. |
| 10,652,257 B1 | 5/2020 | Shah et al. |
| 10,664,922 B1 | 5/2020 | Madigan et al. |
| 10,672,081 B1 | 6/2020 | Lyons et al. |
| 10,679,292 B1 | 6/2020 | Call et al. |
| 10,685,402 B1 | 6/2020 | Bryant et al. |
| 10,699,346 B1 | 6/2020 | Corder et al. |
| 10,713,726 B1 | 7/2020 | Allen et al. |
| 10,726,492 B2 | 7/2020 | Snyder et al. |
| 10,726,494 B1 | 7/2020 | Shah et al. |
| 10,726,500 B1 | 7/2020 | Shah et al. |
| 10,733,671 B1 | 8/2020 | Hakimi-Boushehri et al. |
| 10,733,868 B2 | 8/2020 | Moon et al. |
| 10,735,829 B2 | 8/2020 | Petri et al. |
| 10,740,691 B2 | 8/2020 | Choueiter et al. |
| 10,741,033 B1 | 8/2020 | Jordan, II et al. |
| 10,750,252 B2 | 8/2020 | Petri et al. |
| 10,795,329 B1 | 10/2020 | Jordan, II et al. |
| 10,796,557 B2 | 10/2020 | Sundermeyer et al. |
| 10,823,458 B1 | 11/2020 | Riblet et al. |
| 10,824,971 B1 | 11/2020 | Davis et al. |
| 10,825,320 B1 | 11/2020 | Moon et al. |
| 10,825,321 B2 | 11/2020 | Moon et al. |
| 10,832,225 B1 | 11/2020 | Davis et al. |
| 10,846,800 B1 | 11/2020 | Bryant et al. |
| 10,861,115 B1 | 12/2020 | Stricker et al. |
| 10,922,756 B1 | 2/2021 | Call et al. |
| 10,922,948 B1 | 2/2021 | Moon et al. |
| 10,930,141 B2 | 2/2021 | De Paz Alberola et al. |
| 10,943,306 B1 | 3/2021 | Gaudin et al. |
| 10,943,447 B1 | 3/2021 | Jordan, II et al. |
| 10,949,928 B1 | 3/2021 | Roll |
| 10,970,990 B1 | 4/2021 | Jacob |
| 10,990,069 B1 | 4/2021 | Jacob |
| 11,003,334 B1 | 5/2021 | Conway et al. |
| 11,004,320 B1 | 5/2021 | Jordan, II et al. |
| 11,015,997 B1 | 5/2021 | Schick et al. |
| 11,017,480 B2 | 5/2021 | Shah et al. |
| 11,037,255 B1 | 6/2021 | Ganev et al. |
| 11,042,137 B1 | 6/2021 | Call et al. |
| 11,042,942 B1 | 6/2021 | Hakimi-Boushehri et al. |
| 11,043,098 B1 | 6/2021 | Jordan, II et al. |
| 11,049,078 B1 | 6/2021 | Jordan, II et al. |
| 11,049,189 B2 | 6/2021 | Shah et al. |
| 11,055,797 B1 | 7/2021 | Carone |
| 11,074,659 B1 | 7/2021 | Hakimi-Boushehri et al. |
| 11,087,347 B1 | 8/2021 | De Guia et al. |
| 11,087,420 B1 | 8/2021 | Trundle |
| 11,100,594 B1 | 8/2021 | West et al. |
| 11,118,812 B1 | 9/2021 | Riblet et al. |
| 11,126,708 B2 | 9/2021 | Reimer |
| 11,151,654 B2 | 10/2021 | Trainor et al. |
| 11,210,741 B1 | 12/2021 | Allen et al. |
| 11,232,873 B1 | 1/2022 | Aspro et al. |
| 11,308,247 B2 | 4/2022 | McDade |
| 11,451,043 B1 * | 9/2022 | Olander ............. G01R 19/2513 |
| 11,501,100 B1 | 11/2022 | Geng et al. |
| 11,556,995 B1 | 1/2023 | Little et al. |
| 11,656,097 B2 | 5/2023 | Vega et al. |
| 11,715,074 B2 | 8/2023 | Aspro et al. |
| 11,748,817 B2 | 9/2023 | Szott |
| 11,783,423 B1 | 10/2023 | Yager et al. |
| 11,941,712 B2 | 3/2024 | Trundle |
| 2003/0120588 A1 | 6/2003 | Dodd et al. |
| 2005/0055249 A1 | 3/2005 | Helitzer et al. |
| 2005/0065678 A1 | 3/2005 | Smith et al. |
| 2005/0085973 A1 | 4/2005 | Furem et al. |
| 2005/0171645 A1 * | 8/2005 | Oswald .................. G05B 15/02 700/29 |
| 2005/0276401 A1 | 12/2005 | Madill, Jr. et al. |
| 2006/0031180 A1 * | 2/2006 | Tamarkin ............... G06Q 50/06 705/412 |
| 2006/0136273 A1 | 6/2006 | Zizzamia et al. |
| 2007/0088507 A1 | 4/2007 | Haberlen et al. |
| 2007/0185391 A1 | 8/2007 | Morgan |
| 2007/0260401 A1 | 11/2007 | Sydor et al. |
| 2008/0000779 A1 | 1/2008 | Wang et al. |
| 2008/0255862 A1 | 10/2008 | Bailey et al. |
| 2009/0177500 A1 | 7/2009 | Swahn |
| 2009/0206059 A1 | 8/2009 | Kiko |
| 2009/0261943 A1 | 10/2009 | Jana et al. |
| 2009/0265193 A1 | 10/2009 | Collins et al. |
| 2010/0050264 A1 | 2/2010 | Aebig et al. |
| 2010/0125911 A1 | 5/2010 | Bhaskaran |
| 2010/0211222 A1 * | 8/2010 | Ghosn .................... G01K 17/00 702/182 |
| 2010/0217702 A1 | 8/2010 | Tu |
| 2010/0293130 A1 | 11/2010 | Stephan et al. |
| 2011/0047086 A1 | 2/2011 | Heisterkamp et al. |
| 2011/0270773 A1 | 11/2011 | Siekman et al. |
| 2011/0295624 A1 | 12/2011 | Chapin et al. |
| 2012/0016528 A1 | 1/2012 | Raman et al. |
| 2012/0035777 A1 | 2/2012 | Park |
| 2012/0072239 A1 | 3/2012 | Gibbard et al. |
| 2012/0116820 A1 | 5/2012 | English et al. |
| 2012/0158618 A1 | 6/2012 | Roskos |
| 2012/0290104 A1 | 11/2012 | Holt et al. |
| 2012/0290230 A1 * | 11/2012 | Berges Gonzalez ........................ G05B 19/0428 702/61 |
| 2013/0006674 A1 | 1/2013 | Bowne et al. |
| 2013/0041841 A1 | 2/2013 | Lyons |
| 2013/0066479 A1 | 3/2013 | Shetty et al. |
| 2013/0096857 A1 | 4/2013 | Chakradhar |
| 2013/0160072 A1 | 6/2013 | Reus et al. |
| 2013/0197807 A1 | 8/2013 | Du et al. |
| 2013/0262473 A1 | 10/2013 | Scanlon et al. |
| 2013/0275263 A1 | 10/2013 | Carlin, Jr. et al. |
| 2013/0307694 A1 | 11/2013 | Amar |
| 2013/0338948 A1 | 12/2013 | Zeifman |
| 2014/0032433 A1 | 1/2014 | Eick et al. |
| 2014/0129160 A1 | 5/2014 | Tran |
| 2014/0136242 A1 | 5/2014 | Weekes et al. |
| 2014/0200929 A1 | 7/2014 | Fitzgerald et al. |
| 2014/0214750 A1 | 7/2014 | Healy et al. |
| 2014/0266669 A1 | 9/2014 | Fadell et al. |
| 2014/0266682 A1 | 9/2014 | Gettings et al. |
| 2014/0270176 A1 | 9/2014 | Gettings et al. |
| 2014/0306833 A1 | 10/2014 | Ricci |
| 2014/0358592 A1 | 12/2014 | Wedig et al. |
| 2015/0019262 A1 | 1/2015 | Du et al. |
| 2015/0025917 A1 | 1/2015 | Stempora |

(56) References Cited

U.S. PATENT DOCUMENTS

| | | | |
|---|---|---|---|
| 2015/0061859 A1 | 3/2015 | Matsuoka et al. | |
| 2015/0154712 A1* | 6/2015 | Cook | G06Q 40/08 |
| | | | 705/4 |
| 2015/0154847 A1 | 6/2015 | Oliver et al. | |
| 2015/0170503 A1* | 6/2015 | Wedig | G08B 7/066 |
| | | | 340/691.5 |
| 2015/0248643 A1 | 9/2015 | Nathanson | |
| 2015/0268281 A1 | 9/2015 | Haghighat-Kashani | |
| 2015/0302529 A1 | 10/2015 | Jagannathan | |
| 2015/0316594 A1* | 11/2015 | Kania | G01R 31/327 |
| | | | 702/62 |
| 2015/0347910 A1 | 12/2015 | Fadell et al. | |
| 2015/0357153 A1 | 12/2015 | Makino et al. | |
| 2015/0357155 A1 | 12/2015 | Dohi et al. | |
| 2016/0035150 A1 | 2/2016 | Barfield, Jr. et al. | |
| 2016/0048934 A1 | 2/2016 | Gross | |
| 2016/0055593 A1 | 2/2016 | Groeneveld | |
| 2016/0055594 A1 | 2/2016 | Emison et al. | |
| 2016/0055595 A1 | 2/2016 | Green et al. | |
| 2016/0066066 A1 | 3/2016 | Dharmadhikari et al. | |
| 2016/0098530 A1 | 4/2016 | Dill et al. | |
| 2016/0110818 A1 | 4/2016 | Shemesh et al. | |
| 2016/0117646 A1 | 4/2016 | Lerick et al. | |
| 2016/0127144 A1 | 5/2016 | Takahashi et al. | |
| 2016/0146866 A1* | 5/2016 | Houlette | G01R 21/133 |
| | | | 702/62 |
| 2016/0147243 A1* | 5/2016 | Micali | G05F 1/66 |
| | | | 700/295 |
| 2016/0163186 A1 | 6/2016 | Davidson et al. | |
| 2016/0212506 A1 | 7/2016 | Norwood et al. | |
| 2016/0275633 A1 | 9/2016 | Gitt et al. | |
| 2016/0283958 A1 | 9/2016 | Devereaux et al. | |
| 2016/0284029 A1 | 9/2016 | Rhodes et al. | |
| 2016/0321582 A1 | 11/2016 | Broudou et al. | |
| 2016/0321587 A1 | 11/2016 | Gitt et al. | |
| 2017/0006135 A1 | 1/2017 | Siebel et al. | |
| 2017/0032466 A1 | 2/2017 | Feldman et al. | |
| 2017/0039286 A1 | 2/2017 | Walke et al. | |
| 2017/0061351 A1 | 3/2017 | Lee et al. | |
| 2017/0076408 A1 | 3/2017 | Roy | |
| 2017/0103465 A1 | 4/2017 | Zentler | |
| 2017/0154382 A1 | 6/2017 | McLaughlin et al. | |
| 2017/0161614 A1 | 6/2017 | Mehta et al. | |
| 2017/0221149 A1 | 8/2017 | Hsu-Hoffman et al. | |
| 2017/0322705 A1 | 11/2017 | Conway et al. | |
| 2017/0352243 A1 | 12/2017 | Quanci et al. | |
| 2018/0006899 A1 | 1/2018 | Ogrinz | |
| 2018/0025430 A1 | 1/2018 | Perl et al. | |
| 2018/0033087 A1 | 2/2018 | Delinselle et al. | |
| 2018/0034657 A1 | 2/2018 | Brown et al. | |
| 2018/0047107 A1 | 2/2018 | Perl et al. | |
| 2018/0191867 A1 | 7/2018 | Siebel et al. | |
| 2019/0011283 A1 | 1/2019 | Soutar et al. | |
| 2019/0035028 A1 | 1/2019 | Jones et al. | |
| 2019/0057466 A1 | 2/2019 | Udell | |
| 2019/0102840 A1 | 4/2019 | Perl et al. | |
| 2019/0121337 A1 | 4/2019 | Cohen et al. | |
| 2019/0251520 A1 | 8/2019 | Bentley, III et al. | |
| 2020/0302549 A1 | 9/2020 | Jordan, II et al. | |
| 2020/0327791 A1 | 10/2020 | Moon et al. | |
| 2021/0011448 A1 | 1/2021 | Coleman et al. | |
| 2021/0018335 A1 | 1/2021 | Hood | |
| 2021/0019847 A1 | 1/2021 | Sneed | |
| 2021/0035432 A1 | 2/2021 | Moon et al. | |
| 2021/0042843 A1 | 2/2021 | Bryant et al. | |
| 2021/0090188 A1 | 3/2021 | Lai et al. | |
| 2021/0090300 A1 | 3/2021 | Leppänen et al. | |
| 2021/0150651 A1 | 5/2021 | Shoup | |
| 2021/0158671 A1 | 5/2021 | Jordan, II et al. | |
| 2021/0182986 A1 | 6/2021 | Butler et al. | |
| 2021/0279791 A1 | 9/2021 | Jacoby | |
| 2021/0293864 A1 | 9/2021 | Micali et al. | |
| 2021/0350471 A1 | 11/2021 | Hakimi-Boushehri et al. | |
| 2022/0012999 A1 | 1/2022 | Marotta et al. | |
| 2022/0013222 A1 | 1/2022 | Marotta et al. | |
| 2022/0343443 A1 | 10/2022 | Graham et al. | |
| 2022/0391794 A1 | 12/2022 | Singh et al. | |
| 2022/0405856 A1 | 12/2022 | Hedges et al. | |
| 2023/0023808 A1 | 1/2023 | Wall et al. | |
| 2023/0035517 A1 | 2/2023 | Bentley, III et al. | |
| 2023/0153916 A1 | 5/2023 | Little et al. | |
| 2023/0342732 A1 | 10/2023 | Aspro et al. | |
| 2023/0342857 A1 | 10/2023 | Gibson et al. | |
| 2023/0342858 A1 | 10/2023 | Gibson et al. | |
| 2023/0342859 A1 | 10/2023 | Gibson et al. | |
| 2023/0342862 A1 | 10/2023 | Gibson et al. | |
| 2023/0342867 A1 | 10/2023 | Gibson et al. | |
| 2023/0342868 A1 | 10/2023 | Gibson et al. | |
| 2023/0342869 A1 | 10/2023 | Gibson et al. | |
| 2023/0377070 A1 | 11/2023 | Gibson et al. | |
| 2024/0037680 A1 | 2/2024 | Gibson et al. | |
| 2024/0046366 A1 | 2/2024 | Yager et al. | |
| 2024/0087290 A1 | 3/2024 | Hedges et al. | |

FOREIGN PATENT DOCUMENTS

| | | |
|---|---|---|
| JP | S53131755 A | 11/1978 |
| JP | H09017191 A | 1/1997 |
| JP | 2009272232 A | 11/2009 |
| JP | 2014010928 A | 1/2014 |
| JP | 2014143096 A | 8/2014 |
| WO | 2018052595 A1 | 3/2018 |

OTHER PUBLICATIONS

D. Chen, S. Kalra, D. Irwin, P. Shenoy and J. Albrecht, "Preventing Occupancy Detection From Smart Meters," in IEEE Transactions on Smart Grid, vol. 6, No. 5, pp. 2426-2434, Sep. 2015. (Year: 2015).*

Chen et al., "Non-Intrusive Occupancy Monitoring using Smart Meters" BuildSys'13: Proceedings of the 5th ACM Workshop on Embedded Systems for Energy-Efficient Buildings, Nov. 2013, pp. 1-8. (Year: 2013).*

Liu et al., "Design and Implementation of Smart-Home Monitoring System with the Internet of Things Technology," p. 5, Jan. 2016. Retrieved from: https://www.researchgate.net/publication/300330870_Design_and_Implementation_of_Smart-Home_Monitoring_System_with_the_Internet_of_Things_Technology.

Michalis et al., "Quality Evaluation of Residential Houses: The Development of a Real-Time Quality Assessment Tool," p. 11-12, Jan. 2013. Retrieved from: https://www.researchgate.net/publication/233841366_Quality_Evaluation_of_Residential_Houses_The_Development_of_a_Real-Time_Quality_Assessment_Tool.

Moore et al., "An intelligent maintenance system for continuous cost-based prioritisation of maintenance activities," Aug. 2006. Retrieved from: https://www.researchgate.net/publication/222428855_An_intelligent_maintenance_system_for_continuous_cost-based_prioritisation_of_maintenance_activities.

Spoor et al., "How can data generated by smart home devices help identify consumer needs?," p. 7, Jul. 2016. Retrieved from: https://essay.utwente.nl/69990/1/Spoor_BA_BMS.pdf.

16 Factors that affect Homeowners Insurance premiums by Insurance.com (Year: 2013).

Anomaly Detection: A Survey Varun Chandola, Arindam Banerjee, and Vipin Kumar (Year: 2009).

Are Appliances Covered Under Homeowners Insurance Policies? by Robert Alley (Year: 2014).

Chen et al., Preventing Occupancy Detection From Smart Meters, IEEE Transactions on Smart Grid vol. 6, No. 5, Sep. 2015 Year: 2015).

Chen et al, "Non-Intrusive Occupancy Monitoring using Smart Meters" BuildSys'13: Proceedings of the 5th ACM Workshop on Embedded Systems for Energy-Efficient Buildings, Nov. 2013 pp. 1-8https://doi.org/10.1145/2528282.2528294 (Year: 2013).

Curb, https://energycurb.com/, Sep. 24, 2017 (Year: 2017).

Current Clamp, downloaded from en.wikipedia.org/wiki/Current clamp on Feb. 6, 2020 (Year: 2020).

(56) References Cited

OTHER PUBLICATIONS

Delany, John, Eyedro EBWEM1 Business Electricity Monitor Review, 2014, downloaded from www.pcmag.com/reviews/ eyedro-ebwem1-business-electricity-monitor. Feb. 7, 2020 (Year: 2014).

Desjardins/Roost, Smart Water Leak and Freeze Detector, Retrieved from the Internet on May 24, 2019, <https://canadianunderwriter.ca/wp-content/uploads/2017/08/desjardins-370x247.jpg>, 1 page.

Does Homeowners Insurance Cover Spoiled Food After a Power Outage, by Allstate—Mar. 2018 (Year: 2018).

EOSVenturepartners.com, "Neos—a home insurance solution leveraging smart home technology," 2019, Retrieved From the Internet on May 24, 219: <http://www.eosventurepartners.com/casestudy/neos-case-study/>, 3 pages.

Facts+ Statistics: Homeowners and renters insurance by homeowners (Year: 2020).

Francis, Next-Generation Insurance: Tapping into the Intelligence of Smart Homes, Cognizant (Year: 2015).

International Preliminary Report on Patentability received for PCT Patent Application No. PCT/JP2017/008755, mailed on Dec. 13, 2017, 11 pages (4 pages of English Translation and 7 pages of Original Document).

International Search Report and Written Opinion received for PCT Patent Application No. PCT/JP2017/008755, mailed Jn Jun. 6, 2017, 9 pages (2 pages of English Translation and 7 pages of Original Document).

Neurio Home Electricity Monitor Review, Jul. 10, 2016, screen capture dated Feb. 7, 2020 from www.youtube.com/watch?v=xhEefUFdPWo. Feb. 7, 2020 (Year: 2016).

Maestro, Sense Home Energy Monitor Week #1 Update, Sep. 24, 2016. Screen captures dated Feb. 7, 2020 from www.youtube.conn/watch?v=KqjJT6YcBZQ&list=PLbzeOtpXZbGjc8E4fyvQZUNHnhM-PC2J2 (Year: 2016).

Kelly, Neural NILM: Deep Neural Networks Applied to Energy Disaggregation, BuildSys '15: Proceedings of the 2nd ACM International Conference on Embedded Systems for Energy-Efficient Built Environments; Nov. 2015 pp. 55-64 (Year: 2015).

Patel et al., Internet of Things-10T: Definition, Characteristics, Architecture, Enabling Technologies, Application & Future Challenges, International Journal of Engineering Science and Computing, pp. 6122-6131 (Year: 2016).

Sense Home Energy Monitor Unboxing and Installation, Sep. 19, 2016, Screen captures dated Feb. 7, 2020 from www.youtube.conn/watch?v=orkcsNw4sDg (Year: 2016).

Pearson correlation coefficient, downloaded from https://en.wikipedia.org/wiki/Pearson_correlation_coefficient, Dec. 1, 2020 (Year:2020).

Smart Homes Create New Risk: How Technology Impacts Insurance Coverage by HUB (Year: 2016).

The SmartShop, Lightwave RF—How to set up the home energy monitor. Dated Oct. 31, 2012. Screen caps at 1:01, 2:10, and 3:06. https://www.youtube.conn/watch?v=C0qTgsZpMKU (Year: 2012).

What is a Clue Report? by Roy et al. (Year: 2020).

Types of Homeowners Insurance Claims, by Pocketsense—pocketsense.com/types-homeowners-insurance-claims-5385090.html (Year: 2017).

\* cited by examiner

SYSTEMS AND METHODS FOR UTILIZING ELECTRICITY MONITORING DEVICES TO RECONSTRUCT AN ELECTRICAL EVENT

CROSS-REFERENCE TO RELATED APPLICATIONS

This application is a continuation of U.S. patent application Ser. No. 15/624,942, filed Jun. 16, 2017 and entitled "Systems and Methods for Mitigating Risk Using Electricity Monitoring Devices," which claims priority to and the benefit of the filing date of (1) provisional U.S. Application Ser. No. 62/413,511, filed Oct. 27, 2016 and entitled "Systems and Methods for Mitigating Risk Using Electricity Monitoring Devices," and (2) provisional U.S. Application Ser. No. 62/458,292, filed Feb. 13, 2017 and entitled "SYSTEMS AND METHODS FOR MITIGATING RISK USING ELECTRICITY MONITORING DEVICES," the entire disclosures of which are incorporated herein by reference.

FIELD OF THE DISCLOSURE

The present disclosure generally relates to energy monitoring and usage. More particularly, the present disclosure relates to monitoring electrical activity about a structure, such as a home, to reconstruct an electricity-related event associated with the structure.

BACKGROUND

Conventional homes are subject to electrical fires or other electrical issues that lead to damage to the home, as well as to personal property. Also, with the proliferation of the "internet of things," more household devices are gaining communication and network connectivity capabilities. Still, conventional homes may remain subject to insurance-related events, such as those caused by electrical issues.

SUMMARY

The present embodiments may, inter alia, facilitate communications with connected devices and items, and/or facilitate insurance-related processing associated with the connected devices and items, among other functionalities. For instance, the present embodiments may dynamically monitor electricity flow to various electronic devices associated with a property (e.g., smart or conventional home) that may be populated with a plurality of devices. An Electricity Monitoring (EM) device may be within the home or proximal to the home, such as in the vicinity of the home's main electrical distribution board (or "breaker box"). The EM device may wirelessly sense, detect, monitor, and/or generate Electricity Flow (EF) data indicative of the electricity flowing to each and every electric or electronic device within a home (such as every device connected to the home's electrical system and drawing power therefrom). The wireless EM device may wirelessly identify the electricity flow to and from each electric or electronic device based upon each device's unique electronic signature (or "fingerprint"). The EF data may be monitored for trends, and/or abnormal or unexpected conditions, and based upon the trends and/or abnormal electricity flow one or more corrective actions may be taken. The corrective actions may mitigate or prevent insurance-related events, such as electrical fires or suddenly failed equipment at the most inconvenient time.

The electricity usage or flow data for individual electric or electronic devices that are located within, or powered by, a home generated by the EM device may be used for various purposes, such as (1) device and appliance fault, irregularity, and/or degradation detection; (2) preventative maintenance programs or logs; (3) control and optimization of energy usage within a home; (4) safe and/or low energy usage compliance programs; (5) risk evaluation and underwriting; (6) insurance claim verification; (7) insurance fraud or "buildup" detection (e.g., theft or arson); (8) insurance-related event or disaster reconstruction and analysis (e.g., cause of a fire); (9) analysis of quality and stability of energy/electricity received from an energy provider; (10) home occupancy detection, monitoring, and verification, and subsequently risk profile adjustment for insureds and/or the home; (11) home, auto, life, health, and personal articles insurance discount or rewards programs; (12) quote generation for home, auto, and/or personal articles insurance; (13) updating risk profiles associated with (i) homes, (ii) personal articles and/or electric devices within or about a home, and/or (iii) vehicles that routinely connect and exchange electrical power with the home's electrical system; (14) determining electric arc sparking; (15) identifying home wiring degradation or issues; and/or other purposes, including those discussed elsewhere herein.

The EF data or other data generated by the EM device may be combined with other sources of data, such as home telematics data, vehicle telematics data, data gathered from consumer wearable devices and/or mobile devices, and/or data gather by other electronic devices. The combined data may be used for various purposes, including the purposes discussed directly above and elsewhere herein.

In one aspect, a computer-implemented method of taking corrective action based upon abnormal electricity usage within a home may be provided. The method may include (1) building, via one or more processors, a historic or an expected electricity usage, flow, and/or consumption profile for a home and electric devices therein, the expected electricity usage, flow, and/or consumption profile including day-of-week and time-of-day information, and may be based upon electricity detected by a wireless Electricity Monitoring (EM) device (which may include one or more processors, sensors, and/or transceivers) over a period of time; (2) monitoring, via the wireless EM device, current home and individual electric device/appliance electricity usage, flow, and/or consumption via the EM device, the EM device being an electric or electronic component that wirelessly detects unique electric or electronic signatures of each electric or electronic device being powered by the home's electricity or electrical system; (3) comparing, via the one or more processors, the current electricity usage, flow, and/or consumption with the expected electricity usage, flow, and/or consumption to detect an abnormal electricity usage or abnormal trend; and/or (4) when the abnormal electricity usage or trend is detected, via the one or more processors, take a corrective action to mitigate or prevent potential damage to the home or the electric devices being monitored. The method may include additional, less, or alternate actions, including those discussed elsewhere herein.

In another aspect, a computer-implemented method of determining home occupancy may be provided. The method may include (1) monitoring, via a wireless Electricity Monitoring (EM) device (which may include one or more processors, sensors, and/or transceivers), (i) current home electricity usage, flow, and/or consumption, and/or (ii) current individual electric device/appliance electricity usage, flow, and/or consumption, the EM device configured to wirelessly detect unique electric signatures of each electric device being powered via the home's electrical system; (2) receiving, via one or more processors and/or transceivers, data indicative of (i) current home electricity usage, flow, and/or consumption, and/or (ii) current individual electric device/appliance electricity usage, flow, and/or consumption from the EM device via wireless communication or data transmission over one or more radio links or communication channels; (3) determining, via one or more processors, an average amount of home occupancy (such as for a period of time) based upon the (i) current home electricity usage, flow, and/or consumption, and/or (ii) current individual electric device/appliance electricity usage, flow, and/or consumption (such as comparing actual home or appliance electricity usage, flow, and/or consumption with historic or expected electricity usage, flow, and/or consumption for a home presently occupied by one or more persons); (4) updating, via the one or more processors, (i) an home occupancy profile, or (ii) a risk profile for the home (or for the home owner, or a vehicle associated with the home) based upon the average amount of home occupancy; and/or (5) updating, via the one or more processors, an insurance discount for the home or insured home owner based upon the home occupancy profile and/or risk profile to facilitate providing insurance discounts to risk averse home owners or households. The method may include additional, less, or alternate actions, including those discussed elsewhere herein.

In another aspect, a computer system equipped with a machine learning program may be configured for evaluating the integrity of a home's electrical system and the electric devices therein may be provided. The computer system may include one or more processors, transceivers, and/or sensors configured to: (1) train a processing element (programmed with a machine learning program or algorithm) to identify deficiencies or degradation of electric devices based upon electricity flow, usage, or consumption (EF) data gathered or generated by a wireless Electricity Monitoring (EM) device, the EM device configured to wirelessly identify individual electricity flow to a specific electric device and/or correlate that individual electricity flow to that specific electric device based upon the unique electrical signature of the specific electric device; (2) receive, via a communication element (such as via wired or wireless communication or data transmission over one or more radio links or communication channels), current electricity flow, usage, or consumption (EF) data for the home and electric devices therein gathered or generated by the wireless Electricity Monitoring (EM) device; (3) analyze the current EF data for the home and electric devices therein with the trained processing element to determine or detect one or more deficiencies or degradations for the home and electric devices therein; and/or (4) initiate, via the processing element, a corrective action that mitigates or prevents damage to the home or the electric device when one or more deficiencies or degradations for the home and electric devices therein are detected to facilitate proactive home monitoring and maintenance. The system may include additional, less, or alternate functionality, including that discussed elsewhere herein.

In another aspect, a computer-implemented method of identifying and correcting abnormal electrical activity about a structure may be provided. The method may include (1) monitoring, via an electricity monitoring device, during a first period of time, electrical activity comprising transmission of electricity via an electrical distribution board to a plurality of electric devices about the structure; (2) correlating, via one or more processors, the electrical activity with respective electric devices of the plurality of electric devices receiving the transmitted electricity, based upon an electrical signature unique to each respective electric device; (3) building, via the one or more processors, based at least upon the correlated electrical activity, a structure electrical profile including, for each respective electric device, data indicative of operation of the respective electric device during at least the first period of time; (4) identifying, via the one or more processors, an abnormal electrical activity about the structure, wherein the abnormal electrical activity is identified by comparing the structure electrical profile with electrical activity monitored via the electricity monitoring device; and/or (5) initiating, via the one or more processors, one or more corrective actions for mitigating or preventing damage about the structure as a result of the abnormal electrical activity. The method may include additional, fewer, or alternate actions, including those discussed elsewhere herein.

In another aspect, a computer-implemented method of determining occupancy of a structure may be provided. The method may include (1) monitoring, via an electricity monitoring device, electrical activity comprising transmission of electricity via an electrical distribution board to a plurality of electric devices about the structure; (2) correlating, via one or more processors, the electrical activity with respective electric devices of the plurality of electric devices receiving the transmitted electricity, based upon an electrical signature unique to each respective electric device; and/or (3) determining, via the one or more processors, based at least upon the correlated electrical activity, an average occupancy of the structure. The method may include additional, fewer, or alternate actions, including those discussed elsewhere herein.

In another aspect, a computer-implemented method of verifying an electrical event about a structure may be provided. The method may include (1) monitoring, via an electricity monitoring device, during a first period of time, electrical activity comprising transmission of electricity via an electrical distribution board to a plurality of electric devices about the structure; (2) correlating, via one or more processors, the electrical activity with respective electric devices of the plurality of electric devices receiving the transmitted electricity, based upon an electrical signature unique to each respective electric device; (3) receiving, via the one or more processors, an indication of an insurance claim associated with claimed damage to the structure or to one or more claimed devices of the plurality of electric devices; (4) analyzing, via the one or more processors, the correlated electrical activity to determine whether the claimed damage occurred; and/or (5) determining, via the one or more processors, a veracity of the insurance claim, based upon whether the claimed damage occurred. The method may include additional, fewer, or alternate actions, including those discussed elsewhere herein.

In another aspect, a computer-implemented method of determining risk associated a structure may be provided. The method may include (1) receiving, via one or more processors, an indication of a request for an insurance quote associated with the structure; (2) monitoring, via an electricity monitoring device, electrical activity comprising transmission of electricity via an electrical distribution board to a plurality of electric devices about the structure; (3) correlating, via the one or more processors, the electrical activity with respective electric devices of the plurality of electric devices receiving the transmitted electricity, based upon an electrical signature unique to each respective electric device; (4) estimating, via the one or more processors, based at least upon the correlated electrical activity, a level of risk associated with the structure; and/or (5) generating, via the one or more processors, based at least upon the estimated level of risk, one or more terms of an insurance quote associated with the structure. The method may include additional, fewer, or alternate actions, including those discussed elsewhere herein.

In another aspect, a computer-implemented method of determining risk associated a home may be provided. The method may include (1) receiving, via one or more processors, an indication of a request for a home loan associated with the home; (2) monitoring, via an electricity monitoring device, electrical activity comprising transmission of electricity via an electrical distribution board to a plurality of electric devices about the structure; (3) correlating, via the one or more processors, the electrical activity with respective electric devices of the plurality of electric devices receiving the transmitted electricity, based upon an electrical signature unique to each respective electric device; (4) estimating, via the one or more processors, based at least upon the correlated electrical activity, a level of risk associated with the home; and/or (5) generating, via the one or more processors, based at least upon the estimated level of risk, one or more terms of a home loan associated with the home. The method may include additional, fewer, or alternate actions, including those discussed elsewhere herein.

In another aspect, a computer-implemented method of reconstructing an event associated with damage to a structure may be provided. The method may include (1) monitoring, via an electricity monitoring device, electrical activity comprising transmission of electricity via an electrical distribution board to a plurality of electric devices about the structure; (2) correlating, via one or more processors, the electrical activity with respective electric devices of the plurality of electric devices receiving the transmitted electricity, based upon an electrical signature unique to each respective electric device; (3) building, via the one or more processors, based at least upon the correlated electrical activity, a structure electrical profile including, for each respective electric device, data indicative of operation of the respective electric device; (4) receiving, via the one or more processors, an indication of an insurance claim associated with claimed damage to the structure; (5) identifying, via the one or more processors, a subset of the electrical activity occurring during or shortly before the time at which the claimed damage is claimed to have occurred; and/or (6) comparing, via the one or more processors, the subset of the electrical activity with the structure electrical profile to determine whether the claimed damage occurred involuntarily or voluntarily. The method may include additional, fewer, or alternate actions, including those discussed elsewhere herein.

In another aspect, a computer-implemented method of identifying and correcting abnormal electrical activity about a structure may be provided. The method may include (1) monitoring, via an electricity monitoring device, during a first period of time, first electrical activity comprising transmission of electricity via an electrical distribution board to a plurality of electric devices about the structure; (2) correlating, via one or more processing elements, the transmitted first electrical activity with respective electric devices of the plurality of electric devices receiving the transmitted electricity, based upon an electrical signature unique to each respective electric device; (3) training the one or more processing elements to identify abnormal electrical activity about the structure, based at least upon the correlated first electrical activity; (4) monitoring, via the electricity monitoring device, during a second period of time subsequent to the first period, second electrical activity comprising transmission of electricity via the electrical distribution board to the plurality of electric devices about the structure; (5) identifying, via the one or more trained processing elements, from the second electrical activity, an abnormal electrical activity about the structure; and/or (6) initiating, via the one or more processing elements, one or more corrective actions for mitigating or preventing damage to the structure as a result of the abnormal electrical activity. The method may include additional, fewer, or alternate actions, including those discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
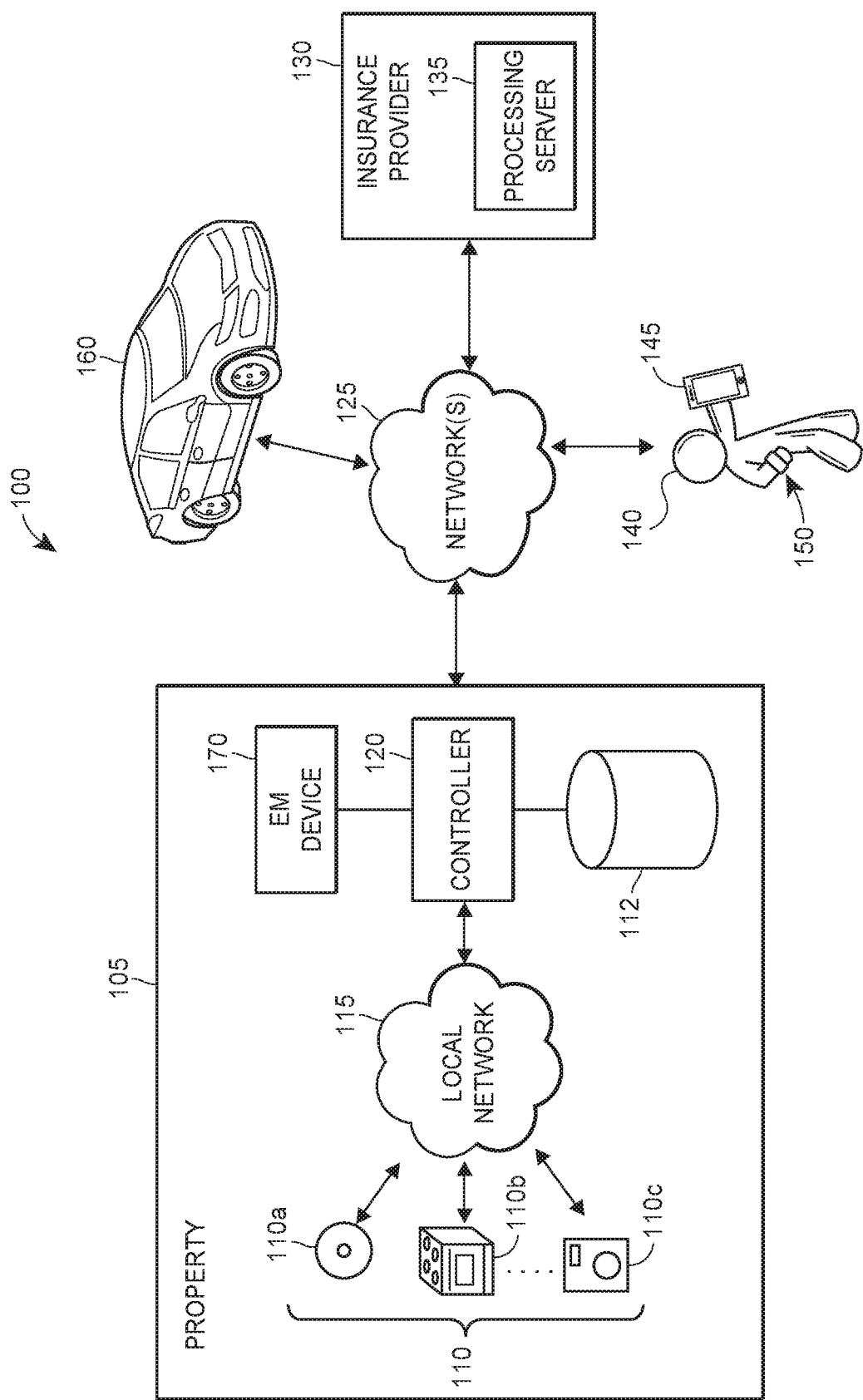
FIG. 1 depicts an exemplary system including an electricity monitoring (EM) device configured to wirelessly sense, retrieve, collect, generate, and/or compile device-specific electricity data, and components configured to facilitate corrective or remedial actions triggered by abnormal or unexpected electricity flow or usage.

The present embodiments may relate to, inter alia, monitoring electricity flow to, and within, a home or other type of property. Electricity flowing to individual electric devices, such as smart or other appliances, electronics, vehicles (e.g., cars, boats, motorcycles), and/or mobile devices may be detected and monitored for abnormal usage or trends. Abnormal electric flow to various devices may be indicate that failure is imminent, maintenance is required, device replacement is required or recommended, de-energization is recommended, or other corrective action is prudent.

In one aspect, a home may have a "smart" central controller that may be wirelessly connected, or connected via hard-wire, with various household related items, devices, and/or sensors. The central controller may be associated with any type of property, such as homes, office buildings, restaurants, farms, and/or other types of properties. The central controller may be in wireless or wired communication with various "smart" items or devices, such as smart appliances (e.g., clothes washer, dryer, dish washer, refrigerator, etc.); smart heating devices (e.g., furnace, space heater, etc.); smart cooling devices (e.g., air conditioning units, fans, ceiling fans, etc.); smart plumbing fixtures (e.g., toilets, showers, water heaters, piping, interior and yard sprinklers, etc.); smart cooking devices (e.g., stoves, ovens, grills, microwaves, etc.); smart wiring, lighting, and lamps; smart personal vehicles; smart thermostats; smart windows, doors, or garage doors; smart window blinds or shutters; and/or other smart devices and/or sensors capable of wireless or wired communication. Each smart device (or sensor associated therewith), as well as the central controller, may be equipped with a processor, memory unit, software applications, wireless transceivers, local power supply, various types of sensors, and/or other components.

The central controller may also be in wired or wireless communication with an Electricity Monitoring (EM) device. The EM device may wirelessly detect and monitor the electricity flow to, or usage or consumption by, each smart or other electric component within, or in proximity to, the home. The central controller may also combine the Electricity Flow (EF) data generated by the EM device with other types or sources of data, such as interconnected home telematics data, autonomous or smart vehicle telematics data, home or vehicle telematics data gathered by a mobile device (e.g., smart phone, smart glasses, smart watch, etc.), wearable electronic data, mobile device data, etc.

For instance, an insurance customer (who may be referred to interchangeably herein as an "insured," "insured party," "policyholder," "customer," "claimant," and/or "potential claimant") may opt-in to an insurance rewards or discount program. The customer may send EF data associated with their home that was or is generated by the EM device, along with various types of telematics data (home, auto, mobile device, etc.), to an insurance provider remote server via wireless communication or data transmission over one or more radio links or communication channels. In return, risk averse home owners and insured may be provided with insurance discounts or other insurance-cost savings after the EF data and/or telematics data is analyzed by the remote server.

In some embodiments, each of the smart devices may be included on an electronic or other inventory list associated with the property. Further, the inventory list may include a monetary value associated with each smart device. In some embodiments, the monetary value may correspond to the replacement value, the MSRP, or other metric associated with the corresponding smart device. The monetary value may be manually entered by a user or automatically determined based upon various factors. The smart devices themselves may store the monetary value, such as in a data tag or other type of storage or memory unit. The inventory list may further detail a location (e.g., GPS coordinates, a room of the property, an area or section of the property, or other location indication) of each of the smart devices. In this regard, multiple of the smart devices may be associated with a single area or location of the property (e.g., a basement, a bathroom, a kitchen, a first floor, etc.).

In addition to gathering data generated by the EM device associated with electricity usage/flow/consumption, the central controller may also remotely gather data from the smart devices (or sensors associated therewith) dispersed around or otherwise interconnected within the property. The central controller may further receive data from an insurance provider remote server (or other third party sources) that monitors potential risks to the property, such as inclement weather, crime patterns, recall data pertaining to items disposed on or proximate to the property, and/or other risks. The central controller may analyze all of the data and automatically detect actual or potential issues that may result in damage to the property. In some cases, the data from the EM device and/or smart devices may indicate damage and/or risk of damage to the property. After analyzing the data or otherwise detecting the presence of the EM device and/or smart devices, the central controller may facilitate various insurance policy processing and applications.

Generally, the information gathered by the central controller from EM device, as well as the various smart devices and/or sensors disbursed around the property, may be utilized for insurance purposes. The information may be used to process or manage insurance covering the home, residence or apartment, personal belongings, vehicles, etc. The systems and methods therefore offer a benefit to customers by automatically adjusting insurance policies based upon an accurate assessment of personal property value. Further, the systems and methods may be configured to automatically populate proposed insurance claims resulting from property damage via data gathered from smart devices. These features reduce the need for customers to manually assess property value and/or manually initiate insurance claim filing procedures. Further, as a result of the automatic claim generation, insurance providers may experience a reduction in the amount of processing and modifications necessary to process the claims. Moreover, by implementing the systems and methods, insurance providers may stand out as a cost-effective insurance provider, thereby retaining existing customers and attracting new customers. It should be appreciated that further benefits to the systems and methods are envisioned.

Exemplary System and Components

FIG. 1 depicts an exemplary system including a wireless Electricity Monitoring (EM) device configured to wirelessly sense, retrieve, collect, generate, and/or compile device-specific electricity data, and components configured to facilitate corrective actions, such as actions triggered by abnormal or unexpected electricity flow or usage. Although FIG. 1 depicts certain entities, components, and devices, it should be appreciated that additional or alternate entities and components are envisioned.

As illustrated in FIG. 1, the system 100 may include a property 105 that contains a controller 120, a plurality of devices 110, and an Electricity Monitoring (EM) device 170 that may be each connected to a local communication network 115 (or the controller 120 directly or indirectly). Each of the plurality of devices 110 and/or the EM device 170 may be a "smart" device that may be configured with one or more sensors capable of sensing and communicating operating data associated with the corresponding device 110.

As shown in FIG. 1, the plurality of devices 110 may include, as just a few examples, a smart alarm system 110a, a smart stove 110b, and a smart washing machine 110c. Each of the plurality of devices 110, as well as the EM device 170, may be located within or proximate to the property 105 (generally, "on premises" or "about the property 105"). Although FIG. 1 depicts only one property 105, it should be appreciated that multiple properties may be envisioned, each with its own controller and devices. Further, it should be appreciated that additional or fewer devices may be present about the property 105. For example, devices present i the property 105 may include a refrigerator, a microwave, a toaster, a television, a computer, telephone, a sound system, a light bulb or another lighting fixture, a washer, a dryer, an electrically-powered heating system, air conditioning system, water heater, and/or other suitable devices. Finally, it should be understood that, while a home is generally described herein, the property 105 may be an office building or another suitable property or structure.

In some cases, the plurality of devices 110 may be purchased from a manufacturer with the "smart" functionally incorporated therein. In other cases, the plurality of devices 110 may have been purchased as "dumb" devices and subsequently modified to add the "smart" functionality to the device. For example, a homeowner may purchase an alarm system that installs sensors on or near a door to detect when a door has been opened and/or unlocked.

Additionally, the plurality of devices 110, and/or the EM device 170, may be configured to communicate either directly or indirectly with controller 120, such as via the local communication network 115. The local communication network 115 may facilitate any type of data communication between devices and controllers located on or proximate to the property 105 via any standard or technology (e.g., LAN, WLAN, any IEEE 802 standard including Ethernet, and/or others). The local communication network 115 may further support various short-range communication protocols such as Bluetooth®, Bluetooth® Low Energy, near field communication (NFC), radio-frequency identification (RFID), and/or other types of short-range protocols.

According to aspects, the plurality of devices 110, as well as the EM device 170, may transmit, to the controller 120 via the local communication network 115, operational data gathered from sensors associated with the plurality of devices 110, such as via wired or wireless communication or data transmission over one or more radio links or communication channels. The operational data may be audio data, image or video data, status data, and/or other data or information, including EF data generated by the EM device for each electric component or outlet within a home. For the plurality of devices 110, the operational data may indicate that a window has been shattered; the presence of a person, fire, or water in a room; the sound made near a smart device; and/or other information pertinent (such as data indicative of electricity flow or usage) to an operation state or status of the plurality of devices 110.

For the EM device 170, the operation data may include data indicative of electricity flow to and/or from various smart or other electronic devices, including the plurality of devices 110. The data may also include electricity or energy usage for each electronic component, device, outlet, etc. within a home—such as data indicating the electricity each device or room is using. For instance, energy usage of air conditioners, washers, dryers, dish washers, refrigerators, stoves, ovens, microwave ovens, televisions, lamps, outlets, computers, laptops, mobile devices, other electronic devices, etc. may all be determined by the EM device 170.

The EM device 170 may wirelessly detect each flow of electricity to and/or form each different electronic device by identifying each electronic device by its unique electronic or electrical signature (or "fingerprint"). The EM device 170 may then generate electricity usage or flow data for each electronic device within the home, or connected to the home's electrical system (such as a hybrid or fully electric vehicle 160 having its battery wiredly or wirelessly charged by the home's electrical system).

The operational data, including EF data, may include a timestamp representing the time that the operational data was recorded. In some cases, the plurality of devices 110, as well as the EM device 170, may transmit, to the controller 120, various data and information associated with the plurality of devices 110. In particular, the data and information may include location data within the property, as well as various costs and prices associated with the plurality of devices 110. For example, a washing machine may include a component such as a data tag that stores a location of the washing machine within the property 105, a retail price of the washing machine, and replacement costs of various parts of (or the entirety of) the washing machine. The various data and information may be programmable and updatable by an individual or automatically by the controller 120.

The controller 120 may be coupled to a database 112 that stores various operational data and information associated with the plurality of devices 110. Although FIG. 1 depicts the database 122 as coupled to the controller 120, it is envisioned that the database 122 may be maintained in the "cloud" such that any element of the system 100 capable of communicating over either the local network 115 or one or more other networks 125 may directly interact with the database 122. In some embodiments, the database 112 organizes the operational data according to which individual device 110 that the data may be associated with and/or the room or subsection of the property in which the data was recorded. Further, the database 112 may maintain an inventory list that may include the plurality of devices 110 as well as various data and information associated with the plurality of devices 110 (e.g., locations, replacement costs, etc.).

The controller 120 may be configured to communicate with other components and entities, such as an insurance provider 130 via the network(s) 125. According to embodiments, the network(s) 125 may facilitate any data communication between the controller 120 located on the property 105 and entities or individuals remote to the property 105 via any standard or technology (e.g., GSM, CDMA, TDMA, WCDMA, LTE, EDGE, OFDM, GPRS, EV-DO, UWB, IEEE 802 including Ethernet, WiMAX, and/or others). In some cases, both the local network 115 and the network 125(s) may utilize the same technology.

Generally, the insurance provider 130 may be any individual, group of individuals, company, corporation, or other type of entity that may issue insurance policies for customers, such as a homeowners, renters, or personal articles insurance policy associated with the property 105 or an insured. According to the present embodiments, the insurance provider 130 may include one or more processing server(s) 135 configured to facilitate the functionalities as discussed herein. Although FIG. 1 depicts the processing server 135 as a part of the insurance provider 130, it should be appreciated that the processing server 135 may be separate from (and connected to or accessible by) the insurance provider 130. Further, although the present disclosure describes the systems and methods as being facilitated in part by the insurance provider 130, it should be appreciated that other non-insurance related entities may implement the systems and methods. For example, a general contractor may aggregate the insurance-risk data across many properties to determine which appliances or products provide the best protection against specific causes of loss, and/or deploy the appliances or products based upon where causes of loss are most likely to occur. Accordingly, it may not be necessary for the property 105 to have an associated insurance policy for the property owners to enjoy the benefits of the systems and methods.

Generally, the controller 120 may be configured to facilitate various insurance-related processing associated with insurance policies for the property 105. In one aspect, the controller 120 may update a total value of the devices 110 and determine any corresponding adjustments to an insurance policy for the devices 110. In another aspect, the controller 120 may pre-populate proposed insurance claims based upon the detection of damage to the devices 110, as well as various location and pricing data associated with the devices 110. The controller 120 may communicate any generated or determined information to the insurance provider 130 (and vice-versa) via the network(s) 125 to facilitate the insurance-related processing.

The controller 120 may also be in communication, via the network(s) 125, with an electronic device 145 or wearable electronic device 150 associated with an individual 140 (such as via wireless communication or data transmission over one or more radio links or communication channels). In some embodiments, the individual 140 may have an insurance policy (e.g., a home insurance policy) for the property 105 or a portion of the property 105, or may otherwise be associated with the property 105 (e.g., the individual 140 may live in the property 105). The electronic device 145 may be a smartphone, a desktop computer, a laptop, a tablet, a phablet, a smart watch, smart glasses, smart contact lenses, wearable electronic device, or any other electronic or computing device.

Additionally or alternatively, the controller 120 may communicate, via the network(s) 125, with the electronic device 145 and/or the wearable electronic device 150 to receive device positioning (e.g., GPS) data from the devices 145 and/or 150, the positioning indicating a location of the individual 140 in possession of the devices 145 and/or 150. Generally, the device positioning data may be used to determine (e.g., at the controller 120 or at the processing server 135) a proximity of the individual 140 to the property 105. Effectively, the device positioning data may indicate that the individual was within the property 105 at a particular time in the past, or that the individual is presently within the property. Such positioning-based indications may be incorporated to perform many of the functions that will be described herein.

According to some embodiments, the controller 120 may transmit, via the network 125, a proposed insurance claim related to the property 105 to the electronic device 145. The proposed insurance claim may contain pre-populated fields that indicate various information and data, such as causes of loss (e.g., water, wind, fire, etc.); damaged devices; costs associated with the damaged devices; time, date, location of the insurance-related event; and/or other information included in an insurance claim. The controller 120 may also transmit any modifications to insurance policies based upon detected data from the plurality of devices 110. In response, the homeowner 140 may accept the proposed insurance claim or make modifications to the proposed insurance claim, or otherwise accept/reject any modifications to the insurance policy. The electronic device may transmit, via the network 125, the accepted or modified insurance claim back to the controller 120. The controller 120 may facilitate any processing of the insurance claim with the processing server 135 of the insurance provider 130. In some implementations, the processing server 135 may facilitate the proposed insurance claim communications and processing directly with the customer 140. The exemplary system may include additional, less, or alternate components.

The controller 120 may also be in communication, via the network(s) 125, with a vehicle 160 associated with an individual 140 or home. The vehicle 160 may be an autonomous vehicle, semi-autonomous vehicle, smart vehicle, electric or hybrid vehicle, or other vehicle configured for wireless communication and data transmission over one or more radio links or communication channels.

Exemplary System for Monitoring Electrical Activity

Figure 2:
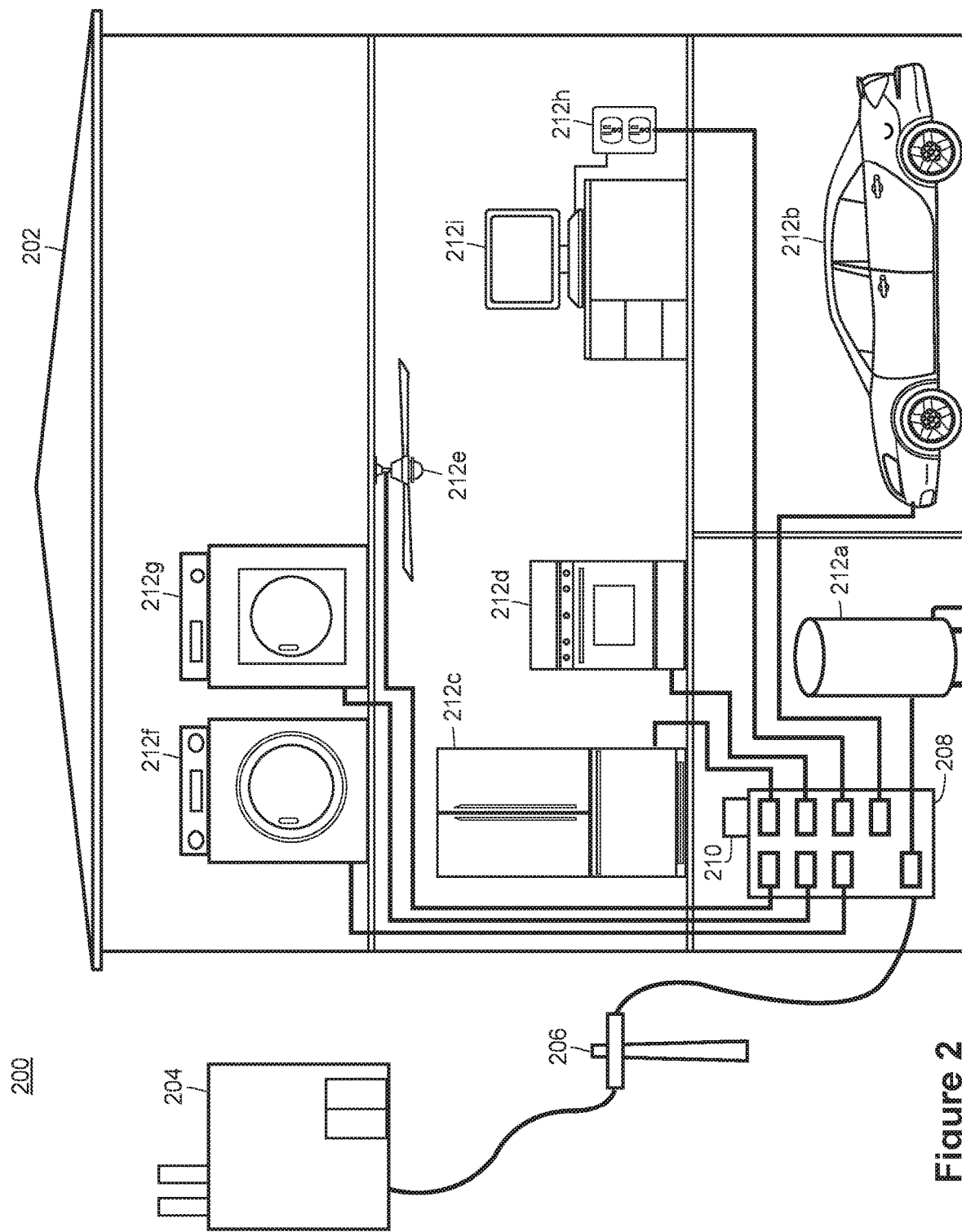
FIG. 2 illustrates an exemplary system configured to monitor electrical activity about a structure such as a home.

FIG. 2 illustrates an exemplary system 200 configured to monitor electrical activity including electricity usage about a home 202. Though a home 202 is depicted, the home may instead be another type of structure (e.g., a structure housing offices and/or a business).

Conventionally, the home 202 may be powered by electricity received, for example, from a power plant 204 via an electrical power grid 206. Other sources of electricity (e.g., another widespread electrical network, a local generator, a local solar panel array, etc.) are possible.

In any case, upon entering the home 202, the electricity may be routed (e.g., via a hot wire) to an electrical distribution board (also known and referred to as a "breaker box" or "breaker panel") 208 generally located within or about the home 202. The electrical distribution board 208 may divide the received electricity between a plurality of circuits, each of which in turn transmit electricity to a respective one or more electric devices within, around, or generally near or about the home 202. In each of the plurality of circuits, a circuit breaker or fuse may protect against excess current at the circuit.

As depicted in FIG. 2, electricity may be transmitted via the electrical distribution board 208 to the electric devices 212a-212i about the home 202, the electric devices 212a-212i including an electric water heater 212a, an electrically powered vehicle 212b, a refrigerator 212c, a stove 212d, a lighting fixture 212e, a laundry washer 212f, and a dryer 212g. Further, devices about the home 202 may include an electrical outlet 212h, to which another one or more electric device, such as a television 212i, may be connected. The electric devices 212a-212i are only exemplary, and it should be understood that other electric devices (e.g., sensors, appliances, utility systems, electronics, etc.) may be among the electric devices about the home 202 receiving electricity via the electric distribution board 208. Further, it should be understood that, as used herein, "electric devices about the home" or "electric devices about a structure" are not limited to electric devices physically located within the interior of the home or other structure 202, but instead may additionally or alternatively include electric devices physically located outside of or generally around the home or other structure 202 (e.g., a porch light, an electric grill, etc.), wherein the electric devices are powered by electricity received via the electrical distribution board 208.

In operation, as one or more of the electric devices 212a-212i receive electricity via the electric distribution board 208, each device of the electric devices 212a-212i may be differentiated by an electrical signature that is unique to a respective device. In other words, transmission of electricity to the refrigerator 212c (and/or other electrical activity associated with the refrigerator 212c), for example, may be differentiated from transmission of electricity to the stove 212d. Furthermore, transmission of electricity to the television 212i via the electrical outlet 212h (and/or other electrical activity associated with the television 212i and/or outlet 212h), for example, may be differentiated from transmission of electricity to another recipient electric device (e.g., a cable box) via the same electrical outlet 212h.

An electricity monitoring (EM) device 210 may be affixed to or situated near the electrical distribution board 208. Generally, the EM device 210 may utilize the unique, differentiable electrical signatures of the electric devices 212a-212i by wirelessly (and/or via wired connection to the electrical distribution board) monitoring electrical activity including transmission of electricity via the electrical distribution board 208 to one or more of the electric devices 212a-212i. Monitoring of transmission of electricity to an electric device receiving the electricity may include, for example, monitoring (i) the time at which the electricity was transmitted, (ii) the duration for which the electricity was transmitted, and/or (iii) the magnitude of the electric current in the transmission.

Based upon the unique electrical signatures of the electric devices 212a-212i, the monitored electrical activity may be correlated with respective electric devices 212a-212i receiving the electricity transmitted via the electrical distribution board 208. Further, electrical activity associated with other components of the home's electrical system (e.g., the electrical distribution board 208 or wiring about the home 202) may be correlated with one or more electric devices to which the electrical activity also pertains. In some embodiments, the EM device 210 may perform the correlation and/or other functions described herein, via one or more processors of the EM device 210 that may execute instructions stored at one or more computer memories of the EM device 210. In other embodiments, the electricity monitoring device 210 may monitor and record the electrical activity, and the correlation and/or other functions described herein may be performed at another system (e.g., a smart home controller or an insurance system), which may receive data and/or signals indicative of monitored electricity and/or other data via one or more processors and/or through transfer via a physical medium (e.g., a USB drive). In any case, correlation of the electrical activity with the respective electrical devices may produce data indicating, for example, the time, duration, and/or magnitude of electricity consumption by each of the electric devices 212a-212i during a period of electrical activity monitoring.

Based upon at least the correlated electrical activity, a structure electrical profile may be built and stored at the EM device 210 and/or at some other system (e.g., a smart home controller or an insurance system). The structure electrical profile may include, for each of the electric devices 212a-212i about the home 202, data indicative of operation of the respective electric device during at least the period at which the EM device 210 monitored electrical activity about the home 202.

Operation data regarding an electric device may include, for example, historical data indicating the electric device's past operation patterns or trends. For example, historical data may indicate a time of day, day of the week, time of the month, etc., at which an electric device frequently uses electricity (e.g., a lighting fixture 212e may not use electricity during late night hours of the day). As another example, historical data may include the electric device's total electricity consumption or usage rate over a period of time. Additionally or alternative, historical data may include data indicating past events regarding the electric device (e.g., breakdowns, power losses, arc faults, etc.).

Additionally or alternatively, operation data regarding an electric device may include an expected electricity consumption or baseline electricity consumption for the electric device. For example, in the case of a refrigerator 212c, the refrigerator 212c's electricity consumption during a first period of monitoring may be reliably used to approximate an expected electricity consumption at a later time.

Further, the structure electrical profile may include data pertaining to the structure as a whole. For example, the structure electrical profile may include data reflecting a total electricity or average usage rate over a period of time. As another example, the profile may include time-of-day, day-of-week, etc., data reflecting times at which the home 201 as a whole uses more or less electricity. Further, the profile may detail specific types, classes, or specifications of electric devices that behave differently or consume a different amount of electricity compared to other electric devices within the home 202. Further, the profile may detail specific risks determined to be relevant to one or more of the electric devices 212a-212i or to the home 202 as a whole, based upon the electrical activity of the electric devices 212a-212i.

Furthermore, the structure electrical profile may include a digital "map" of the home 202. A home map may indicate spatial locations of the electric devices 212a-212i, and/or spatial relationships between two or more of the electric devices 212a-212i. Such mapping may indicate, for example, a risk associated with the spatial placement of the stove 212d, and/or a risk associated with placing the refrigerator 212c adjacent to the stove 212d. Additionally or alternatively, the home map may indicate which of the electric devices 212a-212i are connected to each electrical circuit within the electrical system of the home 202. Such mapping may indicate, for example, a risk of overloading a particular circuit based upon a number or intensity of electric devices connected to the circuit. As another example, the home map may be used to determine what electric devices may lose power if a particular circuit were to be de-energized (e.g., due to risk or abnormal electrical activity associated with one electric device on the circuit).

In any case, in some embodiments, the home map may be configurable by a user (e.g., a homeowner of the home 202). The user may, for example, configure the map via an I/O module (e.g., screen, keypad, mouse, voice control, etc.) of the EM device 210, or via an I/O module of another computing device, which may transmit the home map to the EM device 210. Additionally or alternatively, the home map may be stored at one or more computer memories of another system (e.g., an insurance entity, or a smart home controller).

In some embodiments, the system 200 may include one or more smart components. For example, a smart home controller may be present about the home 202, and at least one of the electric devices within the home may be a smart device (e.g., a smart appliance or a smart vehicle). The smart home controller may further be in communication with one or more sensors that may be located on or otherwise associated with electric devices and/or other fixtures about the home 202. Such sensors and smart devices may transmit to the smart home controller data (e.g., usage data, error signals, telematics, etc.) that, alone or combined with the functions of the EM device 210 discussed herein, may produce further indication of electrical activity about the home 202. The smart home controller may be configured for wireless communication with each sensor and/or associated item interconnected with a smart home system or wireless network (e.g., the system 100 of FIG. 1).

Accordingly, the structure electrical profile may be built additionally based upon telematics data associated with the home 202. Telematics data may include, for example, (i) home telematics data (e.g., appliance usage data) received from smart devices and/or sensors, (ii) vehicle telematics data received from a smart and/or autonomous vehicle, (iii) mobile device telematics data (e.g., positioning data) received from a mobile device associated with an occupant of the home 202, and/or (iv) any other telematics data described herein, particularly with regard to FIG. 1. Telematics data may be received at the EM device 210 and/or at some other system that builds the structure electrical profile.

Additionally or alternatively, the structure electrical profile may be built based upon positioning (e.g., GPS) data from a mobile device of a party associated with the home 202, the positioning indicating of the party at any particular time. For example, the structure electrical profile may be built to indicate historical electrical activity and/or expected future electrical activity based upon whether the party is within the home 202

The system 200 may include additional, fewer, or alternate components and functionality, including the components and functionality discussed elsewhere herein. Further, one or more components of the system 200 may be similar or identical components to analogous components illustrated and described with regard to FIG. 1. In other words, the functionality of the system 200 described herein may be combined with the functionalities of the system 100 of FIG. 1.

Exemplary Methods of Loss Prevention & Mitigation

Generally, electrical activity about a structure may be monitored via an electricity monitoring (EM) device to detect or identify abnormal electrical activity about (i.e. within or proximal to) a structure such as a home. The EM device may monitor electrical activity during a first period of time, and monitored electrical activity may be correlated with respective electric devices about the structure by utilizing a unique electrical signature that exists for each respective device. Based upon the correlated electrical activity, a structure electrical profile may be built, and the profile may depict, for example, average electricity operation/usage, baseline electricity operation/usage, and/or expected electricity operation/usage/consumption. In effect, the structure electrical profile, based upon real electrical activity about the structure, may set forth what is "normal" operation and usage of electricity about the structure. Thus, once the structure electrical profile is built, any electrical activity monitored via the EM device at an electrical distribution board may be analyzed to determine whether electrical activity is abnormal. In response to the abnormal electrical activity, among other possible factors, corrective actions mitigate damage, prevent damage, and/or remedy the cause of the abnormal electrical activity the situation may be determined and/or initiated. Some possible corrective actions will be discussed herein.

Figure 3:
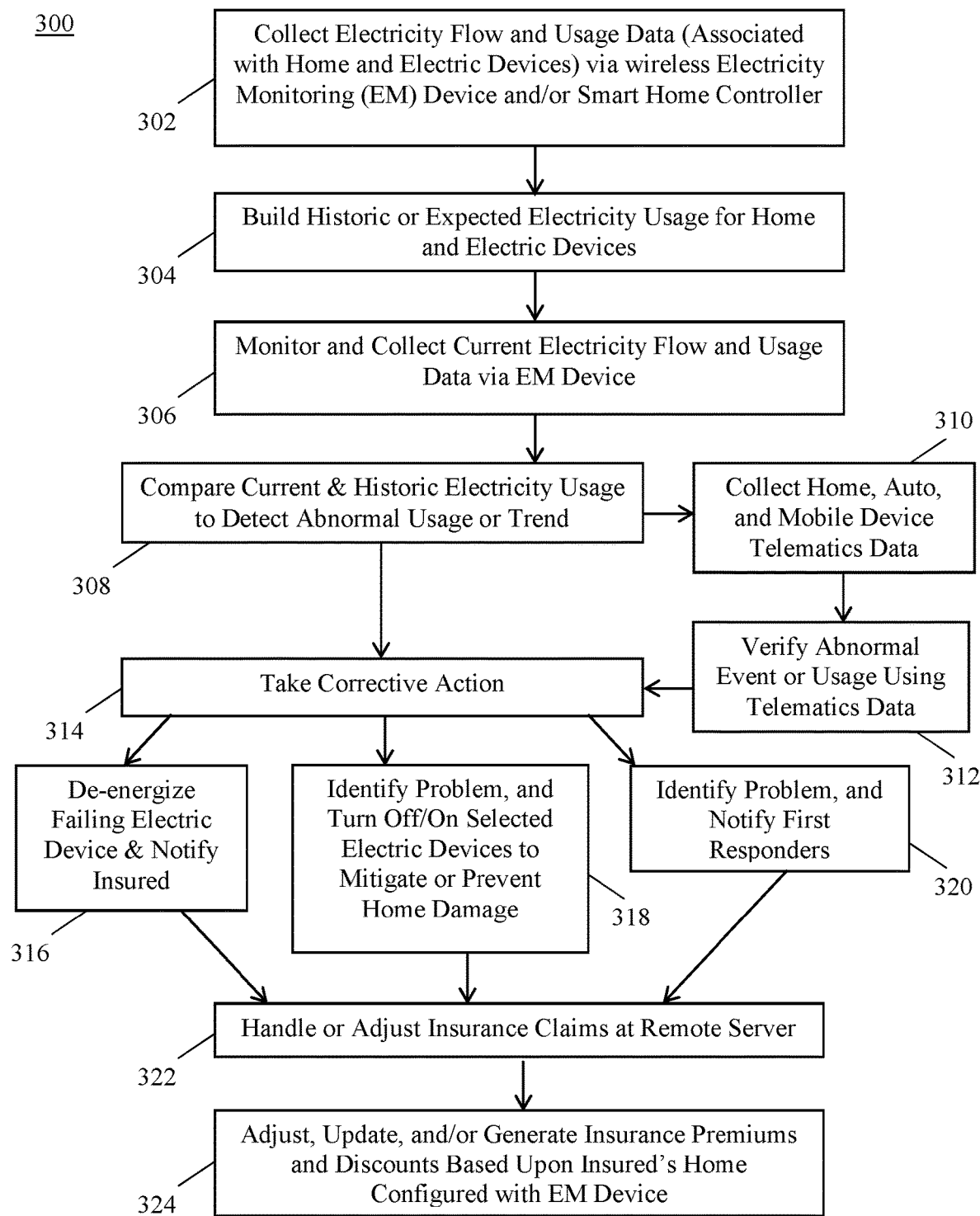
FIG. 3 illustrates an exemplary computer-implemented method of using electricity flow and usage data collected by an electricity monitoring (EM) device to mitigate and/or prevent damage to a home and personal belongings therein.

FIG. 3 illustrates an exemplary computer-implemented method 300 of using electricity flow and usage data collected by a wireless EM device to mitigate and/or prevent damage to a home and personal belongings therein. The method 300 may be performed, for example, by the system 100 of FIG. 1, the system 200 of FIG. 2, another suitable system, or some combination thereof. The method 300 may include mounting an EM device within a home; and then collecting electricity flow (EF), usage, and consumption data associated with the home and the electric devices therein via the EM device (block 302). The EF data may be stored in a memory local to the EM device and analyzed via one or more processors mounted within the EM device. Additionally or alternatively, the EM device may transmit the EF data collected or generated to a smart home controller and/or remote server for remote analysis.

The method 300 may include building a historic or expected electricity usage profile for the home and/or individual electric devices (block 304). For instance, the EM device may build a historic or expected electricity usage profile locally using the past EF data collected, or the smart home controller or remote server may do so remotely.

The method 300 may include monitoring and collecting current EF data via the EM device (block 306). One or more local or remote processors, such as the smart home controller or the EM device may compare the current EF data with the historic EF data to detect abnormal usage and/or trends (block 308).

The method 300 may optionally include collecting other types of data, such as home telematics data, vehicle telematics data, mobile device telematics and other data, and wearable electronics data (block 310). The abnormal electricity usage, event, or trends may be verified using the additional data collected (block 312), including the home or auto telematics data.

The method 300 may include taking one or more corrective actions (block 314) intended to mitigate or prevent home damage. For instance, the method 300 may include de-energizing failing electric device(s) and notifying the insured (block 316), such as via wireless communication over one or more radio links to their mobile device. The method 300 may include identifying a problem or abnormal condition, and turn on or off selected electric devices to mitigate or prevent home damage (block 318). For instance, no lights may be detected to be on at night with the home unoccupied. After which, the smart home controller may determine to turn on one or more outside lights, and/or rotate which lights are on inside of the home. Further, based upon the type or extent of problem identified (e.g., electrical fire), first responders may be notified and requested to respond to the event (block 320).

The method 300 may include handling or adjusting an insurance claim submitted via the customer's mobile device at an insurance provider remote server (block 322). The method 300 may include adjusting, updating, and/or generating insurance premiums and discounts based upon the insured's home being configured with an EM device (block 324). For instance, risk averse customers may employ EM or other smart devices, and then be rewarded with an insurance discount or other insurance-cost savings. The method 300 may include additional, less, or alternate actions, including those discussed elsewhere herein.

Figure 4:
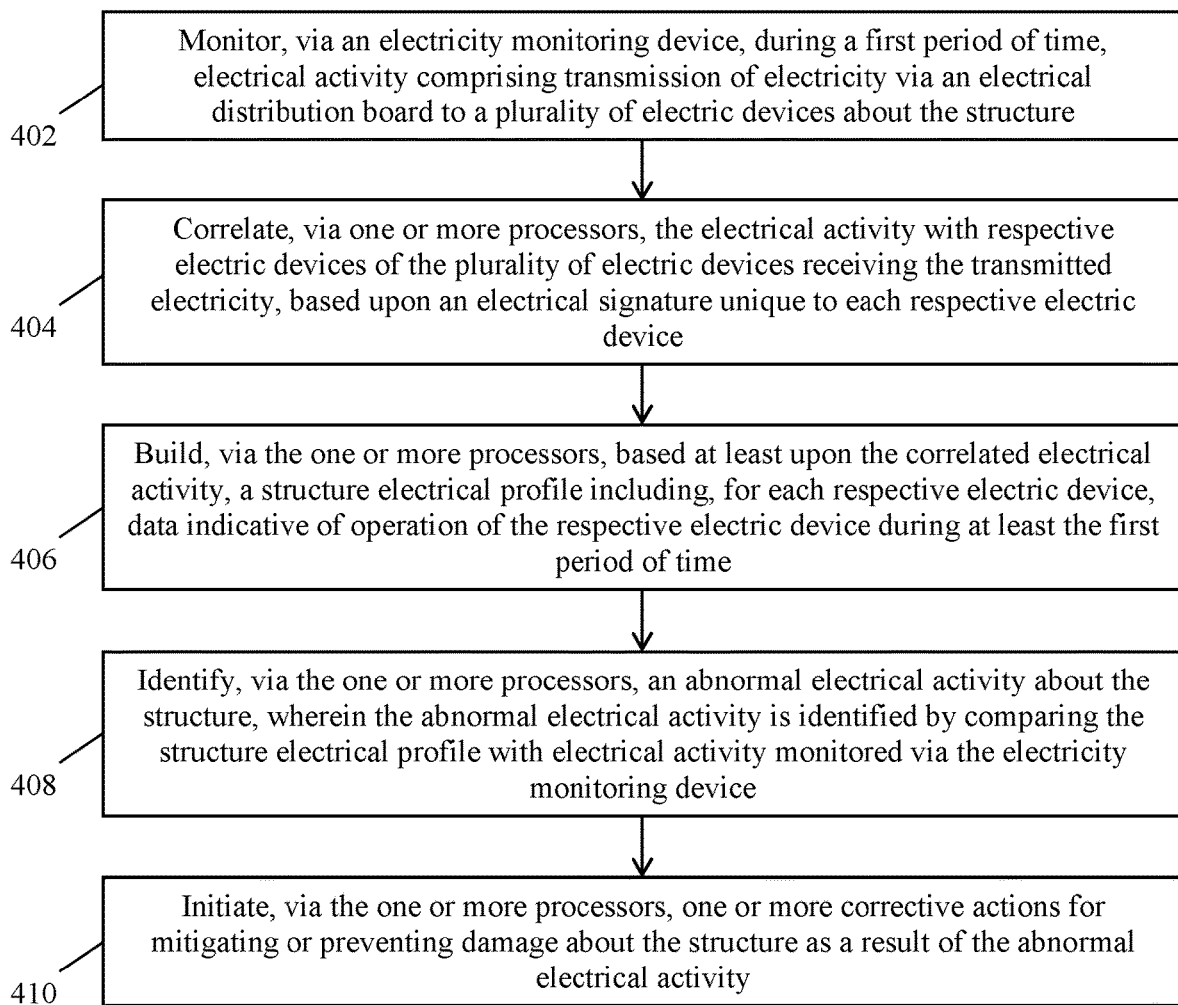
FIG. 4 depicts an exemplary computer-implemented method for detecting and correcting abnormal electrical activity about a structure.

FIG. 4 depicts a computer-implemented method 400 for detecting and/or correcting abnormal electricity operation about a structure, such as a home. Generally, the method 400 may be performed by the system 100 of FIG. 1, by the system 200 of FIG. 2, by another suitable system, or by some suitable combination thereof.

The method 400 may include monitoring, via an electricity monitoring (EM) device, during a first period of time, electrical activity comprising transmission of electricity via an electrical distribution board to a plurality of electric devices about the structure (block 402). A device of the plurality of electric devices may be, for example, any suitable electric device described herein with regard to FIG. 2, or otherwise described in this detailed description. A record of the monitored electrical activity may be stored, for example, at the EM device or at another system (e.g., an insurance system or a smart controller of the structure).

The method 400 may also include correlating, via one or more processors, the electrical activity with respective electric devices of the plurality of electric devices receiving the transmitted electricity, based upon an electrical signature unique to each respective electric device (block 404). In other words, the electricity monitored at the electrical distribution board by the EM device may be mapped to the individual electric devices to which the electricity was transmitted.

The one or more processors may include one or more processors of the EM device. In other words, one or more processors of the EM device itself may perform at least some of the processor-implemented functions described herein. Additionally or alternatively, the one or more processors may include one or more processors external to the electricity monitoring device. In other words, the EM device may transmit data and/or signals, via one or more processors of the EM device to another entity (e.g., an electricity provider entity or an insurance entity) to report the monitored electrical activity, and at least some processor-implemented functions described herein may be performed by one or more processors of the other entity.

The method 400 may also include building, via the one or more processors, based at least upon the correlated electrical activity, a structure electrical profile including, for each respective electric device, data indicative of operation of the respective electric device during at least the first period of time (block 406). Operation data of electric devices may include, for example, historical, average, expected, or baseline electricity consumption by one or more of the electric devices about the structure, as described herein with regard to FIG. 2. Further, the structure electrical profile may include, for example, electricity consumption data pertaining to the structure as a whole, as described wherein with regard to FIG. 2. The structure electrical profile may include additional or alternative profile data regarding the structure and/or the electric devices thereabouts, including any profile data described in this detailed description. The structure electrical profile may be stored at a computer memory of the EM device or at another system (e.g., an insurance system, or a smart home controller).

The method 400 may also include identifying, via the one or more processors, an abnormal electrical activity about the structure, wherein the abnormal electrical activity is identified by comparing the structure electrical profile with electrical activity monitored via the electricity monitoring device (block 408). In other words, the structure electrical profile may define normal electrical activity about the structure, and abnormal electrical activity may comprise any electrical activity that, when compared to corresponding or otherwise relevant profile data in the structure electrical profile, may be indicative of some abnormal condition within the structure.

The abnormal electrical activity may include electrical activity identified from the first period of time at which the EM device monitored the electrical activity. For example, from building the structure electrical profile, the one or more processors may determine that some electrical activity from the first period is a severe outlier (e.g., a rapid spike in electricity consumption by a particular electric device).

Additionally or alternatively, the abnormal electrical activity may include electrical activity identified from a second period of time at which the EM device monitors electrical activity about the structure. In other words, the EM device may continue to monitor electrical activity at the electrical distribution board after the first period of time, and the structure electrical profile may serve as a reference to identify abnormal electrical activity once the profile is built.

Identifying an abnormal electrical activity about the structure may include identifying a failing or faulty electric device. As just one example, abnormal electrical activity may include a laundry washer continuing to consume significant amounts of electricity even after a washing cycle would be expected to end (the expectation may be based, for example, upon profile data regarding the washer at the structure electrical profile). This phenomenon may suggest that the washer is stuck at some stage of a washing cycle, indicating some failure or fault of the washer.

Alternatively, an identified abnormal electrical activity associated with an electric device may be caused not by a failure or fault in the electric device itself, but instead of some other element of the structure. For example, abnormal electrical activity may include an electric heater consuming a greater amount of electricity than would be expected at a given time. This phenomenon may indicate a problem about the structure that is not electrical in nature, but that still poses risk to the structure (e.g., an open or broken window, or a displaced insulating material).

Additionally or alternatively, the abnormal electrical activity may include activity indicative of an arc fault or short circuit associated with an electric device, with the electrical distribution board, and/or with some other component of the structure's electrical system.

The method 400 may also include initiating, via the one or more processors, one or more corrective actions for mitigating or preventing damage about the structure as a result of the abnormal electrical activity (block 410).

The one or more corrective actions may include automatically de-energizing or turning off one or more electric devices. For example, if an electric device is identified as using an unsafe amount of electricity, the device may be de-energized before it can cause damage to the structure (e.g., a fire) and/or the electrical system therein. Additionally or alternatively, the one or more corrective actions may include opening one or more circuit breakers of the structure.

Additionally or alternatively, the one or more corrective actions may include notifying, via the one or more processors, an emergency response entity (e.g., a fire department) in response to the abnormal electrical activity. This corrective action may be particularly necessary if an abnormal electrical activity indicates an imminent threat (e.g., a fire) to the structure and/or to parties within the structure.

Additionally or alternatively, the one or more corrective actions may include (i) generating, via the one or more processors, an electronic or virtual message indicating the abnormal activity, and (ii) transmitting, via the one or more processors, the electronic or virtual message to a computing device (e.g., a smartphone) of a party (e.g., a homeowner) associated with the structure. In other words, at least one of the one or more corrective actions may be to notify a relevant party of the abnormal electrical activity. The message may include notification of one or more corrective actions already taken; additionally or alternatively, one or more corrective actions may be suggested via the message, and the party may approve the one or more corrective actions via an interaction at the party's computing device.

In any case, initiating the one or more corrective actions may include determining at least one of the one or more corrective actions based upon an identified location of a mobile device associated with the party. For example, the method 400 may include locating, via the one or more processors, a smartphone of a homeowner associated with the structure. Based upon whether the homeowner (as indicated by the smartphone) is within the structure or far from the structure, the one or more corrective actions may be determined. If the homeowner is determined to be within the structure, a corrective action may simply be to notify the homeowner of a potentially dangerous or imminently dangerous situation. If the homeowner is far from the structure, however, it may be more likely that a corrective action includes notifying an emergency response entity (e.g., a fire department) of the abnormal electrical activity.

Additionally or alternatively, the one or more corrective actions may include any other suitable corrective actions discussed in this detailed description.

In some embodiments, the method 400 may further include generating, via the one or more processors, an insurance discount for a party associated with the structure when one or more corrective actions are performed. Performance of one or more corrective actions may be associated with reduced risk to the structure or to a party (e.g., a homeowner) inhabiting the structure. The insurance discount may include a discount to a property insurance policy, a personal (e.g., life) insurance policy, and/or another suitable insurance policy. In any case, a notification (e.g., virtual message) of the insurance discount may be transmitted to a mobile computing device of a party associated with the structure and/or the insurance policy.

Additional, fewer, or alternative functions to the method 400 are possible. Additionally, one or more elements of the method 400 may proceed in an order different from that depicted in FIG. 4. For example, electrical activity about the structure may be correlated and/or the structure electrical profile built while the electricity monitoring device continues to monitor the electrical activity during the first period of time. As another example, in some instances, a particularly abnormal or severely dangerous electrical activity may be identified as the electrical activity is monitored during the first period (i.e., without need to compare with an electrical profile particular to the structure).

Triggering Corrective Action to Mitigate or Prevent Damage

In one aspect, a computer-implemented method of taking corrective action based upon abnormal electricity usage within a home may be provided. The method may be performed, for example, by the system 100 of FIG. 1, the system 200 of FIG. 2, another suitable system, or some combination thereof. The method may include (1) building, via one or more processors, a historic or an expected electricity usage, flow, and/or consumption profile for a home and electric devices, the expected electricity usage, flow, and/or consumption profile may include day-of-week and time-of-day information, and may be based upon electricity detected by a wireless Electricity Monitoring (EM) device (which may include one or more processors, sensors, and/or transceivers) over a period of time; (2) monitoring, via the wireless EM device, current home and individual electric device/appliance electricity usage, flow, and/or consumption via the EM device, the EM device being an electric or electronic component that wirelessly detects unique electric or electronic signatures of each electric or electronic device being powered by the home's electricity or electrical system; (3) comparing, via the one or more processors, the current electricity usage, flow, and/or consumption with the expected electricity usage, flow, and/or consumption to detect an abnormal electricity usage or abnormal trend; and/or (4) when the abnormal electricity usage or trend is detected, via the one or more processors, take a corrective action to mitigate or prevent potential damage to the home or the electric devices being monitored. The method may include additional, less, or alternate actions, including those discussed elsewhere herein.

For instance, the corrective action may be to generate, via the one or more processors, an electronic or virtual message indicating abnormal electricity usage by an electric or electronic device and recommending maintenance or a type of replacement device; and/or transmit, via the one or more processors and/or associated transceivers, the electronic or virtual message to a customer's mobile device via wireless communication or data transmission over one or more radio links or communication channels.

The abnormal electricity usage or trend may indicate more or less persons are occupying the home, and the method may include updating, via the one or more processors, a home occupancy profile to indicate that the home is occupied by more or less persons. The abnormal electricity usage or trend may additionally or alternatively indicate more or less pets are occupying the home, and the method may include updating, via the one or more processors, a home occupancy profile to indicate that the home is occupied by more or less pets.

The abnormal electricity usage or trend may indicate more or less persons are occupying the home, and the method may include updating, via the one or more processors, a risk profile for the insured, the home, personal articles, or a vehicle to indicate that the home is occupied by more or less persons. The corrective action may be to automatically de-energize an electric or electronic device, generate an electronic or virtual message detailing the event, and transmit the electronic or virtual message to a customer's mobile device.

The corrective action may be identify faulty or failing components or devices, generate an electronic or virtual message detailing the event and faulty or failing components or devices, and transmit the electronic or virtual message to a customer's mobile device asking whether the customer would like to de-energize the faulty or failing components or devices identified. The method may include generating an insurance discount for an insured that has a home equipped with the preventive or mitigative functionality discussed herein, including the EM device functionality.

The corrective action may be to identify, via the one or more processors, a failing or faulty light bulb; generate, via the one or more processors, an electronic or virtual message indicating the failing or faulty light bulb; and/or transmit, via the one or more processors and/or associated transceivers, the electronic or virtual message to a customer's mobile device via wireless communication or data transmission over one or more radio links or communication channels.

The corrective action may be to identify, via the one or more processors, an electric device to turn on or off; generate, via the one or more processors, an electronic or virtual message indicating the electric device recommended to be turned on or off; and/or transmit, via the one or more processors and/or associated transceivers, the electronic or virtual message to a customer's mobile device via wireless communication or data transmission over one or more radio links or communication channels for their review and/or approval.

The corrective action may be to identify, via the one or more processors, an electric device to turn on or off; turn, via the one or more processors, the electronic device on or off; generate, via the one or more processors, an electronic or virtual message indicating the electric device turned on or off; and/or transmit, via the one or more processors and/or associated transceivers, the electronic or virtual message to a customer's mobile device via wireless communication or data transmission sent over one or more radio links or communication channels for their review.

The corrective action may be to notify, via the one or more processors, an EMS provider of an event, and a GPS location or street address of the home. The corrective action may be to open, via the one or more processors, one or more breakers supplying electricity to the home and electronic devices therein. The corrective action may be to notify, via the one or more processors, a customer mobile device of an event.

The corrective action may be to reconstruct, via the one or more processors, a series of events prior to, during, and/or after an insurance-related event is detected and/or verified using other types of data (such as home or vehicle telematics data). The corrective action may be to reconstruct, via the one or more processors, a series of events prior to, during, and/or after an insurance-related event after a virtual insurance claim is submitted via a customer mobile device.

In another aspect, a computer system configured to take corrective action based upon abnormal electricity usage within a home may be provided. The system may include one or more processors, transceivers, sensors, and/or wireless Electricity Monitoring (EM) devices configured to: (1) build a historic or an expected electricity usage, flow, and/or consumption profile for a home and electric devices, the expected electricity usage, flow, and/or consumption profile including day-of-week and time-of-day information, and may be based upon electricity detected by the wireless Electricity Monitoring (EM) device over a period of time; (2) monitor, via the wireless EM device, current home and individual electric device/appliance electricity usage, flow, and/or consumption via the EM device, the EM device being an electric or electronic component that wirelessly detects unique electric or electronic signatures of each electric or electronic device being powered by the home's electricity or electrical system; (3) compare the current electricity usage, flow, and/or consumption with the expected electricity usage, flow, and/or consumption to detect an abnormal electricity usage or abnormal trend; and/or (4) when abnormal electricity usage or trend is detected, take a corrective action to mitigate or prevent potential damage to the home or the electric devices being monitored. The computer system may include additional, less, or alternate functionality, including that discussed elsewhere herein.

For instance, the corrective action may be to generate an electronic or virtual message indicating abnormal electricity usage by an electric or electronic device, and recommending maintenance or a type of replacement device; and/or transmit the electronic or virtual message to a customer's mobile device via wireless communication or data transmission over one or more radio links or communication channels. The abnormal electricity usage or trend may indicate more or less persons are occupying the home, and the system may be configured to update a home occupancy profile to indicate that the home is occupied by more or less persons. The abnormal electricity usage or trend may indicate more or less pets are occupying the home, and the system may be configured to update a home occupancy profile to indicate that the home is occupied by more or less pets.

The abnormal electricity usage or trend may indicate more or less persons are occupying the home, and the system may be configured to update a risk profile for the insured, the home, personal articles, or a vehicle to indicate that the home is occupied by more or less persons.

The corrective action may be to automatically de-energize an electric or electronic device, generate an electronic or virtual message detailing the event, and transmit the electronic or virtual message to a customer's mobile device.

The corrective action may be to identify faulting components or devices, generate an electronic or virtual message detailing the event and faulty components or devices, and transmit the electronic or virtual message to a customer's mobile device asking whether the customer would like to de-energize the faulty components or devices identified.

The system may be configured to generate an insurance discount for an insured that has a home equipped with the preventive or mitigative functionality discussed herein, including the EM device functionality.

The corrective action may be to identify a failing or faulty light bulb; generate an electronic or virtual message indicating the failing or faulty light bulb; and/or transmit the electronic or virtual message to a customer's mobile device via wireless communication or data transmission over one or more radio links or communication channels.

The corrective action may be to identify an electric device to turn on or off; generate an electronic or virtual message indicating the electric device recommended to be turned on or off; and/or transmit the electronic or virtual message to a customer's mobile device via wireless communication or data transmission over one or more radio links or communication channels for their review and/or approval.

The corrective action may be to identify an electric device to turn on or off; turn the electronic device on or off; generate an electronic or virtual message indicating the electric device turned on or off; and/or transmit the electronic or virtual message to a customer's mobile device via wireless communication or data transmission over one or more radio links or communication channels for their review.

The corrective action may be to notify an EMS provider of an event, and a GPS location or street address of the home. The corrective action may be to open one or more breakers supplying electricity to the home and electronic devices therein. The corrective action may be to send a virtual notification to a customer mobile device indicating an event or abnormal electricity flow has been detected.

The corrective action may be to reconstruct a series of events prior to, during, and/or after an insurance-related event is detected and/or verified using other types of data (such as home or vehicle telematics data). The corrective action may be to reconstruct a series of events prior to, during, and/or after an insurance-related event after a virtual insurance claim is submitted via a customer mobile device.

Exemplary Home Occupancy Determinations & Profile Updates

Generally, electrical activity about a structure (e.g., a home) may be monitored via an electricity monitoring (EM) device to determine an occupancy or average occupancy of the structure. The EM device may monitor electrical activity, and monitored electrical activity may be correlated with respective electric devices about the structure by utilizing a unique electrical signature that exists for each respective device. Based at least upon the correlated activity, an occupancy average occupancy of the structure may be determined.

Figure 5:
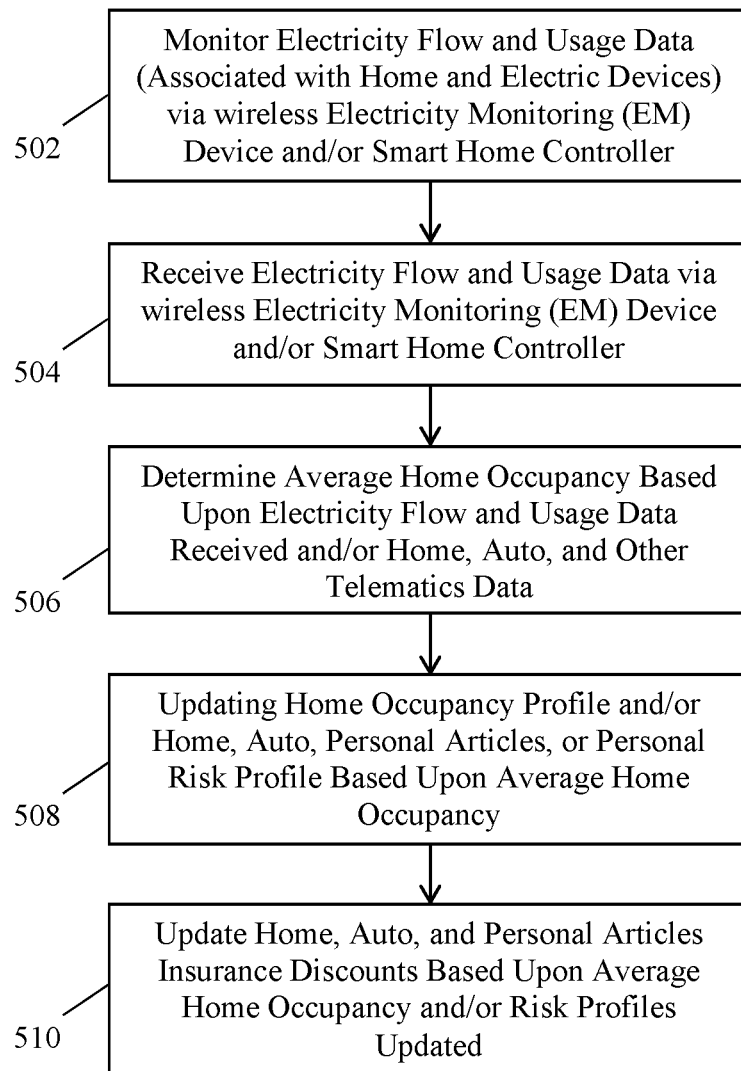
FIG. 5 illustrates an exemplary computer-implemented method of using electricity flow and usage data collected by an electricity monitoring (EM) device to build or update a home occupancy profile.

FIG. 5 illustrates an exemplary computer-implemented method 500 of using electricity flow and usage data collected by a wireless EM device to build or update a home occupancy profile. The method 500 may be performed, for example, by the system 100 of FIG. 1, the system 200 of FIG. 2, another suitable system, or some combination thereof. The method 500 may include monitoring electricity flow, usage, and consumption data associated with a home and/or individual electric devices within the home (block 502). The electricity flow, usage, and consumption may be monitored directly by a wireless EM device, and/or indirectly via a smart home controller, or a remote server, in wired or wireless communication with the EM device.

The method 500 may include receiving current electricity flow, usage, and consumption data for the home and/or individual electric devices (block 504). The EF data may be received at a remote server, such as received either directly from the wireless EM device and/or indirectly from the smart home controller. Additionally or alternatively, the EF data may be received and analyzed locally, such as at the smart home controller.

The method 500 may include determining an average home occupancy or occupancy profile based upon (i) the EF data received, and (ii) other data, such as home telematics data, vehicle telematics data, mobile device telematics data, mobile device data, and/or wearable device data (block 506). The home telematics data, vehicle telematics data, mobile device telematics data, mobile device data, and/or wearable device data may include, inter alia, image, infrared, sensor, and/or GPS data. Additionally or alternatively, an average home occupancy or occupancy profile may be updated based upon the EF data received.

The method 500 may include (i) updating a home occupancy profile, and/or (ii) updating or adjusting home, auto, personal, and/or personal articles risk profiles based upon the average home occupancy (block 508) determined based upon the EF data, and optionally in combination with other types of data, including home and vehicle telematics data.

The method 500 may include updating or generating home, auto, and personal articles insurance discounts based upon the average home occupancy and risk profiles updated based upon the EF data (block 510). The method 500 may include additional, less, or alternate actions, including those discussed elsewhere herein.

Figure 6:
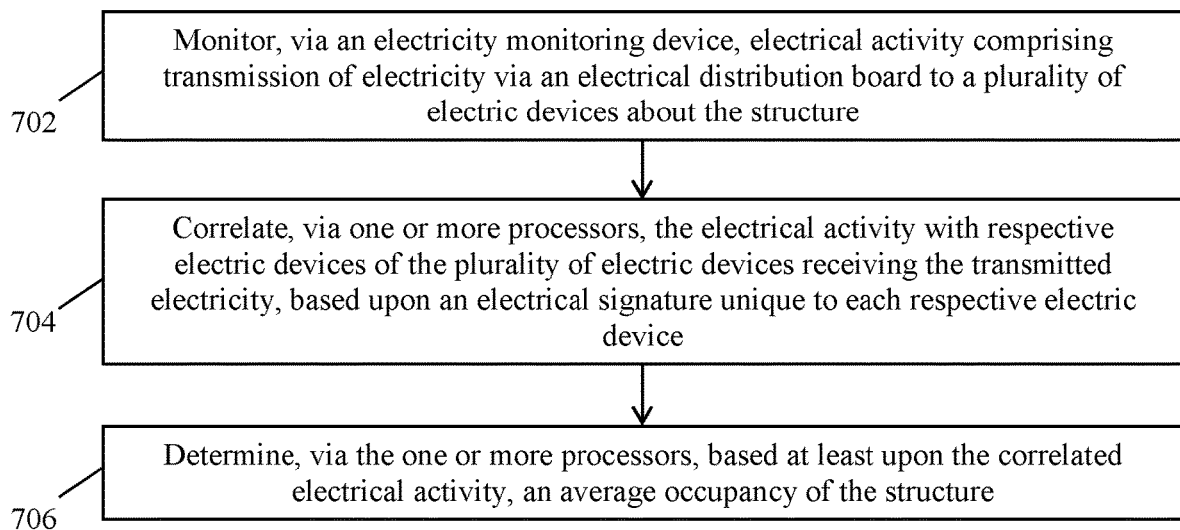
FIG. 6 depicts an exemplary computer-implemented method for determining occupancy of a structure.

FIG. 6 depicts a computer-implemented method 600 for determining occupancy of a structure, such as a home. Generally, the method 600 may be performed by the system 100 of FIG. 1, by the system 200 of FIG. 2, by another suitable system, or by some suitable combination thereof.

The method 600 may include monitoring, via an electricity monitoring device, electrical activity comprising transmission of electricity via an electrical distribution board to a plurality of electric devices about the structure (block 602). A device of the plurality of electric devices may be, for example, any suitable electric device described herein with regard to FIG. 2, or otherwise described in this detailed description. A record of the monitored electrical activity may be stored, for example, at the EM device or at another system (e.g., an insurance system or a smart controller of the structure).

The method 600 may also include correlating, via one or more processors, the electrical activity with respective electric devices of the plurality of electric devices receiving the transmitted electricity, based upon an electrical signature unique to each respective electric device (block 604). In other words, the electricity monitored at the electrical distribution board by the EM device may be mapped to the individual electric devices to which the electricity was transmitted.

The one or more processors may include one or more processors of the EM device. In other words, one or more processors of the EM device itself may perform at least some of the processor-implemented functions described herein. Additionally or alternatively, the one or more processors may include one or more processors external to the electricity monitoring device. In other words, the EM device may transmit data and/or signals, via one or more processors of the EM device to another entity (e.g., an electricity provider entity or an insurance entity) to report the monitored electrical activity, and at least some processor-implemented functions described herein may be performed by one or more processors of the other entity.

The method 600 may also include determining, via the one or more processors, based at least upon the correlated electrical activity, an average occupancy of the structure (block 606). In other words, an average number of human or other occupants of the structure may be determined. An average occupancy of the structure may be, for example, a median level of occupancy of the structure, a mode (most frequent) level of occupancy, or a range of occupancy levels.

Average occupancy of the structure may be determined based at least in part upon an electricity consumption (e.g., total, average, or frequency of consumption) of one or more particular electric devices of the plurality of electric devices. For example, an average occupancy may be determined from an electricity consumption of an electric water heater providing hot water to occupants the structure, alone or combined with an average electricity consumption of a laundry washer within the structure.

Additionally or alternative, average occupancy of the structure may be determined based at least in part upon overall electrical activity about the structure. For example, average occupancy may be determined from an overall (e.g., total or average) electricity consumption about the structure (e.g., based on an estimated range of average electricity consumption per human occupant in a typical or similar structure).

Additionally or alternative, determining the average occupancy may include comparing the monitored or correlated electrical activity of the structure to electrical activity of another structure that is similar to the first structure (e.g., a structure of similar class, size, materials, or electrical system characteristics). The average occupancy of the first structure may be determined based at least in part upon a known, determined, or estimated occupancy of the other structure.

Additionally or alternatively, average occupancy of the structure may be determined based in part upon telematics data originating from (i) a vehicle of a party associated with the structure (ii) one or more smart electric devices and/or a smart device controller of the structure, and/or (iii) a mobile device of a party (e.g., an occupant) associated with the structure. Thus, the method 600 may include receiving the telematics data via the one or more processors and determining the average structure occupancy based at least in part upon the telematics data.

In some embodiments, the method 600 may further include updating, via the one or more processors, a structure occupancy profile. For example, an insurance policy or profile of a party associated with the structure may include an insurance structure occupancy profile indicating an average occupancy of the structure. The method 600 may include updating the occupancy profile to reflect the average occupancy determined based upon the correlated electrical activity. Additionally or alternatively, the method 600 may include updating, via the one or more processors, a risk profile of the structure and/or a party associated with the structure. For example, an insurance risk profile of a party associated with the structure may vary based upon the average occupancy of the structure, and the insurance risk profile may be updated to reflect the average occupancy determined based upon the correlated electrical activity.

In some embodiments, the method 600 may further include generating, via the one or more processors, an insurance discount based upon the average structure occupancy. The insurance discount may be a discount of an insurance policy for the structure itself and/or for a party associated with the structure (e.g., a homeowner). The discount may include, for example, a discount of an insurance premium and/or an insurance deductible. The method 600 may further include transmitting, via the one or more processors, a notification of the insurance discount to a mobile device (e.g., a smartphone) of a party associated with the insurance policy.

Additional, fewer, or alternative functions to the method 600 are possible. Additionally, one or more elements of the method 600 may proceed in an order different from that depicted in FIG. 6.

Updating Home Occupancy Profile & Risk Profiles

In one aspect, a computer-implemented method of determining home occupancy may be provided. The method may be performed, for example, by the system 100 of FIG. 1, the system 200 of FIG. 2, another suitable system, or some combination thereof. The method may include (1) monitoring, via a wireless Electricity Monitoring (EM) device (which may include one or more processors, sensors, and/or transceivers), (i) current home electricity usage, flow, and/or consumption, and/or (ii) current individual electric device/appliance electricity usage, flow, and/or consumption, the EM device configured to wirelessly detect unique electric signatures of each electric device being powered via the home's electrical system; (2) receiving, via one or more processors and/or transceivers, data indicative of (i) current home electricity usage, flow, and/or consumption, and/or (ii) current individual electric device/appliance electricity usage, flow, and/or consumption from the EM device via wireless communication or data transmission over one or more radio links or communication channels; (3) determining, via one or more processors, an average amount of home occupancy (such as for a period of time) based upon the (i) current home electricity usage, flow, and/or consumption, and/or (ii) current individual electric device/appliance electricity usage, flow, and/or consumption (such as comparing actual home or appliance electricity usage, flow, and/or consumption with historic or expected electricity usage, flow, and/or consumption for a home presently occupied by one or more persons); (4) updating, via the one or more processors, (i) a home occupancy profile, or (ii) a risk profile for the home (or for the home owner, or a vehicle associated with the home) based upon the average amount of home occupancy; and/or (5) updating, via the one or more processors, an insurance discount for the home or insured home owner based upon the home occupancy profile and/or risk profile to facilitate providing insurance discounts to risk averse home owners or households. The method may include additional, less, or alternate actions, including those discussed elsewhere herein.

For instance, the method may include receiving, via one or more processors and/or transceivers, home telematics data; and combining, via the one or more processors, the home telematics data with the data indicative of (i) current home electricity usage, flow, and/or consumption, and/or (ii) current individual electric device/appliance electricity usage, flow, and/or consumption generated by the EM device. The average amount of home occupancy determined by the one or more processors may further take into account the combined data and/or the home telematics data received.

The method may include receiving, via one or more processors and/or transceivers, vehicle telematics data; and combining, via the one or more processors, the vehicle telematics data with the data indicative of (i) current home electricity usage, flow, and/or consumption, and/or (ii) current individual electric device/appliance electricity usage, flow, and/or consumption generated by the EM device. The average amount of home occupancy determined by the one or more processors may further take into account the combined data and/or the vehicle telematics data received, including image, infrared, and/or GPS data.

The method may include receiving, via one or more processors and/or transceivers, mobile device or wearable device data; and combining, via the one or more processors, the mobile or wearable device data with the data indicative of (i) current home electricity usage, flow, and/or consumption, and/or (ii) current individual electric device/appliance electricity usage, flow, and/or consumption generated by the EM device. The average amount of home occupancy determined by the one or more processors may further take into account the combined data and/or the mobile device or wearable device data received, including image, infrared, and/or GPS data.

The method may include generating, via the one or more processors, an electronic or virtual message detailing the updated insurance discount; and transmitting, via the one or more processors and/or transceivers, the electronic or virtual message to a customer's mobile device for their review and/or approval.

In another aspect, a computer system configured to determine home occupancy may be provided. The computer system may include one or more processors, sensors, transceivers, and/or wireless Electricity Monitoring (EM) devices configured to: (1) monitor, via the wireless EM device, (i) current home electricity usage, flow, and/or consumption, and/or (ii) current individual electric device/appliance electricity usage, flow, and/or consumption, the EM device configured to wirelessly detect unique electric signatures of each electric device being powered via the home's electrical system; (2) receive data indicative of (i) current home electricity usage, flow, and/or consumption, and/or (ii) current individual electric device/appliance electricity usage, flow, and/or consumption from the EM device via wireless communication or data transmission over one or more radio links or communication channels; (3) determine an average amount of home occupancy (such as for a period of time) based upon the (i) current home electricity usage, flow, and/or consumption, and/or (ii) current individual electric device/appliance electricity usage, flow, and/or consumption (such as comparing actual home or appliance electricity usage, flow, and/or consumption with historic or expected electricity usage, flow, and/or consumption for a home presently occupied by one or more persons); (4) update (i) a home occupancy profile, or (ii) a risk profile for the home (or for the home owner, or vehicle associated with the home) based upon the average amount of home occupancy; and/or (5) update an insurance discount for the home or insured homeowner based upon the home occupancy profile and/or risk profile to facilitate providing insurance discount to risk averse homeowners or households. The computer system may include additional, less, or alternate functionality, including that discussed elsewhere herein.

For instance, the system may be configured to: receive home telematics data; and combine the home telematics data with the data indicative of (i) current home electricity usage, flow, and/or consumption, and/or (ii) current individual electric device/appliance electricity usage, flow, and/or consumption generated by the EM device. The average amount of home occupancy determined by the one or more processors may further take into account the combined data and/or the home telematics data received, including infrared, image, and/or GPS data.

The system may be configured to: receive vehicle telematics data (such as from an insured's vehicle or mobile device); and combine the vehicle telematics data with the data indicative of (i) current home electricity usage, flow, and/or consumption, and/or (ii) current individual electric device/appliance electricity usage, flow, and/or consumption generated by the EM device. The average amount of home occupancy determined by the one or more processors may take into account the combined data and/or the vehicle telematics data received, including infrared, image, and/or GPS data.

The computer system may be configured to: receive mobile device or wearable device data; and combine the mobile or wearable device data with the data indicative of (i) current home electricity usage, flow, and/or consumption, and/or (ii) current individual electric device/appliance electricity usage, flow, and/or consumption generated by the EM device. The average amount of home occupancy determined by the one or more processors may take into account the combined data and/or the mobile device or wearable device data received.

The system may be configured to generate an electronic or virtual message detailing the updated insurance discount; and transmit the electronic or virtual message to a customer's mobile device for their review and/or approval.

Buildup or Fraud Detection

Generally, electrical activity about a structure (e.g., a home) may be monitored via an electricity monitoring (EM) device to verify an electrical event about the structure (e.g., determine the veracity of an insurance claim by identifying whether buildup or fraud has occurred). The EM device may monitor electrical activity, and monitored electrical activity may be correlated with respective electric devices about the structure by utilizing a unique electrical signature that exists for each respective device. An indication of an insurance claim may be received, wherein the insurance claim claims damage to one or more of the electric devices or to the structure as a whole. The correlated electrical activity may be analyzed (e.g., specifically with regard to claimed device(s) to determine whether or not the claimed damage occurred, thus determining the veracity of the insurance claim.

Figure 7:
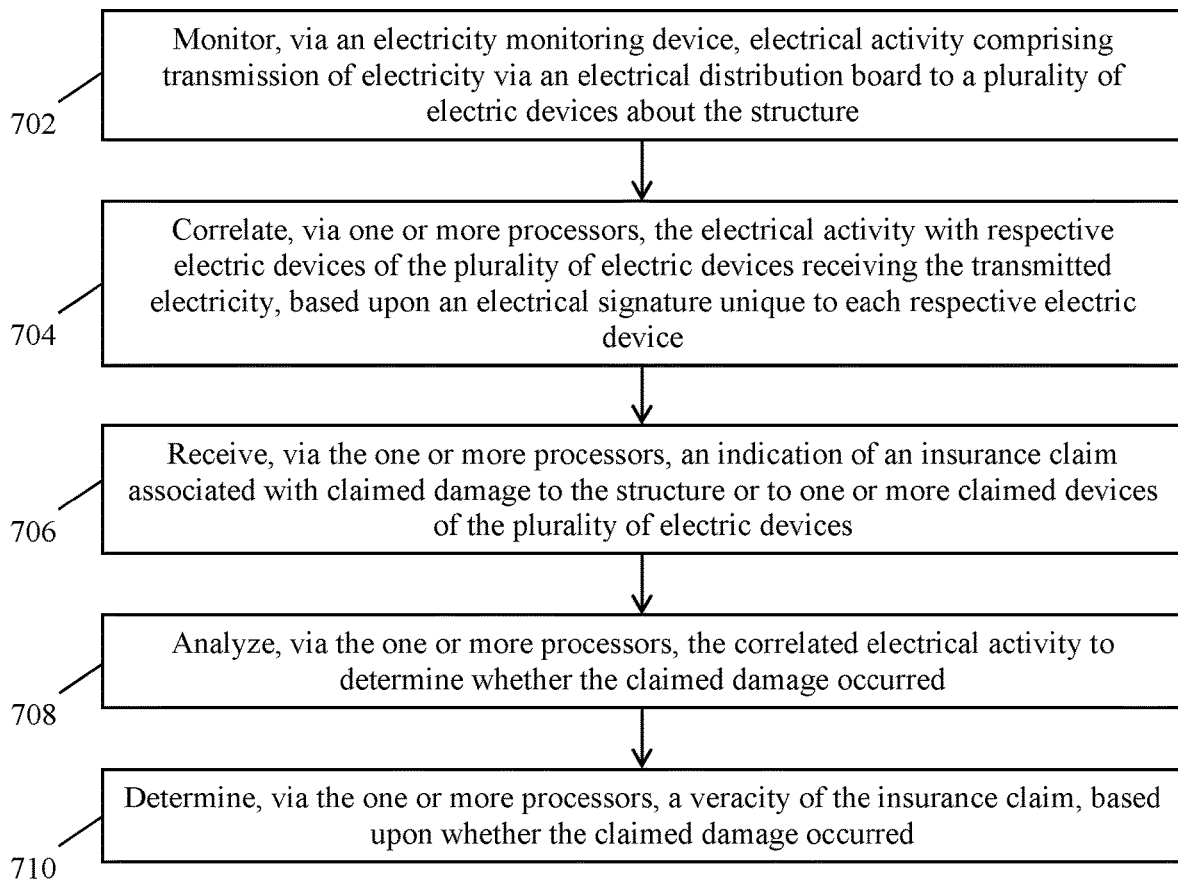
FIG. 7 depicts an exemplary computer-implemented method for verifying an electrical event about a structure.

FIG. 7 depicts a computer-implemented method 700 for determining occupancy of a structure, such as a home. Generally, the method 700 may be performed by the system 100 of FIG. 1, by the system 200 of FIG. 2, by another suitable system, or by some suitable combination thereof.

The method 700 may include monitoring, via an electricity monitoring device, during a first period of time, electrical activity comprising transmission of electricity via an electrical distribution board to a plurality of electric devices about the structure (block 702). A device of the plurality of electric devices may be, for example, any suitable electric device described herein with regard to FIG. 2, or otherwise described in this detailed description. A record of the monitored electrical activity may be stored, for example, at the EM device or at another system (e.g., an insurance system or a smart controller of the structure).

The method 700 may also include correlating, via one or more processors, the electrical activity with respective electric devices of the plurality of electric devices receiving the transmitted electricity, based upon an electrical signature unique to each respective electric device (block 704). In other words, the electricity monitored at the electrical distribution board by the EM device may be mapped to the individual electric devices to which the electricity was transmitted.

The one or more processors may include one or more processors of the EM device. In other words, one or more processors of the EM device itself may perform at least some of the processor-implemented functions described herein. Additionally or alternatively, the one or more processors may include one or more processors external to the electricity monitoring device. In other words, the EM device may transmit data and/or signals, via one or more processors of the EM device to another entity (e.g., an electricity provider entity or an insurance entity) to report the monitored electrical activity, and at least some processor-implemented functions described herein may be performed by one or more processors of the other entity.

The method 700 may also include receiving, via the one or more processors, an indication of an insurance claim associated with claimed damage to the structure or to one or more claimed devices of the plurality of electric devices (block 706). The indication of the insurance claim may be received, for example, via a mobile device of a party (e.g., a claimant) associated with the insurance claim, from an insurance entity (e.g., an insurance claim processing system), and/or from another suitable source. The insurance claim may claim damage to or a defect of one or more electric devices of the plurality of electric devices. Additionally or alternatively, the insurance claim may claim damage to another part of the structure (e.g., damage to a roof, floor, or furniture), which may be claimed to have been directly or indirectly caused by an activity or malfunction or an electric device, and/or by another direct or indirect cause.

The method 700 may also include analyzing, via the one or more processors, the correlated electrical activity device to determine whether the claimed damage devices occurred (block 708).

In the case of claimed damage to a particular electric device, the method 700 may include analyzing correlated electrical activity specific to the particular electric device claimed to be damaged. For example, if the claimed damage includes a claim of complete loss of functionality of a laundry washer, the method 700 may include analyzing electrical activity correlated with the washer to determine if the washer drew power consistent with a normal wash cycle. If the washer conducted normal wash cycles at a time after the washer was claimed to not be functional (i.e., the washer actually is functional), potential insurance fraud may be determined.

In the case of claimed damage to the structure beyond the electric devices (i.e., a non-electric object or a wall, floor, roof, etc. of the structure), the method 700 may still include analyzing the correlated electrical activity. For example, if the insurance claim indicates that the damage was caused directly or indirectly by some activity or malfunction of an oven (e.g., fire or smoke damage near the oven), the method 700 may include analyzing electrical activity correlated with the oven to determine whether the oven's electrical activity at the time of the claimed damage was consistent with the claim and/or the damage.

In any case, the method 700 may further include determining a cause of the claimed damage, when the damage is determined to have occurred. Determining a cause of the claimed damage of an electric device may include correlating the claimed damage to abnormal electrical activity associated with the electric device, and determining a cause of the abnormal electrical activity.

The method 700 may also include determining, via the one or more processors, a veracity of the insurance claim, based at least upon whether the claimed damage occurred (block 710). Determining a veracity of the insurance claim may further include determining whether a cause of the claimed damage as indicated by the claim is consistent with the cause of the damage as determined via the one or more processors.

In some embodiments, the method 700 may further include processing, via the one or more processors, the insurance claim when the insurance claim is verified. Processing the insurance claim may, for example, include issuing monetary compensation to a party associated with the claim, issuing a replacement electric device, updating an insurance policy associated with the claim, etc.

In some embodiments, the method 700 may further include (i) determining, via the one or more processors, a replacement device to replace at least one of the claimed devices; (ii) generating, via the one or more processors, a virtual message indicating the replacement device; and/or (iii) transmitting, via the one or more processors, the virtual message to a mobile device (e.g., a smartphone) of a party (e.g., a claimant and/or a homeowner) associated with the structure. A replacement device may be determined based upon, for example, product ratings, user ratings, and/or similarity of the replacement device to the claimed device.

Additional, fewer, or alternative functions to the method 700 are possible. Additionally, one or more elements of the method 700 may proceed in an order different from that depicted in FIG. 7. For example, electrical activity may be monitored and/or correlated after receipt of the indication of the insurance claim.

In another aspect, a computer-implemented method of detecting buildup or insurance claim fraud may be provided. The method may be performed, for example, by the system 100 of FIG. 1, the system 200 of FIG. 2, another suitable system, or some combination thereof. The method may include (1) receiving, via one or more processors and/or transceivers, an insurance claim associated with damage to an electric or electronic device or appliance within an insured home (such as via wireless communication or data transmission over one or more radio links or communication channels); (2) receiving, via one or more processors and/or transceivers, electricity usage, flow, and/or consumption data associated the electric or electronic device or appliance (such as via wireless communication or data transmission over one or more radio links or communication channels), the electricity usage, flow, and/or consumption data being gather and collected by a wireless Electricity Monitoring (EM) device; (3) verifying, via the one or more processors, (i) damage to the electric or electronic device or appliance has occurred, and/or (ii) a make and model of the electric or electronic device or appliance based upon the electricity usage, flow, and/or consumption data generated or collected by the wireless EM device; and/or (4) processing, via the one or more processors, the insurance claim after the damage and/or the type of electric or electronic device/appliance is verified based upon the electricity usage, flow, and/or consumption data generated and/or collected by the wireless EM device to facilitate reducing buildup or insurance claim fraud, and passing insurance cost savings on to average consumers.

The method may include selecting one or more replacement appliances or devices, via the one or more processors, based upon product ratings or customer reviews; generating, via the one or more processors, a virtual message detailing the recommended replacement appliances or devices; and/or transmitting, via the one or more processors and/or transceivers, the virtual message to the customer's mobile device for customer review and to facilitate replacing malfunctioning appliances and devices. The method may include additional, less, or alternate functionality, including that discussed elsewhere herein.

In another aspect, a computer system configured to detect buildup or insurance claim fraud may be provided. The computer system may include one or more processors, sensors, transceivers, and/or wireless Electricity Monitoring (EM) devices configured to: (1) receive an insurance claim associated with damage to an electric or electronic device or appliance within an insured home (such as via wireless communication or data transmission over one or more radio links or communication channels); (2) receive electricity usage, flow, and/or consumption data associated the electric or electronic device or appliance (such as via wireless communication or data transmission over one or more radio links or communication channels), the electricity usage, flow, and/or consumption data being gathered and collected by a wireless Electricity Monitoring (EM) device; (3) verify (i) damage to the electric or electronic device or appliance has occurred, and/or (ii) a make and model of the electric or electronic device or appliance based upon the electricity usage, flow, and/or consumption data generated or collected by the wireless EM device; and/or (4) process the insurance claim after the damage or the type of electric or electronic device/appliance is verified based upon the electricity usage, flow, and/or consumption data collected by the wireless EM device to facilitate reducing buildup or insurance claim fraud, and passing insurance cost savings on to average consumers.

The system may be configured to: select one or more replacement appliances or devices based upon product ratings or customer reviews; generate a virtual message detailing the recommended replacement appliances or devices; and/or transmit the virtual message to the customer's mobile device for customer review and to facilitate replacing malfunctioning appliances and devices. The system may include additional, less, or alternate functionality, including that discussed elsewhere herein.

Risk Estimation & Insurance Quote Generation

Generally, electrical activity about a structure (e.g., a home) may be monitored via an electricity monitoring (EM) device to determine risk associated with electric devices about the structure. The EM device may monitor electrical activity, and monitored electrical activity may be correlated with respective electric devices about the structure by utilizing a unique electrical signature that exists for each respective device. Based upon at least the correlated electrical activity, a level of risk associated with the structure may be determined, and one or more terms of an insurance quote or policy may be generated based at least upon the estimated risk.

Figure 8:
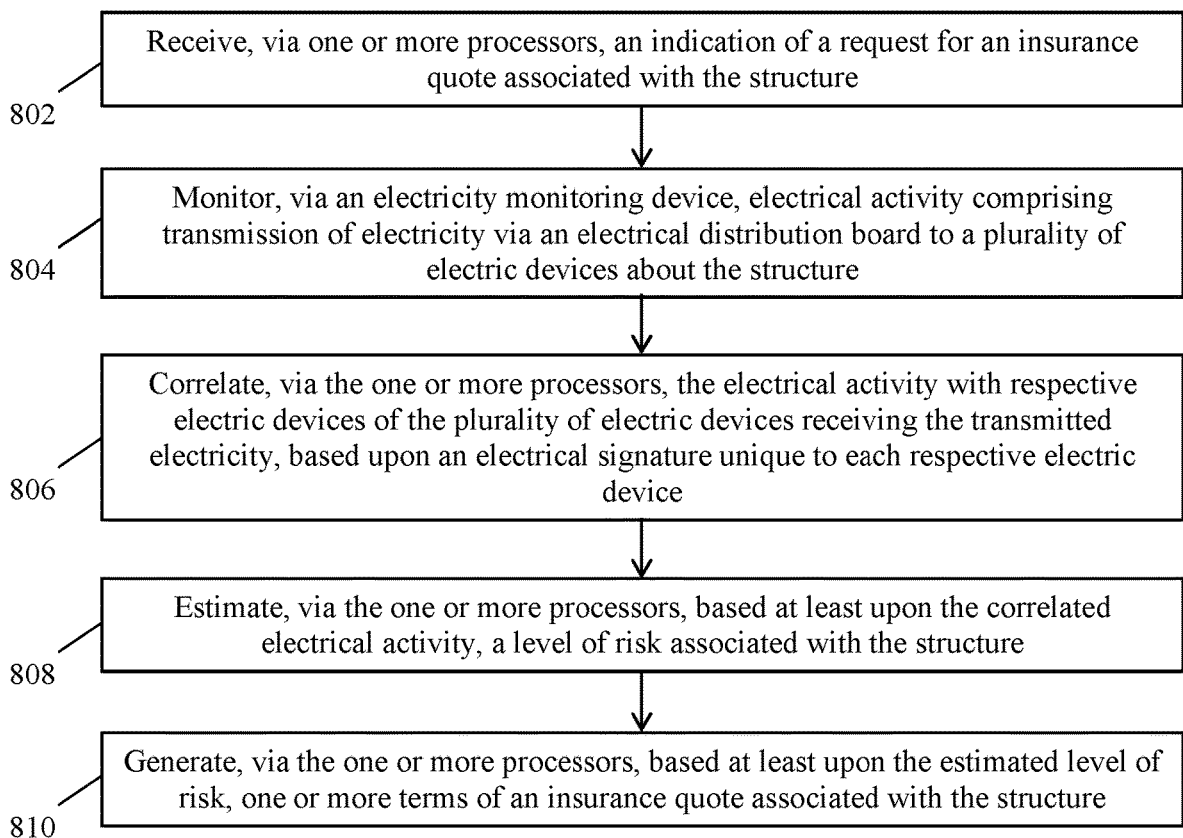
FIG. 8 depicts an exemplary computer-implemented method for determining risk associated with electric devices about a structure.

FIG. 8 depicts a computer-implemented method 800 for determining risk associated with a structure, such as a home. Generally, the method 800 may be performed by the system 100 of FIG. 1, by the system 200 of FIG. 2, by another suitable system, or by some suitable combination thereof.

The method 800 may include receiving, via one or more processors, an indication of a request for an insurance quote associated with the structure (block 802). The indication of the request for the insurance quote may be received, for example, via a mobile device (e.g., a smartphone) or another computing device of a party requesting the quote (e.g., a potential policyholder). Additionally or alternatively, the indication of the insurance quote may be received from a computing device of an insurance entity.

The method 800 may also include monitoring, via an electricity monitoring device, electrical activity comprising transmission of electricity via an electrical distribution board to a plurality of electric devices about the structure (block 804). A device of the plurality of electric devices may be, for example, any suitable electric device described herein with regard to FIG. 2, or otherwise described in this detailed description. A record of the monitored electrical activity may be stored, for example, at the EM device or at another system (e.g., an insurance system or a smart controller of the structure).

The method 800 may also include correlating, via the one or more processors, the electrical activity with respective electric devices of the plurality of electric devices receiving the transmitted electricity, based upon an electrical signature unique to each respective electric device (block 806). In other words, the electricity monitored at the electrical distribution board by the EM device may be mapped to the individual electric devices to which the electricity was transmitted.

The one or more processors may include one or more processors of the EM device. In other words, one or more processors of the EM device itself may perform at least some of the processor-implemented functions described herein. Additionally or alternatively, the one or more processors may include one or more processors external to the electricity monitoring device. In other words, the EM device may transmit data and/or signals, via one or more processors of the EM device to another entity (e.g., an electricity provider entity or an insurance entity) to report the monitored electrical activity, and at least some processor-implemented functions described herein may be performed by one or more processors of the other entity.

The method 800 may also include estimating, via the one or more processors, based at least upon the correlated electrical activity, a level of risk associated with the structure (block 808). The level of risk associated with the structure may include a level of risk associated with one or more particular electric devices about the structure. For example, the level of risk may be estimated based upon the risk of malfunction or other abnormal electrical activity of a particular electric device, and/or an extent of damage that may be caused by the particular electric device if the malfunction were to occur. Additionally or alternatively, the level of risk may be associated with an overall risk of the structure, based at least in part upon the one or more electrical devices therein.

The method 800 may also include generating, via the one or more processors, based at least upon the estimated level of risk, one or more terms of an insurance quote associated with the structure (block 810). The one or more terms may include, for example, an insurance premium, an insurance coverage, and/or an insurance deductible.

In some embodiments, the one or more terms of the insurance quote may be generated further based upon structure telematics data pertaining to the structure (e.g., smart appliance or smart controller data therein), and/or based upon vehicle telematics data of a vehicle of a party associated with the insurance quote (e.g., a vehicle owned by a potential policyholder).

In some embodiments, the method 800 may further include (i) generating, via the one or more processors, a virtual message detailing one or more terms of the insurance quote, and/or (ii) transmitting, via the one or more processors, the virtual message to a mobile device of a party associated with the insurance quote. The virtual message may include an indication of the level of risk associated with the structure.

Additional, fewer, or alternative functions to the method 800 are possible. Additionally, one or more elements of the method 800 may proceed in an order different from that depicted in FIG. 8. For example, the indication of the request for the insurance quote may be received after the electrical activity monitoring and/or the correlation of the electrical activity.

In another aspect, a computer-implemented method of estimating risk for a home may be provided. The method may include (1) receiving, via one or more processors and/or transceivers, a request for an insurance quote for home from a customer mobile device (such as via wireless communication or data transmission over one or more radio links or communication channels); (2) receiving, via one or more processors and/or transceivers, electricity usage, flow, and/or consumption data associated the home, including electricity usage, flow, and/or consumption data of electronic or electric devices or appliances within the home (such as via wireless communication or data transmission over one or more radio links or communication channels), the electricity usage, flow, and/or consumption data being gathered and/or collected by a wireless Electricity Monitoring (EM) device; (3) estimating or determining, via the one or more processors, (i) a level of risk associated with individual electronic or electric devices or appliances within the home, and/or (ii) an overall level of risk for the home based upon the electricity usage, flow, and/or consumption data sensed, gathered, generated, and/or collected by the wireless EM device; and/or (4) generating, via the one or more processors, a homeowners or renters insurance quote based upon the (i) level of risk associated with individual electronic or electric devices or appliances within the home, and/or (ii) overall level of risk for the home determined from the electricity usage, flow, and/or consumption data generated and/or collected by the wireless EM device; and/or (5) transmitting, via the one or more processors, the insurance quote to the customer's mobile device to facilitate rewarding risk averse customers with lower insurance premiums, more accurately matching insurance price to actual risk, and/or enhancing the online customer experience. The method may include additional, less, or alternate actions, including those discussed elsewhere herein.

In another aspect, a computer system configured to estimate risk for a home may be provided. The system may include one or more processors, sensors, transceivers, and/or wireless Electricity Monitoring devices configured to: (1) receive a request for an insurance quote for a home from a customer mobile device (such as via wireless communication or data transmission over one or more radio links or communication channels); (2) receive electricity usage, flow, and/or consumption data associated the home, including electricity usage, flow, and/or consumption data of electronic or electric devices or appliances within the home (such as via wireless communication or data transmission over one or more radio links or communication channels), the electricity usage, flow, and/or consumption data being gathered, generated, and/or collected by a wireless Electricity Monitoring (EM) device; (3) estimate or determine (i) a level of risk associated with individual electronic or electric devices or appliances within the home, and/or (ii) an overall level of risk for the home based upon the electricity usage, flow, and/or consumption data gathered, generated, and/or collected by the wireless EM device; (4) generate a homeowners or renters insurance quote based upon the (i) level of risk associated with individual electronic or electric devices or appliances within the home, and/or (ii) overall level of risk for the home determined from the electricity usage, flow, and/or consumption data generated and/or collected by the wireless EM device; and/or (5) transmit the insurance quote to the customer's mobile device to facilitate rewarding risk averse customers with lower insurance premiums, more accurately matching insurance price to actual risk, and/or enhancing the online customer experience. The system may include additional, less, or alternate functionality, including that discussed elsewhere herein.

Risk Estimation & Home Loan Term Determination

Generally, electrical activity about a home may be monitored via an electricity monitoring (EM) device to determine risk associated with electric devices about the home. The EM device may monitor electrical activity, and monitored electrical activity may be correlated with respective electric devices about the home by utilizing a unique electrical signature that exists for each respective device. Based upon at least the correlated electrical activity, a level of risk associated with the home may be determined, and one or more terms of a home loan may be generated based at least upon the estimated risk.

Figure 9:
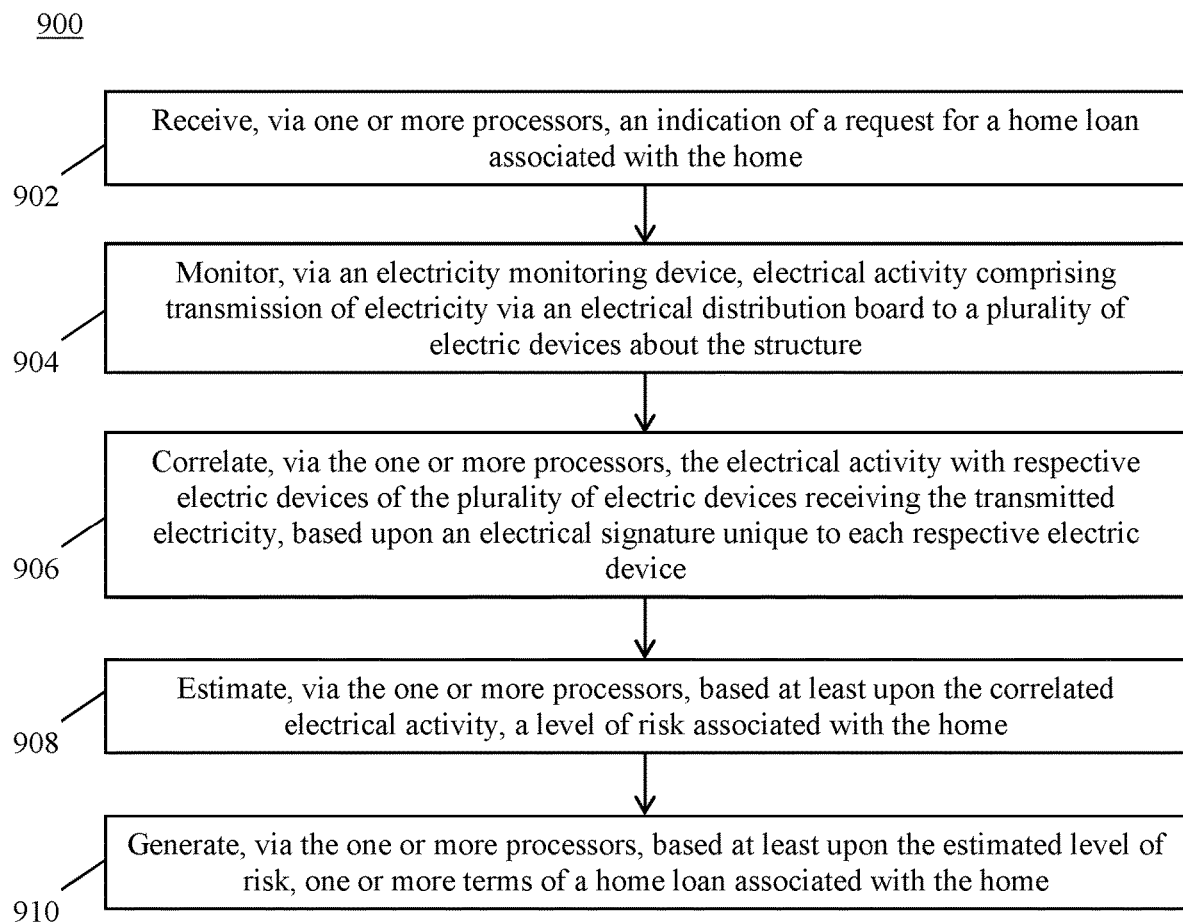
FIG. 9 depicts another exemplary computer-implemented method for determining risk associated with electric devices about a structure.

FIG. 9 depicts a computer-implemented method 900 for determining risk associated with a home. Generally, the method 900 may be performed by the system 100 of FIG. 1, by the system 200 of FIG. 2, by another suitable system, or by some suitable combination thereof.

The method 900 may include receiving, via one or more processors, an indication of a request for a home loan associated with the home (block 902). The indication of the request for the home loan may be received, for example, via a mobile device (e.g., a smartphone) or another computing device of a party requesting the home loan (e.g., a potential policyholder). Additionally or alternatively, the indication of the home loan may be received from a computing device of a financial entity.

The method 900 may also include monitoring, via an electricity monitoring device, electrical activity comprising transmission of electricity via an electrical distribution board to a plurality of electric devices about the home (block 904). A device of the plurality of electric devices may be, for example, any suitable electric device described herein with regard to FIG. 2, or otherwise described in this detailed description. A record of the monitored electrical activity may be stored, for example, at the EM device or at another system (e.g., a financial system or a smart controller of the home).

The method 900 may also include correlating, via the one or more processors, the electrical activity with respective electric devices of the plurality of electric devices receiving the transmitted electricity, based upon an electrical signature unique to each respective electric device (block 906). In other words, the electricity monitored at the electrical distribution board by the EM device may be mapped to the individual electric devices to which the electricity was transmitted.

The one or more processors may include one or more processors of the EM device. In other words, one or more processors of the EM device itself may perform at least some of the processor-implemented functions described herein. Additionally or alternatively, the one or more processors may include one or more processors external to the electricity monitoring device. In other words, the EM device may transmit data and/or signals, via one or more processors of the EM device to another entity (e.g., an electricity provider entity or a financial entity) to report the monitored electrical activity, and at least some processor-implemented functions described herein may be performed by one or more processors of the other entity.

The method 900 may also include estimating, via the one or more processors, based at least upon the correlated electrical activity, a level of risk associated with the home (block 908). The level of risk associated with the home may include a level of risk associated with one or more particular electric devices about the home. For example, the level of risk may be estimated based upon the risk of malfunction or other abnormal electrical activity of a particular electric device, and/or an extent of damage that may be caused by the particular electric device if the malfunction were to occur. Additionally or alternatively, the level of risk may be associated with an overall risk of the home, based at least in part upon the one or more electrical devices therein.

The method 900 may also include generating, via the one or more processors, based at least upon the estimated level of risk, one or more terms of a home loan associated with the home (block 910). The one or more terms of the home loan may include, for example, a length of the loan, an interest rate, and/or a monthly payment.

In some embodiments, the one or more terms of the home loan may be generated further based upon home telematics data pertaining to the home (e.g., smart appliance or smart controller data therein), and/or based upon vehicle telematics data of a vehicle of a party associated with the home loan (e.g., a vehicle owned by a potential policyholder).

In some embodiments, the method 900 may further include (i) generating, via the one or more processors, a virtual message detailing one or more terms of the home loan, and/or (ii) transmitting, via the one or more processors, the virtual message to a mobile device of a party associated with the home loan. The virtual message may include an indication of the level of risk associated with the home.

Additional, fewer, or alternative functions to the method 900 are possible. Additionally, one or more elements of the method 900 may proceed in an order different from that depicted in FIG. 9. For example, the indication of the request for the home loan may be received after the electrical activity monitoring and/or the correlation of the electrical activity. Further, while a home and terms of a home loan are described herein, the home may, in some embodiments, be another type of structure (e.g., a business or office building).

In another aspect, a computer-implemented method of estimating risk for a home and/or determining terms for a home loan may be provided. The method may include (1) receiving, via one or more processors and/or transceivers, a request for a home loan quote for a home from a customer mobile device (such as via wireless communication or data transmission over one or more radio links or communication channels); (2) receiving, via one or more processors and/or transceivers, electricity usage, flow, and/or consumption data associated the home, including electricity usage, flow, and/or consumption data of electronic or electric devices or appliances within the home (such as via wireless communication or data transmission over one or more radio links or communication channels), the electricity usage, flow, and/or consumption data being gathered, generated, and/or collected by a wireless Electricity Monitoring (EM) device; (3) estimating or determining, via the one or more processors, (i) a level of risk associated with individual electronic or electric devices or appliances within the home, and/or (ii) an overall level of risk for the home based upon the electricity usage, flow, and/or consumption data gathered, generated, and/or collected by the wireless EM device; and/or (4) generating, via the one or more processors, a home loan quote (and/or terms thereof) based upon the (i) level of risk associated with individual electronic or electric devices or appliances within the home, and/or (ii) overall level of risk for the home determined from the electricity usage, flow, and/or consumption data generated, gathered, and/or collected by the wireless EM device; and/or (5) transmitting, via the one or more processors, the home loan quote to the customer's mobile device to facilitate more accurately priced home loan products based upon actual risk, providing risk averse customers with insurance-cost savings, and/or enhancing the online customer experience. The method may include additional, less, or alternate actions, including those discussed elsewhere herein.

In another aspect, a computer-implemented method of estimating risk for a home and/or determining terms for a home loan may be provided. The method may include (1) receiving, via one or more processors and/or transceivers, electricity usage, flow, and/or consumption data associated the home, including electricity usage, flow, and/or consumption data of electronic or electric devices or appliances within the home (such as via wireless communication or data transmission over one or more radio links or communication channels), the electricity usage, flow, and/or consumption data being gathered and collected by a wireless Electricity Monitoring (EM) device; (2) detecting, via the one or more processors, degradation of one or more individual electronic or electric devices or appliances within the home based upon the electricity usage, flow, and/or consumption data gathered, generated, and/or collected by the wireless EM device; (3) determining, via the one or more processors, a level of severity of the degradation of an individual electronic or electric device or appliance within the home based upon the electricity usage, flow, and/or consumption data gathered, generated, and/or collected by the wireless EM device; (4) determining, via the one or more processors, a corrective action to repair or replace the individual electronic or electric device or appliance; and/or (5) communicating or otherwise transmitting, via the one or more processors, an indication of the corrective action to the customer's mobile device to facilitate preventing or mitigating risk of home or electric device damage due to faulty or failing electronic devices or appliances. The method may include additional, less, or alternate actions, including those discussed elsewhere herein.

In another aspect, a computer system configured to estimate risk for a home and/or determine terms for a home loan may be provided. The system may include one or more processors, sensors, transceivers, and/or wireless Electricity Monitoring (EM) devices configured to: (1) receive a request for a home loan quote for a home from a customer mobile device (such as via wireless communication or data transmission over one or more radio links or communication channels); (2) receive electricity usage, flow, and/or consumption data associated the home, including electricity usage, flow, and/or consumption data of electronic or electric devices or appliances within the home (such as via wireless communication or data transmission over one or more radio links or communication channels), the electricity usage, flow, and/or consumption data being gathered, generated, and/or collected by a wireless Electricity Monitoring (EM) device; (3) estimate or determine (i) a level of risk associated with individual electronic or electric devices or appliances within the home, and/or (ii) an overall level of risk for the home based upon the electricity usage, flow, and/or consumption data gathered, generated, and/or collected by the wireless EM device; (4) generate a home loan quote (and/or terms thereof) based upon the (i) level of risk associated with individual electronic or electric devices or appliances within the home, and/or (ii) overall level of risk for the home determined from the electricity usage, flow, and/or consumption data collected by the wireless EM device; and/or (5) transmit the home loan quote to the customer's mobile device to facilitate more accurately priced home loan products based upon actual risk, providing risk averse customers with insurance-cost savings, and/or enhancing the online customer experience. The system may include additional, less, or alternate functionality, including that discussed elsewhere herein.

In another aspect, a computer system configured to estimate risk for a home and/or determining terms for a home loan may be provided. The system may include one or more processors, sensors, transceivers, and/or wireless Electricity Monitoring (EM) devices configured to: (1) receive, via one or more processors and/or transceivers, electricity usage, flow, and/or consumption data associated the home, including electricity usage, flow, and/or consumption data of electronic or electric devices or appliances within the home (such as via wireless communication or data transmission over one or more radio links or communication channels), the electricity usage, flow, and/or consumption data being gathered, generated, and/or collected by a wireless Electricity Monitoring (EM) device; (2) detect degradation of one or more individual electronic or electric devices or appliances within the home based upon the electricity usage, flow, and/or consumption data gathered, generated, and/or collected by the wireless EM device; (3) determine a level or severity of the degradation of an individual electronic or electric device or appliance within the home based upon the electricity usage, flow, and/or consumption data gathered, generated, and/or collected by the wireless EM device; (4) determine a corrective action to repair or replace the individual electronic or electric device or appliance; and/or (5) communicate or otherwise transmit an indication of the corrective action to the customer's mobile device to facilitate preventing or mitigating risk of home or device damage due to faulty or failing electronic devices or appliances. The system may include additional, less, or alternate functionality, including that discussed elsewhere herein.

Verify Home Occupied at Time of Fire to Rule Out Arson

Generally, electrical activity about a structure (e.g., a home) may be monitored via an electricity monitoring (EM) device to reconstruct an event associated with damage to the structure. The EM device may monitor electrical activity, and monitored electrical activity may be correlated with respective electric devices about the structure by utilizing a unique electrical signature that exists for each respective device. Based upon the correlated electrical activity, a structure electrical profile may be built, and the profile may depict, for example, average electricity operation/usage, baseline electricity operation/usage, and/or expected electricity operation/usage/consumption. In effect, the structure electrical profile, based upon real electrical activity about the structure, may set forth what is "normal" operation and usage of electricity about the structure. An indication of an insurance claim may be received, and electrical activity at the time of claimed damage may be compared with the structure electrical profile to determine whether the damage occurred voluntarily or involuntarily.

Figure 10:
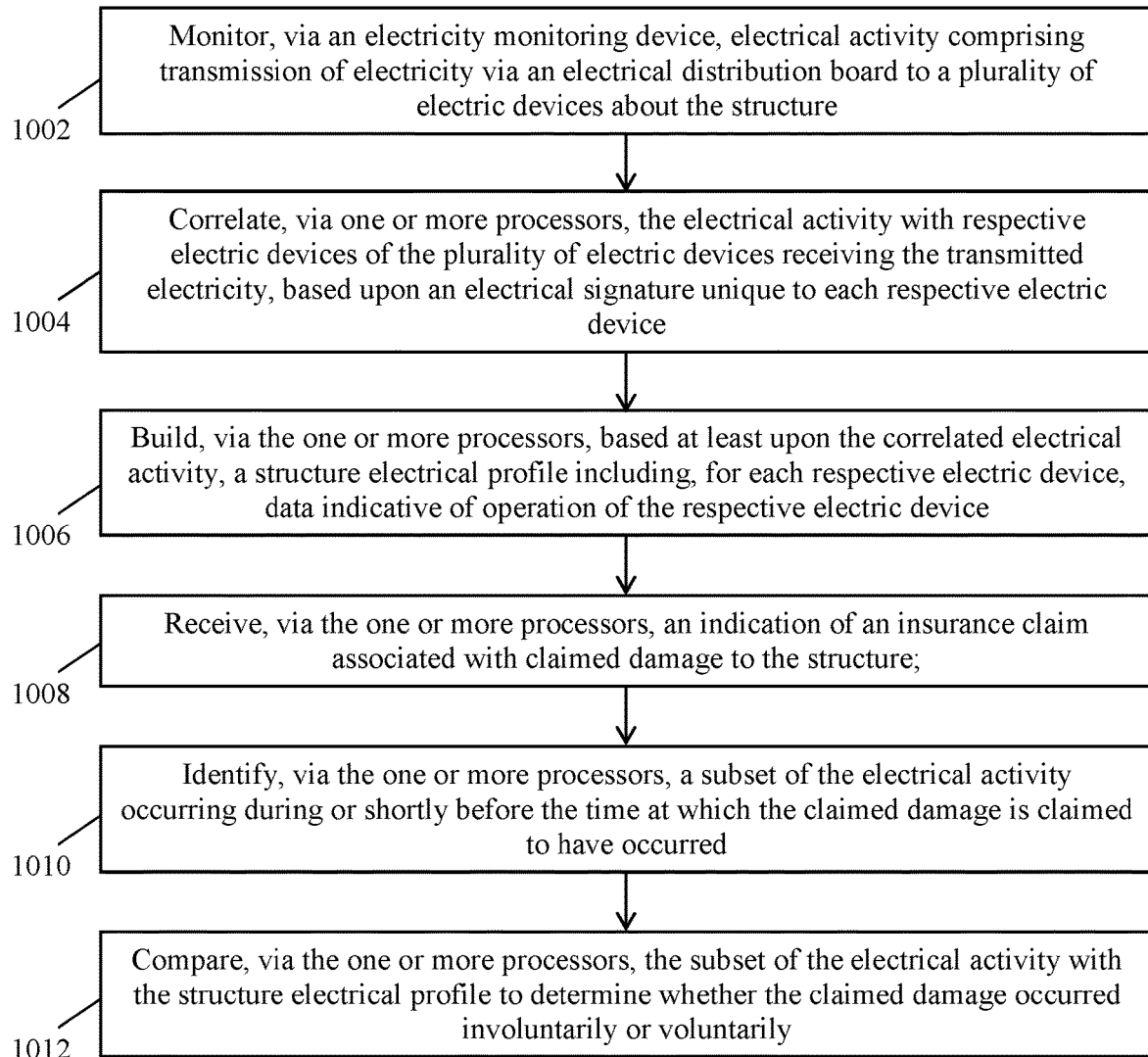
FIG. 10 depicts an exemplary computer-implemented method for reconstructing an event associated with damage to a structure.

FIG. 10 depicts a computer-implemented method 1000 for reconstructing an event associated with damage to a structure, such as a home. Generally, the method 1000 may be performed by the system 100 of FIG. 1, by the system 200 of FIG. 2, by another suitable system, or by some suitable combination thereof.

The method 1000 may include monitoring, via an electricity monitoring device, electrical activity comprising transmission of electricity via an electrical distribution board to a plurality of electric devices about the structure (block 1002). A device of the plurality of electric devices may be, for example, any suitable electric device described herein with regard to FIG. 2, or otherwise described in this detailed description. A record of the monitored electrical activity may be stored, for example, at the EM device or at another system (e.g., an insurance system or a smart controller of the structure).

The method 1000 may also include correlating, via one or more processors, the electrical activity with respective electric devices of the plurality of electric devices receiving the transmitted electricity, based upon an electrical signature unique to each respective electric device (block 1004). In other words, the electricity monitored at the electrical distribution board by the EM device may be mapped to the individual electric devices to which the electricity was transmitted.

The one or more processors may include one or more processors of the EM device. In other words, one or more processors of the EM device itself may perform at least some of the processor-implemented functions described herein. Additionally or alternatively, the one or more processors may include one or more processors external to the electricity monitoring device. In other words, the EM device may transmit data and/or signals, via one or more processors of the EM device to another entity (e.g., an electricity provider entity or an insurance entity) to report the monitored electrical activity, and at least some processor-implemented functions described herein may be performed by one or more processors of the other entity.

The method 1000 may also include building, via the one or more processors, based at least upon the correlated electrical activity, a structure electrical profile including, for each respective electric device, data indicative of operation of the respective electric device (block 1006).

Operation data of electric devices may include, for example, historical, average, expected, or baseline electricity consumption by one or more of the electric devices about the structure, as described herein with regard to FIG. 2. Further, the structure electrical profile may include, for example, electricity consumption data pertaining to the structure as a whole, as described wherein with regard to FIG. 2. The structure electrical profile may include additional or alternative profile data regarding the structure and/or the electric devices thereabouts, including any profile data described in this detailed description. The structure electrical profile may be stored at a computer memory of the EM device or at another system (e.g., an insurance system, or a smart home controller).

During and/or after the correlation of the electrical activity and/or the building of the structure electrical profile (as described above), the electricity monitoring device may continue to monitor electrical activity about the structure.

The method 1000 may also include receiving, via the one or more processors, an indication of an insurance claim associated with claimed damage to the structure (block 1008). The indication of the insurance claim may be received, for example, via a mobile device of a party (e.g., a claimant) associated with the insurance claim, from an insurance entity (e.g., an insurance claim processing system), and/or from another suitable source. The insurance claim may claim damage to or a defect of one or more electric devices of the plurality of electric devices. Additionally or alternatively, the insurance claim may claim damage to another part of the structure (e.g., damage to a roof, floor, or furniture), which may be claimed to have been directly or indirectly caused by an activity or malfunction or an electric device, and/or by another direct or indirect cause.

The method 1000 may also include identifying, via the one or more processors, a subset of the electrical activity occurring during or shortly before the time at which the claimed damage is claimed to have occurred (block 1010). In other words, the monitored electrical activity may be narrowed down to a specific time of concern in order to reconstruct electrical events around the time of the claimed damage. The subset of electrical activity may correspond to a time of electrical activity monitoring before, during, and/or after the building of the structure electrical profile.

The method 1000 may also include comparing, via the one or more processors, the subset of the electrical activity with the structure electrical profile to determine whether the claimed damage occurred involuntarily or voluntarily (block 1012).

For instance, the claimed damage may include a fire damage and/or smoke damage, and the subset of the electrical activity may be compared with the structure electrical profile to determine a comparative amount of electricity consumption about the structure around the time of the claimed damage. Effectively, an occupancy of the structure as indicated by the subset of electrical activity may be compared to an expected, average, or baseline structure occupancy as indicated by the structure electrical profile, thus potentially indicating whether the home was occupied at the time of the fire. Based on the indication, it may be determined whether the fire occurred involuntarily, or was the result of voluntary.

In some embodiments, comparing the subset of the electrical activity with the structure electrical profile may include comparing operation of a particular device of the plurality of electric devices indicated by the subset of the electrical activity to an expected operation of the particular device indicated by the structure electrical profile. As an example, comparing the subset of the electrical activity with the structure electrical profile may provide an indication of whether an electric device, such as a television, exhibited electrical activity consistent with voluntary tampering, instead of involuntary damage.

In some embodiments, the method 1000 may further include processing, via the one or more processors, the insurance claim in response to determining that the damage occurred involuntarily. Processing the insurance claim may, for example, include issuing monetary compensation to a party associated with the claim, issuing a replacement electric device, updating an insurance policy associated with the claim, etc.

Additional, fewer, or alternative functions to the method 1000 are possible. Additionally, one or more elements of the method 1000 may proceed in an order different from that depicted in FIG. 10.

In another aspect, a computer-implemented method of verifying an insurance claim may be provided. The method may include (1) building, via one or more processors, a historic or an expected electricity usage, flow, and/or consumption profile for a home, the expected electricity usage, flow, and/or consumption profile including day-of-week and time-of-day information, and may be based upon electricity usage, flow, and/or consumption detected by a wireless Electricity Monitor (EM) device (which may include one or more processors, sensors, and/or transceivers) over a period of time; (2) monitoring, via the wireless EM device, home and individual electronic or electric device/appliance electricity usage, flow, and/or consumption before an insurance-related event (such as an event that causes damage to the home or personal belongings), the wireless EM device wirelessly detects unique electronic or electric signatures of each electronic or electronic device being powered by the home's electricity or electrical system; (3) receiving, via one or more processors and/or transceivers, an insurance claim associated with damage to an insured home (such as via wireless communication or data transmission over one or more radio links or communication channels); (4) comparing, via the one or more processors, the electricity usage, flow, and/or consumption before the insurance-related event with the expected electricity usage, flow, and/or consumption to either (a) verify normal electricity usage, flow, and/or consumption data, or (b) detect an abnormal electricity usage, flow, and/or consumption prior to the insurance-related event—which may indicate that (a) the home was occupied as expected, or (b) alternatively, to indicate that the home's occupancy increased or decreased prior to the event; and/or (5) when the normal electricity usage, flow, and/or consumption is detected, via the one or more processors, verifying the accuracy of the insurance claim to facilitate verifying a lack of buildup or insurance claim fraud promptly to enhance the online customer experience and facilitate insurance claim processing. The method may include additional, less, or alternate actions, including those discussed elsewhere herein.

In another aspect, a computer system configured to verify an insurance claim may be provided. The system may include one or more processors, sensors, transceivers, and/or wireless Electricity Monitoring (EM) devices configured to: (1) generate or build a historic or an expected electricity usage, flow, and/or consumption profile for a home, the expected electricity usage, flow, and/or consumption profile including day-of-week and time-of-day information, and may be based upon electricity usage, flow, and/or consumption detected by a wireless Electricity Monitor (EM) device (which may include one or more processors, sensors, and/or transceivers) over a period of time; (2) monitor, via the wireless EM device, home and individual electronic or electric device/appliance electricity usage, flow, and/or consumption before an insurance-related event, the wireless EM device wirelessly detects unique electronic or electric signatures of each electronic or electric device being powered by the home's electricity or electrical system; (3) receive an insurance claim associated with damage to an insured home (such as via wireless communication or data transmission over one or more radio links or communication channels); (4) compare the electricity usage, flow, and/or consumption before the insurance-related event with the expected electricity usage, flow, and/or consumption to verify normal electricity usage, flow, and/or consumption data (and/or detect an abnormal electricity usage, flow, and/or consumption) prior to the insurance-related event, the comparison may indicate that the home was occupied as expected (or alternatively, to indicate that the home's occupancy increased or decreased); and/or (5) when the normal electricity usage, flow, and/or consumption is detected, verify the accuracy of the insurance claim to facilitate verifying a lack of buildup or insurance claim fraud promptly to enhance the online customer experience and facilitate insurance claim processing. The system may include additional, less, or alternate functionality, including that discussed elsewhere herein.

Cognitive Computing & Machine Learning

The present embodiments may also employ cognitive computing and/or predictive modeling techniques, including machine learning techniques or algorithms. For instance, electricity flow, usage, and/or consumption data, as well as other types of data (e.g., home telematics data, vehicle telematics data, mobile device or wearable data, etc.) may be input into machine learning programs may be trained to (i) determine a statistical likelihood that an electric device or wiring is failing or in need of maintenance, (ii) build baselines of electricity usage or flow, and detect abnormal events or deviations from the baseline, (iii) determine one or more corrective actions, such as those discussed elsewhere herein, (iv) optimize electric device usage or energization within a home, (v) predict home occupancy, (vi) update home, vehicle, personal/individual, or personal article risk profiles, (vii) customize an insurance or loan product, (viii) select and recommend repair or replacement electric devices, and/or (ix) schedule maintenance with preferred repair shops.

In certain embodiments, the cognitive computing and/or predictive modeling techniques discussed herein may include heuristic engine and algorithms, and/or machine learning, cognitive learning, deep learning, combined learning, and/or pattern recognition techniques. For instance, a processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing electricity-related data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as de-personalized customer electricity-related data, data associated with expected electricity patterns for specific types of electric devices or homes, and/or image, mobile device, insurer database, and/or third-party database data. The machine learning programs may utilize deep learning algorithms that may be primarily focused on pattern recognition, and/or may be trained after processing multiple examples. The machine learning programs may include Bayesian program learning (BPL), pattern recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to identify potential loan and/or insurance applicants and customize loan and/or insurance products for individual customers.

In one embodiment, a processing element (and/or heuristic engine or algorithm discussed herein) may be trained by providing it with a large sample of electricity data for known types of electric devices (such as by make and model) having known characteristics or features. Based upon these analyses, the processing element may learn how to identify characteristics and patterns that may then be applied to analyzing the electricity data discussed herein generated by wireless EM devices, as well as user mobile or other device details, user request or login details, user device sensors, geolocation information, image data, the insurer database, a third-party database, and/or other data. For example, the processing element may learn, with the user's permission or affirmative consent, to identify the user and/or the individual electric devices being monitored within the user's home.

Exemplary Machine Learning

Generally, electrical activity about a structure (e.g., a home) may be monitored via an electricity monitoring (EM) device to detect and correct abnormal electrical activity about the structure, using machine learning techniques. The EM device may monitor electrical activity during a first period of time, and monitored electrical activity may be correlated with respective electric devices about the structure by utilizing a unique electrical signature that exists for each respective device. Based upon the correlated electrical activity, a structure electrical profile may be built, and the profile may depict, for example, average electricity operation/usage, baseline electricity operation/usage, and/or expected electricity operation/usage/consumption. In effect, the structure electrical profile, based upon real electrical activity about the structure, may set forth what is "normal" operation and usage of electricity about the structure. Thus, once the structure electrical profile is built, any electrical activity monitored via the EM device at an electrical distribution board may be analyzed to determine whether electrical activity is abnormal. In response to the abnormal electrical activity, among other possible factors, corrective actions mitigate damage, prevent damage, and/or remedy the cause of the abnormal electrical activity the situation may be determined and/or initiated. Some possible corrective actions will be discussed herein.

Figure 11:
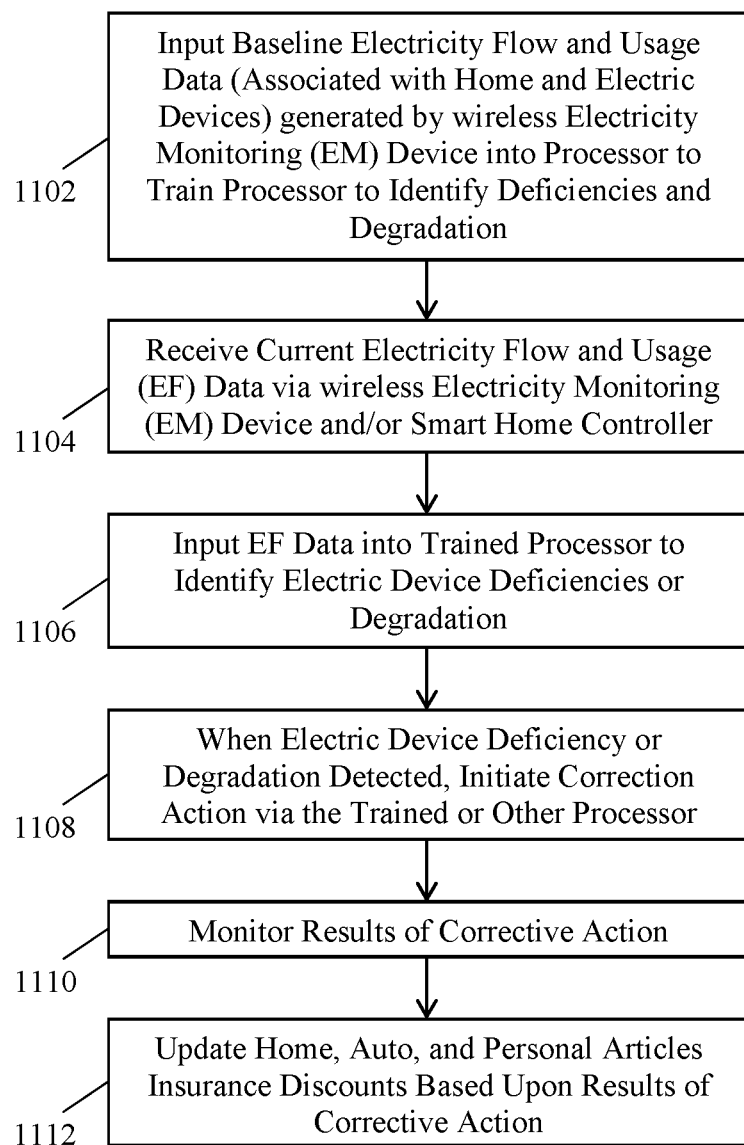
FIG. 11 depicts an exemplary computer-implemented method for evaluating the integrity of a home's electrical system and the electric devices therein using electrical activity monitored by an electricity monitoring (EM) device.

FIG. 11 depicts an exemplary computer-implemented method 1100 for evaluating the integrity of a home's electrical system, and the electric devices therein, using EF data generated by an EM device 1100 that collects EF data, as described herein, i.e., wirelessly. The method 1100 may be performed, for example, by the system 100 of FIG. 1, the system 200 of FIG. 2, another suitable system, or some combination thereof. The method 1100 may include inputting baseline or generic electricity flow, usage, and consumption data associated with a home and/or electric devices generated by an EM device into a processor equipped or programmed with a machine learning program or algorithm (such as a processor associated with an insurance provider remote server) to train the processor to identify deficiencies and degradation of the home's electrical system and electric devices (block 1102).

The method 1100 may include receiving current electricity flow, usage, and consumption (EF) data associated with the home and/or electric devices that is generated by a wireless EM device (block 1104). For instance, the EF data may be received at a remote server via wireless communication or data transmission sent from the EM device or a smart home controller for the home over one or more radio links or communication channels.

The method 1100 may include inputting the EF data received into the trained processor that is trained to identify home electrical system and electric device deficiencies or degradation based upon the EF data that is wirelessly gathered, sensed, collected, and/or generated by the EM device (block 1106). When one or more electric device deficiencies or degradations are identified or detected, the method 1100 may include initiating one or more corrective actions under the direction and control of the remote server, or another local or remote processor (block 1108). The corrective actions may include those discussed elsewhere herein.

The method 1100 may include monitoring the results of the corrective action (block 1110). For instance, a determination may be made whether the corrective actions were effective or ineffective, and the results logged. If the corrective actions were ineffective, additional corrective actions may be recommended or implemented. If the corrective actions were effective, the method 1100 may include updating home, auto, and/or personal articles insurance discounts (block 1112) to reward risk averse home owners that employ the preventive and mitigating functionality disclosed herein.

Figure 12:
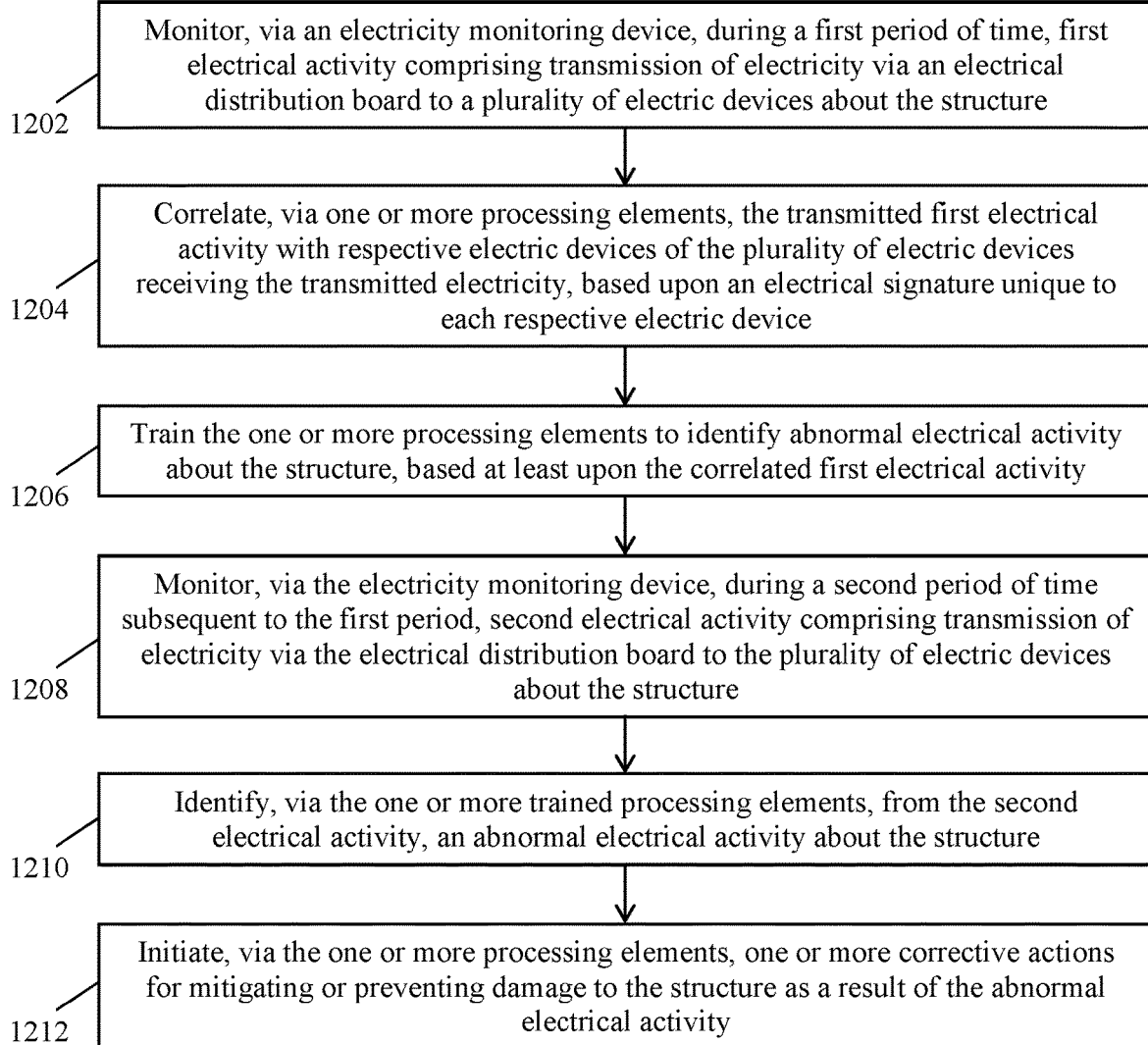
FIG. 12 depicts another exemplary computer-implemented method detecting and correcting abnormal electrical activity about a structure.

FIG. 12 depicts a computer-implemented method 1200 for detecting and correcting abnormal electrical activity about a structure, such as a home. Generally, the method 1200 may be performed by the system 100 of FIG. 1, by the system 200 of FIG. 2, by another suitable system, or by some suitable combination thereof.

The method 1200 may include monitoring, via an electricity monitoring device, during a first period of time, first electrical activity comprising transmission of electricity via an electrical distribution board to a plurality of electric devices about the structure (block 1202). A device of the plurality of electric devices may be, for example, any suitable electric device described herein with regard to FIG. 2, or otherwise described in this detailed description. A record of the monitored electrical activity may be stored, for example, at the EM device or at another system (e.g., an insurance system or a smart controller of the structure).

The method 1200 may also include correlating, via one or more processing elements, the transmitted first electrical activity with respective electric devices of the plurality of electric devices receiving the transmitted electricity, based upon an electrical signature unique to each respective electric device (block 1204). In other words, the electricity monitored at the electrical distribution board by the EM device may be mapped to the individual electric devices to which the electricity was transmitted.

The one or more processing elements may include one or more processing elements of the EM device. In other words, one or more processing elements of the EM device itself may perform at least some of the processing element-implemented functions described herein. Additionally or alternatively, the one or more processing elements may include one or more processing elements external to the electricity monitoring device. In other words, the EM device may transmit data and/or signals, via one or more processing elements of the EM device to another entity (e.g., an electricity provider entity or an insurance entity) to report the monitored electrical activity, and at least some processing element-implemented functions described herein may be performed by one or more processing elements of the other entity.

The method 1200 may also include training the one or more processing elements to identify abnormal electrical activity about the structure, based at least upon the correlated first electrical activity (block 1206). Training the one or more processing elements to identify abnormal electrical activity may include training the one or more processing elements to detect, identify, and/or correct abnormal electrical activity such as an arc fault, an unsafe power draw, and/or another abnormal electrical activity described in this detailed description In some embodiments, training the one or more processing elements may include building a structure electrical profile including, for each respective electric device, data indicative of operation of the respective electric device during at least the first period of time. Operation data of electric devices may include, for example, historical, average, expected, or baseline electricity consumption by one or more of the electric devices about the structure, as described herein with regard to FIG. 2. Further, the structure electrical profile may include, for example, electricity consumption data pertaining to the structure as a whole, as described wherein with regard to FIG. 2. The structure electrical profile may include additional or alternative profile data regarding the structure and/or the electric devices thereabouts, including any profile data described in this detailed description. The structure electrical profile may be stored at a computer memory of the EM device or at another system (e.g., an insurance system, or a smart home controller).

The method 1200 may also include monitoring, via the electricity monitoring device, during a second period of time subsequent to the first period, second electrical activity comprising transmission of electricity via the electrical distribution board to the plurality of electric devices about the structure (block 1208). In other words, during or after training of the one or more processing elements, the EM device may continue to monitor electrical activity about the structure in a manner similar to that described above.

The method 1200 may also include identifying, via the one or more trained processing elements, from the second electrical activity, an abnormal electrical activity about the structure (block 1210).

Identifying an abnormal electrical activity about the structure may include identifying a failing or faulty electric device. As just one example, abnormal electrical activity may include a laundry washer continuing to consume significant amounts of electricity even after a washing cycle would be expected to end (the expectation may be based, for example, upon profile data regarding the washer at the structure electrical profile). This phenomenon may suggest that the washer is stuck at some stage of a washing cycle, indicating some failure or fault of the washer.

Alternatively, an identified abnormal electrical activity associated with an electric device may be caused not by a failure or fault in the electric device itself, but instead of some other element of the structure. For example, abnormal electrical activity may include an electric heater consuming a greater amount of electricity than would be expected at a given time. This phenomenon may indicate a problem about the structure that is not electrical in nature, but that still poses risk to the structure (e.g., an open or broken window, or a displaced insulating material).

Additionally or alternatively, the abnormal electrical activity may include activity indicative of an arc fault or short circuit associated with an electric device, with the electrical distribution board, and/or with some other component of the structure's electrical system.

Additionally or alternatively, the one or more trained processing elements may retrospectively identify abnormal electrical activity from the first electrical activity (e.g., a spike in the first electrical activity), in a manner similar to that described herein regarding the second electrical activity.

The method 1200 may also include initiating, via the one or more processing elements, one or more corrective actions for mitigating or preventing damage to the structure as a result of the abnormal electrical activity (block 1212).

The one or more corrective actions may include automatically de-energizing or turning off one or more electric devices. For example, if an electric device is identified as using an unsafe amount of electricity, the device may be de-energized before it can cause damage to the structure (e.g., a fire) and/or the electrical system therein. Additionally or alternatively, the one or more corrective actions may include opening one or more circuit breakers of the structure.

Additionally or alternatively, the one or more corrective actions may include notifying, via the one or more processing elements, an emergency response entity (e.g., a fire department) in response to the abnormal electrical activity. This corrective action may be particularly necessary if an abnormal electrical activity indicates an imminent threat (e.g., a fire) to the structure and/or to parties within the structure.

Additionally or alternatively, the one or more corrective actions may include (i) generating, via the one or more processing elements, an electronic or virtual message indicating the abnormal activity, and (ii) transmitting, via the one or more processing elements, the electronic or virtual message to a computing device (e.g., a smartphone) of a party (e.g., a homeowner) associated with the structure. In other words, at least one of the one or more corrective actions may be to notify a relevant party of the abnormal electrical activity. The message may include notification of one or more corrective actions already taken; additionally or alternatively, one or more corrective actions may be suggested via the message, and the party may approve the one or more corrective actions via an interaction at the party's computing device.

In any case, initiating the one or more corrective actions may include determining at least one of the one or more corrective actions based upon an identified location of a mobile device associated with the party. For example, the method 1200 may include locating, via the one or more processing elements, a smartphone of a homeowner associated with the structure. Based upon whether the homeowner (as indicated by the smartphone) is within the structure or far from the structure, the one or more corrective actions may be determined. If the homeowner is determined to be within the structure, a corrective action may simply be to notify the homeowner of a potentially dangerous or imminently dangerous situation. If the homeowner is far from the structure, however, it may be more likely that a corrective action includes notifying an emergency response entity (e.g., a fire department) of the abnormal electrical activity.

Additionally or alternatively, the one or more corrective actions may include any other suitable corrective actions discussed in this detailed description.

In some embodiments, the method 1200 may further include generating, via the one or more processing elements, an insurance discount for a party associated with the structure when one or more corrective actions are performed. Performance of one or more corrective actions may be associated with reduced risk to the structure or to a party (e.g., a homeowner) inhabiting the structure. The insurance discount may include a discount to a property insurance policy, a personal (e.g., life) insurance policy, and/or another suitable insurance policy. In any case, a notification (e.g., virtual message) of the insurance discount may be transmitted to a mobile computing device of a party associated with the structure and/or the insurance policy.

Additional, fewer, or alternative functions to the method 1200 are possible. Additionally, one or more elements of the method 1200 may proceed in an order different from that depicted in FIG. 12.

Exemplary Machine Learning Computer Systems

In one aspect, a computer system for evaluating the integrity of a home's electrical system and the electric devices therein may be provided. The computer system may include one or more processors, transceivers, and/or sensors configured to: (1) train a processing element to identify deficiencies or degradation of electric devices based upon electricity flow, usage, or consumption (EF) data gathered, collected, sensed, and/or generated by a wireless Electricity Monitoring (EM) device, the EM device wirelessly identifies individual electricity flow to a specific electric device and/or correlates that individual electricity flow to that specific electric device based upon an unique electrical signature of the specific electric device that is detected by the EM device; (2) receive, via a communication element, current electricity flow, usage, or consumption (EF) data for the home and electric devices therein gathered, collected, sensed, and/or generated by the wireless Electricity Monitoring (EM) device; (3) analyze the current EF data for the home and electric devices therein with the trained processing element to determine or detect one or more deficiencies or degradations for the home and the electric devices therein; and/or (4) initiate, via the processing element, a corrective action that mitigates or prevents damage to the home or an electric device when one or more deficiencies or degradations for the home and/or electric devices therein are detected to facilitate proactive home monitoring and maintenance. The system may include additional, less, or alternate functionality, including that discussed elsewhere herein.

For instance, the corrective action may include: identifying, via the processing element, faulty wiring and/or a location or extent of the faulty wiring within the home; generating, via the processing element, an electronic message detailing the faulty wiring; and/or transmitting, via the processing element and/or an associated transceiver, the electronic message to a customer's mobile device for their review.

The corrective action may include: identifying, via the processing element, a faulty or failing electric device within the home; generating, via the processing element, an electronic message detailing the faulty or failing device; and/or transmitting, via the processing element and/or an associated transceiver, the electronic message to a customer's mobile device for their review.

The corrective action may include: identifying, via the processing element, an electric device in need of replacement or maintenance within the home; generating, via the processing element, an electronic message detailing the need for electric device replacement or maintenance; and/or transmitting, via the processing element and/or an associated transceiver, the electronic message to a customer's mobile device for their review.

The corrective action may include: identifying, via the processing element, an electricity usage inefficiency by the home and/or an electric devices within the home; generating, via the processing element, an electronic message detailing the electricity usage inefficiency, and including a recommendation for more efficient electricity usage; and/or transmitting, via the processing element and/or an associated transceiver, the electronic message to a customer's mobile device for their review.

The corrective action may include: identifying, via the processing element, electricity instability for electricity coming into the home and/or the electric devices within the home; generating, via the processing element, an electronic message detailing the electricity instability, and including a recommendation for mitigating risk; and/or transmitting, via the processing element and/or an associated transceiver, the electronic message to a customer's mobile device for their review.

The corrective action may include: identifying, via the processing element, electricity instability for an electric or hybrid vehicle connected to the home's electrical system; generating, via the processing element, an electronic message detailing the electricity instability, and including a recommendation for mitigating risk; and/or transmitting, via the processing element and/or an associated transceiver, the electronic message to a customer's mobile device for their review.

The corrective action may include: identifying, via the processing element, a deficiency or degradation of the electric system and/or battery for an electric or hybrid vehicle connected to the home's electrical system (such as during battery charging when the vehicle is not in use); generating, via the processing element, an electronic message detailing the deficiency or degradation, and including a recommendation for mitigating risk; and/or transmitting, via the processing element and/or an associated transceiver, the electronic message to a customer's mobile device for their review.

The corrective action may include: identifying, via the processing element, electric arc sparking within the home and/or associated with a specific electric device or breaker; generating, via the processing element, an electronic message detailing the electric arc sparking, and including a recommendation for mitigating risk or eliminating the electric arc sparking; and/or transmitting, via the processing element and/or an associated transceiver, the electronic message to a customer's mobile device for their review.

The processing element may be further configured to combine the EF data with other types of data, such as home telematics data or vehicle telematics data, to form a combined data set. The processing element may be further trained to identify electric device deficiencies or degradation based upon analysis of the combined data set. The processing element may be trained using combined data sets.

In another aspect, a computer system for evaluating the integrity of a home's electrical system and the electric devices therein may be provided. The computer system may include one or more processors, transceivers, and/or sensors configured to: (1) input electricity flow, usage, or consumption (EF) data gathered, collected, sensed, and/or generated by a wireless Electricity Monitoring (EM) device into a processing element trained to identify deficiencies or degradation of electric devices based upon EF data gathered, sensed, collected, and/or generated by the EM device, the EM device configured to wirelessly identify individual electricity flow to a specific electric device based upon the specific electric device's unique electric or electrical signature (and/or correlate individual electricity flow to that specific electric device based upon the unique electrical signature of the specific electric device); (2) determine or detect, via the trained processing element, one or more deficiencies or degradations for the home and the electric devices therein; and/or (3) initiate, via the processing element, a corrective action that mitigates or prevents damage to the home or an electric device when one or more deficiencies or degradations for the home and electric devices therein are detected to facilitate proactive home monitoring and maintenance. The system may include additional, less, or alternate actions, including those discussed elsewhere herein.

Exemplary Machine Learning Computer-Implemented Methods

In one aspect, a computer-implemented method for evaluating the integrity of a home's electrical system and the electric devices therein using machine learning may be provided. The method may be performed, for example, by the system 100 of FIG. 1, the system 200 of FIG. 2, another suitable system, or some combination thereof. The method may include (1) training a processing element to identify deficiencies or degradation of electric devices based upon electricity flow, usage, or consumption (EF) data gathered, collected, and/or generated by a wireless Electricity Monitoring (EM) device, the EM device wirelessly identifies individual electricity flow to a specific electric device and correlates that individual electricity flow to that specific electric device based upon an unique electrical signature of the specific electric device; (2) receiving, via a communication element (such as via wired or wireless communication or data transmission over one or more radio links or communication channels), current electricity flow, usage, or consumption (EF) data for the home and electric devices therein gathered, collected, and/or generated by the wireless Electricity Monitoring (EM) device; (3) analyzing the current EF data for the home and electric devices therein with the trained processing element to determine or detect one or more deficiencies or degradations for the home and electric devices therein; and/or (4) initiating, via the processing element, a corrective action that mitigates or prevents damage to the home or the electric device when one or more deficiencies or degradations for the home and electric devices therein are detected to facilitate proactive home monitoring and maintenance. The method may include additional, less, or alternate actions, including those discussed elsewhere herein.

For instance, the corrective action may include: identifying, via the processing element, faulty wiring and/or a location and/or extent of the faulty wiring within the home; generating, via the processing element, an electronic message detailing the faulty wiring; and/or transmitting, via the processing element and/or an associated transceiver, the electronic message to a customer's mobile device for their review.

The corrective action may include: identifying, via the processing element, a faulty or failing electric device within the home; generating, via the processing element, an electronic message detailing the faulty or failing device; and/or transmitting, via the processing element and/or an associated transceiver, the electronic message to a customer's mobile device for their review.

The corrective action may include: identifying, via the processing element, an electric device in need of replacement or maintenance within the home; generating, via the processing element, an electronic message detailing the need for electric device replacement or maintenance; and/or transmitting, via the processing element and/or an associated transceiver, the electronic message to a customer's mobile device for their review.

The corrective action may include: identifying, via the processing element, an electricity usage inefficiency by the home and/or the electric devices within the home; generating, via the processing element, an electronic message detailing the electricity usage inefficiency, and including a recommendation for more efficient electricity usage; and/or transmitting, via the processing element and/or an associated transceiver, the electronic message to a customer's mobile device for their review.

The corrective action may include: identifying, via the processing element, electricity instability for electricity coming into the home and/or the electric devices within the home; generating, via the processing element, an electronic message detailing the electricity instability, and including a recommendation for mitigating risk; and/or transmitting, via the processing element and/or an associated transceiver, the electronic message to a customer's mobile device for their review.

The corrective action may include: identifying, via the processing element, electricity instability for an electric or hybrid vehicle connected to the home's electrical system (such as during wired or wireless battery charging or energy transfer from the home to the vehicle, or vice versa); generating, via the processing element, an electronic message detailing the electricity instability, and including a recommendation for mitigating risk; and/or transmitting, via the processing element and/or an associated transceiver, the electronic message to a customer's mobile device for their review.

The corrective action may include: identifying, via the processing element, a deficiency or degradation of the electric system and/or battery for an electric or hybrid vehicle connected to the home's electrical system; generating, via the processing element, an electronic message detailing the deficiency or degradation, and including a recommendation for mitigating risk or damage; and/or transmitting, via the processing element and/or an associated transceiver, the electronic message to a customer's mobile device for their review.

The corrective action may include: identifying, via the processing element, electric arc sparking within the home and/or associated with a specific electric device or breaker; generating, via the processing element, an electronic message detailing the electric arc sparking, and including a recommendation for mitigating risk or damage; and/or transmitting, via the processing element and/or an associated transceiver, the electronic message to a customer's mobile device for their review.

The processing element may be further configured to combine the EF data with other types of data, such as home telematics data or vehicle telematics data, to form a combined data set. The processing element may be further trained to identify electric device deficiencies or degradations based upon analysis of the combined data set.

In another aspect, a computer-implemented method for evaluating the integrity of a home's electrical system and the electric devices therein may be provided. The computer-implemented method may include (1) inputting electricity flow, usage, or consumption (EF) data gathered, collected, and/or generated by a wireless Electricity Monitoring (EM) device into a processing element trained to identify deficiencies or degradation of electric devices based upon EF data gathered, collected, and/or generated by the EM device, the EM device configured to wirelessly identify individual electricity flow to a specific electric device based upon the specific electric device's unique electric or electrical signature (and/or correlate individual electricity flow to that specific electric device based upon the unique electrical signature of the specific electric device); (2) determining or detecting, via the trained processing element, one or more deficiencies or degradations for the home and the electric devices therein; and/or (3) initiating, via the processing element, a corrective action that mitigates or prevents damage to the home or an electric device when one or more deficiencies or degradations for the home and electric devices therein are detected to facilitate proactive home monitoring and maintenance. The method may include additional, less, or alternate actions, including those discussed elsewhere herein.

ADDITIONAL CONSIDERATIONS

As used herein, the term "smart" may refer to devices, sensors, or appliances located within or proximate to a property, and with the ability to communicate information about the status of the device, sensor, or appliance and/or receive instructions that control the operation of the device, sensor, or appliance, such as via wired or wireless communication or data transmissions. For example, a smart thermostat may be able to remotely communicate the current temperature of the home and receive instructions to adjust the temperature to a new level. As another example, a smart water tank may be able to remotely communicate the water level contained therein and receive instructions to restrict the flow of water leaving the tank. In contrast, "dumb" devices, sensors, or appliances located within or proximate to a property may require manual control. Referring again to the thermostat example, to adjust the temperature on a "dumb" thermostat, a person may have to manually interact with the thermostat. As such, a person may be unable to use a communication network to remotely adjust a "dumb" device, sensor, or appliance.

A "smart device" as used herein may refer to any of a smart device, sensor, appliance, and/or other smart equipment that may be located (or disposed) within or proximate to a property. In some embodiments in which an appliance and a sensor external to the particular appliance are associated with each other, "smart device" may refer to both the external sensors and the appliance collectively. Some examples of devices that may be "smart devices" are, without limitation, valves, piping, clothes washers/dryers, dish washers, refrigerators, sprinkler systems, toilets, showers, sinks, soil monitors, doors, locks, windows, shutters, ovens, grills, fire places, furnaces, lighting, sump pumps, security cameras, and alarm systems. Similarly, an individual associated with the property shall be referred to as the "homeowner," "property owner," or "policyholder," but it is also envisioned that the individual may be a family member of the homeowner, a person renting/subletting the property, a person living or working on the property, a neighbor of the property, or any other individual that may have an interest in preventing or mitigating damage to the property.

Further, any reference to "home" or "property" is meant to be exemplary and not limiting. The systems and methods described herein may be applied to any property, such as homes, offices, farms, lots, parks, apartments, condos, and/or other types of properties or buildings. Accordingly, "homeowner" may be used interchangeably with "property owner."

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to home or personal property insurance policies, it should be appreciated that an insurance provider may offer or provide one or more different types of insurance policies. Other types of insurance policies may include, for example, condominium owner insurance, renter's insurance, life insurance (e.g., whole-life, universal, variable, term), health insurance, disability insurance, long-term care insurance, annuities, business insurance (e.g., property, liability, commercial auto, workers compensation, professional and specialty liability, inland marine and mobile property, surety and fidelity bonds), automobile insurance, boat insurance, insurance for catastrophic events such as flood, fire, volcano damage and the like, motorcycle insurance, farm and ranch insurance, personal liability insurance, personal umbrella insurance, community organization insurance (e.g., for associations, religious organizations, cooperatives), and other types of insurance products. In embodiments as described herein, the insurance providers process claims related to insurance policies that cover one or more properties (e.g., homes, automobiles, personal property), although processing other insurance policies may also be envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method for analyzing electrical events, the computer-implemented method comprising:

monitoring, by an electricity monitoring device positioned in vicinity of an electrical distribution board of a structure, electrical activity about the structure by wirelessly detecting an electricity flow to a plurality of electric devices that are coupled to the electrical distribution board;

correlating, by one or more processors, the electrical activity with a respective electric device of the plurality of electric devices, based upon an electrical signature unique to the respective electric device;

building, by the one or more processors, based at least upon the correlated electrical activity, a structure electrical profile including data indicative of operation of the plurality of electric devices;

receiving, by the one or more processors, an indication of an insurance claim associated with claimed damage to the structure;

identifying, by the one or more processors, a subset of the electrical activity around a time at which the claimed damage is claimed to have occurred;

reconstructing, by the one or more processors, a series of electrical events around the time at which the claimed damage is claimed to have occurred using the subset of the electrical activity;

comparing, by the one or more processors, the subset of the electrical activity with the structure electrical profile to determine whether the claimed damage occurred involuntarily or voluntarily; and processing, by the one or more processors, the insurance claim in response to determining that the claimed damage occurred involuntarily based upon the reconstructing and the comparing;

wherein comparing the subset of the electrical activity with the structure electrical profile includes comparing an occupancy of the structure indicated by the subset of the electrical activity to an expected occupancy of the structure indicated by the structure electrical profile.

2. The computer-implemented method of claim 1, wherein the one or more processors include one or more processors of the electricity monitoring device.

3. The computer-implemented method of claim 1, wherein the structure is a home.

4. The computer-implemented method of claim 1, wherein comparing the subset of the electrical activity with the structure electrical profile includes comparing operation of a particular device of the plurality of electric devices indicated by the subset of the electrical activity to an expected operation of the particular device indicated by the structure electrical profile.

5. The computer-implemented method of claim 1, wherein the claimed damage includes a fire, and wherein determining whether the claimed damage occurred involuntarily or voluntarily includes determining whether the fire was caused by arson.

6. The computer-implemented method of claim 1, wherein determining whether the claimed damage occurred involuntarily or voluntarily includes determining whether the subset of electrical activity exhibits voluntary tampering of at least one of the plurality of electric devices.

7. The computer-implemented method of claim 1, wherein the claimed damage to the structure includes claimed damage to one or more devices of the plurality of electric devices about the structure.

8. The computer-implemented method of claim 1, further comprising:

identifying, by the electricity monitoring device, each electric device of the plurality of electric devices using the detected electricity flow based upon an electrical signature unique to a respective electric device.

9. The computer-implemented method of claim 1, further comprising:

estimating a level of risk associated with the structure based at least in part upon the structure electrical profile.

10. A computer system for analyzing electrical events, the computer system comprising:

an electricity monitoring device positioned in vicinity of an electrical distribution board of a structure;

one or more processors; and one or more memories storing computer-executable instructions that, when executed via the one or more processors, cause the system to:

monitor, by the electricity monitoring device, electrical activity about the structure by wirelessly detecting an electricity flow to a plurality of electric devices that are coupled to the electrical distribution board;

correlate the electrical activity with a respective electric device of the plurality of electric devices, based upon an electrical signature unique to the respective electric device;

build, based at least upon the correlated electrical activity, a structure electrical profile including data indicative of operation of the plurality of electric devices;

receive an indication of an insurance claim associated with claimed damage to the structure;

identify a subset of the electrical activity when the claimed damage is claimed to have occurred;

reconstruct a series of electrical events around when the claimed damage is claimed to have occurred using the subset of the electrical activity;

compare the subset of the electrical activity with the structure electrical profile to determine whether the claimed damage occurred involuntarily or voluntarily; and process the insurance claim in response to determining that the claimed damage occurred involuntarily based upon the reconstructing and the comparing;

wherein to compare the subset of the electrical activity with the structure electrical profile includes to compare an occupancy of the structure indicated by the subset of the electrical activity to an expected occupancy of the structure indicated by the structure electrical profile.

11. The computer system of claim 10, wherein the one or more processors include one or more processors of the electricity monitoring device.

12. The computer system of claim 10, wherein the structure is a home.

13. The computer system of claim 10, wherein to compare the subset of the electrical activity with the structure electrical profile includes to compare operation of a particular device of the plurality of electric devices indicated by the subset of the electrical activity to an expected operation of the particular device indicated by the structure electrical profile.

14. The computer system of claim 10, wherein the claimed damage includes a fire, and wherein to determine whether the claimed damage occurred involuntarily or voluntarily includes to determine whether the fire was caused by arson.

15. The computer system of claim 10, wherein the claimed damage to the structure includes claimed damage to one or more devices of the plurality of electric devices about the structure.

16. The computer system of claim 10, wherein the computer-executable instructions that, when executed via the one or more processors, further cause the system to identify, by the electricity monitoring device, each electric device of the plurality of electric devices using the detected electricity flow based upon an electrical signature unique to each respective electric device.

17. The computer system of claim 10, wherein determining whether the claimed damage occurred involuntarily or voluntarily includes determining whether the subset of electrical activity exhibits voluntary tampering of any of the plurality of electric devices.

18. The computer system of claim 10, wherein the computer-executable instructions further cause the system to estimate a level of risk associated with the structure based at least in part upon the structure electrical profile.

19. At least one non-transitory computer-readable storage medium with instructions stored thereon for analyzing electrical events, wherein the instructions, when executed by at least one processor, cause the at least one processor to:

monitor, based upon inputs received from an electricity monitoring device, electrical activity about a structure by wirelessly detecting an electricity flow to a plurality of electric devices that are coupled to an electrical distribution board;

correlate the electrical activity with a respective electric device of the plurality of electric devices, based upon an electrical signature unique to the respective electric device;

build, based at least upon the correlated electrical activity, a structure electrical profile including data indicative of operation of the plurality of electric devices;

receive an indication of an insurance claim associated with claimed damage to the structure;

identify a subset of the electrical activity when the claimed damage is claimed to have occurred;

reconstruct a series of electrical events around when the claimed damage is claimed to have occurred using the subset of the electrical activity;

compare the subset of the electrical activity with the structure electrical profile to determine whether the claimed damage occurred involuntarily or voluntarily; and process the insurance claim in response to determining that the claimed damage occurred involuntarily based upon the reconstructing and the comparing;

wherein to compare the subset of the electrical activity with the structure electrical profile includes to compare an occupancy of the structure indicated by the subset of the electrical activity to an expected occupancy of the structure indicated by the structure electrical profile.

* * * * *